(12) United States Patent
Wang et al.

(10) Patent No.: US 11,871,478 B2
(45) Date of Patent: Jan. 9, 2024

(54) BLUETOOTH LOW ENERGY-BASED COMMUNICATION METHOD AND RELATED APPARATUS

(71) Applicant: Huawei Technologies Co., Ltd., Shenzhen (CN)

(72) Inventors: Liang Wang, Shanghai (CN); Zhicong Zang, Shenzhen (CN); Renfei Zhu, Shanghai (CN); Yixiu Hao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 17/418,521

(22) PCT Filed: Dec. 26, 2018

(86) PCT No.: PCT/CN2018/124087
§ 371 (c)(1),
(2) Date: Jun. 25, 2021

(87) PCT Pub. No.: WO2020/133006
PCT Pub. Date: Jul. 2, 2020

(65) Prior Publication Data
US 2022/0070971 A1    Mar. 3, 2022

(51) Int. Cl.
*H04W 76/50*        (2018.01)
*H04W 4/90*         (2018.01)
(Continued)

(52) U.S. Cl.
CPC .......... *H04W 76/50* (2018.02); *G08B 25/016* (2013.01); *H04W 4/80* (2018.02); *H04W 4/90* (2018.02); *H04W 48/08* (2013.01)

(58) Field of Classification Search
CPC ..... H04W 76/19; H04W 76/27; H04W 68/02; H04W 76/50; H04W 4/90; H04W 4/80;
(Continued)

(56) References Cited

U.S. PATENT DOCUMENTS 10,178,159 B2 *   1/2019   Prashant ............. H04L 63/0876
2012/0196534 A1 * 8/2012   Kasslin ................ H04W 76/40
                                                          455/41.2

(Continued)

FOREIGN PATENT DOCUMENTS

CN    102104829 A    6/2011
CN    104539324 A    4/2015
(Continued)

*Primary Examiner* — Maria El-Zoobi
(74) *Attorney, Agent, or Firm* — Conley Rose, P.C.

(57) ABSTRACT

An electronic device sends a help seeking advertising packet on a BLUETOOTH Low Energy advertising channel in response to a user operation, where the help seeking advertising packet carries emergency help seeking information. In this application, the electronic device can send the help seeking advertising packet based on Bluetooth low energy, so that a user can seek timely and effective help from another nearby user. When encountering danger, the user can also send the help seeking advertising packet even if there is no cellular network, to ensure safety of the user.

20 Claims, 31 Drawing Sheets

(51) Int. Cl.
*H04W 4/80* (2018.01)
*H04W 48/08* (2009.01)
*G08B 25/01* (2006.01)

(58) Field of Classification Search
CPC ..... H04W 48/08; H04W 8/20; H04W 4/0298; H04B 1/7156; G08B 25/106; G05B 15/02; G06F 3/04817
USPC ...................................................... 455/404.1
See application file for complete search history.

(56) References Cited

U.S. PATENT DOCUMENTS

| | | | |
|---|---|---|---|
| 2014/0057567 A1* | 2/2014 | Desai | H04L 63/02 455/41.2 |
| 2016/0029149 A1 | 1/2016 | Morikawa et al. | |
| 2017/0013547 A1* | 1/2017 | Skaaksrud | H04W 24/10 |
| 2017/0026777 A1 | 1/2017 | Denboer et al. | |
| 2017/0026905 A1 | 1/2017 | Denboer et al. | |
| 2017/0367104 A1* | 12/2017 | Raisoni | A61B 5/0015 |
| 2017/0374526 A1 | 12/2017 | Kerai | |
| 2018/0152972 A1* | 5/2018 | Wu | H04W 76/20 |
| 2018/0180707 A1* | 6/2018 | Khan | G01S 5/0236 |
| 2019/0075445 A1 | 3/2019 | Mokhtari | |
| 2021/0099600 A1* | 4/2021 | Takarabe | H04N 1/00891 |

FOREIGN PATENT DOCUMENTS

| | | | |
|---|---|---|---|
| CN | 105594236 A | 5/2016 | |
| CN | 201610620208 | * 6/2016 | ............. H04W 4/06 |
| CN | 106255071 A | 12/2016 | |
| CN | 106658365 A | 5/2017 | |
| CN | 107182026 A | 9/2017 | |
| CN | 107846674 A | 3/2018 | |
| CN | 107852587 A | 3/2018 | |
| DE | 102016108397 A1 | 11/2017 | |
| WO | 2013175741 A1 | 11/2013 | |

* cited by examiner

BLUETOOTH LOW ENERGY-BASED COMMUNICATION METHOD AND RELATED APPARATUS

CROSS-REFERENCE TO RELATED APPLICATIONS

This application is a National Stage of International Patent Application No. PCT/CN2018/124087 filed on Dec. 26, 2018, which is hereby incorporated by reference in its entirety.

TECHNICAL FIELD

This application relates to the field of Bluetooth technologies, and in particular, to a Bluetooth low energy (Bluetooth low energy, BLE/Bluetooth LE)-based communication method and a related apparatus.

BACKGROUND

With development of terminal technologies, most intelligent terminals provide an emergency call function. When a user encounters an emergency, for example, encounters danger when taking a taxi, an express, or a ride, or going out for play, the user may send a help seeking signal by using an emergency call function of an intelligent terminal, to ensure safety of the user. Currently, the emergency call function of the intelligent terminal is mostly implemented in a form of sending a help seeking SMS message, dialing a preset emergency number, sending current location information to a preset emergency contact, or the like. To be specific, the emergency call function currently provided by the terminal needs to be implemented through a cellular network. When the user is in a case in which there is no cellular network, the user cannot use the emergency call function to seek help, and therefore the emergency contact or a police officer cannot provide timely and effective help for the user.

In view of this, an urgent problem to be resolved currently is how to provide a timely and effective emergency help seeking solution for the user, so that the user can also send the help seeking signal when the user encounters danger in the case in which there is no cellular network to ensure safety of the user.

SUMMARY

This application provides a Bluetooth low energy-based communication method and a related apparatus. Electronic devices can communicate with each other based on a Bluetooth low energy advertising mechanism, and the devices do not need to establish a connection and do not depend on a cellular network. This is convenient and fast, and therefore device power consumption is reduced.

According to a first aspect, this application provides a Bluetooth low energy-based communication method. The method is applied to an electronic device that supports Bluetooth low energy, and the method includes: The electronic device receives a user operation. The electronic device sends a help seeking advertising packet on a Bluetooth low energy advertising channel in response to the user operation, where the help seeking advertising packet includes a significant data part and a non-significant data part, the significant data part includes at least one advertising data unit, the advertising data unit includes a length part and a data part, the length part is used to indicate a length of the data part, and the data part includes an advertising data field and an advertising data type; and a first advertising data unit in the advertising data unit uses the advertising data field to carry emergency help seeking information.

After the electronic device sends the help seeking advertising packet, another electronic device that falls within an effective BLE range of the electronic device and that enables a BLE-based scanning service can obtain the help seeking advertising packet through scanning, and provide timely and effective help for a user.

According to the communication method in the first aspect, the electronic device can send the help seeking advertising packet based on BLE, so that the user can seek timely and effective help from another nearby user. When encountering danger, the user can also send the help seeking advertising packet even if there is no cellular network, to ensure safety of the user.

It can be learned from a structure of the help seeking advertising packet that the help seeking advertising packet is a BLE advertising packet.

With reference to the first aspect, the user operation may be an operation such as a gesture or a speech. The user operation is used to trigger the electronic device to send the help seeking advertising packet on the Bluetooth low energy advertising channel. The user operation may be independently set by the user, or may be set by the electronic device by default.

With reference to the first aspect, in some embodiments, the method may further include: The electronic device preconfigures the advertising data field in the first advertising data unit as an emergency help seeking information field, where the emergency help seeking information field carries the emergency help seeking information. In other words, the help seeking advertising packet includes the emergency help seeking information field.

With reference to the first aspect, in some embodiments, the significant data part includes a plurality of advertising data units, and a second advertising data unit in the advertising data units uses the advertising data field to carry location information of the electronic device. The location information may include but is not limited to longitude and latitude coordinates, an altitude, and a geographical location name. The location information may be obtained by the electronic device through global navigation satellite system positioning, base station positioning, Wi-Fi positioning, barometric pressure sensor measurement, or the like. In some embodiments, the electronic device may further preconfigure the advertising data field in the second advertising data unit as a location information field, and the location information field carries the location information of the electronic device. In other words, the help seeking advertising packet includes the location information field.

With reference to the first aspect, in some embodiments, the significant data part includes the plurality of advertising data units, and the help seeking advertising packet meets at least one of the following:

(1) A third advertising data unit in the advertising data units uses the advertising data field to carry a user identifier of a user associated with the electronic device.

The user associated with the advertiser may be a user corresponding to user-related information stored in the electronic device. The user identifier may be information that can indicate a unique user, such as a user account or an identity card number. In some embodiments, the electronic device may further preconfigure the advertising data field in the third advertising data unit as a user identifier field, where the user identifier field carries the user identifier of the user associated with the electronic device. In other words, the help seeking advertising packet includes the user identifier field.

(2) A fourth advertising data unit in the advertising data units uses the advertising data field to carry user information of a user associated with the electronic device.

The user information is related information of the user associated with the electronic device other than the user identifier, for example, a nickname, a name, and a profile picture of the user associated with the advertiser. In some embodiments, the electronic device may further preconfigure the advertising data field in the fourth advertising data unit as a user information field, where the user information field carries the user information of the user associated with the electronic device. In other words, the help seeking advertising packet includes the user information field.

A device that obtains the help seeking advertising packet through scanning may parse the help seeking advertising packet, and provide the user information of the user associated with the electronic device for the user to view.

(3) A fifth advertising data unit in the advertising data units uses the advertising data field to carry information used to indicate a structure of the help seeking advertising packet.

The information used to indicate the structure of the help seeking advertising packet may be a character string, for example, "000003". In some embodiments, the electronic device may further preconfigure the advertising data field in the fifth advertising data unit as a special identification field, where the special identification field carries the information used to indicate the structure of the help seeking advertising packet. In other words, the help seeking advertising packet includes the special identification field.

A device that obtains the help seeking advertising packet through scanning may determine the structure of the help seeking advertising packet based on the information used to indicate the structure of the help seeking advertising packet, to parse the help seeking advertising packet.

(4) A sixth advertising data unit in the advertising data units uses the advertising data field to carry an identifier of the help seeking advertising packet.

The identifier of the help seeking advertising packet is used to indicate the content message advertising packet. In some embodiments, the electronic device may further preconfigure the advertising data field in the sixth advertising data unit as an advertising packet identifier field, where the advertising packet identifier field carries the identifier of the help seeking advertising packet. In other words, the help seeking advertising packet includes the advertising packet identifier field.

(5) A seventh advertising data unit in the advertising data units uses the advertising data field to carry an identifier of an advertising packet obtained by the electronic device through scanning.

The identifier of the advertising packet obtained by the electronic device through scanning is used to indicate the advertising packet obtained by the electronic device through scanning. In some embodiments, the electronic device may further preconfigure the advertising data field in the seventh advertising data unit as an identifier field of a received advertising packet, where the identifier field of the received advertising packet carries the identifier of the advertising packet obtained by the electronic device through scanning. In other words, the help seeking advertising packet includes the identifier field of the received advertising packet.

With reference to the first aspect, in some embodiments, the electronic device sends the help seeking advertising packet on the Bluetooth low energy advertising channel at a preset frequency. Herein, the electronic device may send the help seeking advertising packet a plurality of times in response to the user operation. The preset frequency may be a fixed value or a variable value. The electronic device sends the help seeking advertising packet a plurality of times, so that a probability that another electronic device obtains the help seeking advertising packet through scanning can be increased, to ensure rescue efficiency.

In some embodiments, when the electronic device sends the help seeking advertising packet on the Bluetooth low energy advertising channel at the preset frequency, if duration for sending the help seeking advertising packet exceeds a preset value, the electronic device may stop sending the help seeking advertising packet. The preset value is a difference between a current time and a time at which the electronic device sends the help seeking advertising packet for the first time.

In some embodiments, when the electronic device sends the help seeking advertising packet on the Bluetooth low energy advertising channel at the preset frequency, if the electronic device receives another user operation, the electronic device may stop sending the help seeking advertising packet. The another user operation may be an operation such as a gesture or a speech.

With reference to any one of the first aspect or the embodiments of the first aspect, the first advertising data unit, the second advertising data unit, the third advertising data unit, the fourth advertising data unit, the fifth advertising data unit, the sixth advertising data unit, and the seventh advertising data unit that are of the help seeking advertising packet are all different advertising data units, and quantities thereof each may be one or more.

According to a second aspect, this application provides a Bluetooth low energy-based communication method. The method is applied to an electronic device that supports Bluetooth low energy, and the method includes: The electronic device obtains a help seeking advertising packet through scanning on a Bluetooth low energy advertising channel. The electronic device sends a marked advertising packet on the Bluetooth low energy advertising channel, where the marked advertising packet is used to indicate that the help seeking advertising packet carries spam information; and the help seeking advertising packet and the marked advertising packet each include a significant data part and a non-significant data part, the significant data part includes at least one advertising data unit, the advertising data unit includes a length part and a data part, the length part is used to indicate a length of the data part, and the data part includes an advertising data field and an advertising data type.

The help seeking advertising packet includes a plurality of advertising data units, a first advertising data unit in the advertising data units of the help seeking advertising packet uses the advertising data field to carry the spam information, and a second advertising data unit in the advertising data units of the help seeking advertising packet uses the advertising data field to carry an identifier of the help seeking advertising packet.

A first advertising data unit in the advertising data unit of the marked advertising packet uses the advertising data field to carry the identifier of the help seeking advertising packet.

With reference to the second aspect, in some embodiments, the advertising data field in the first advertising data unit included in the help seeking advertising packet is preconfigured as an emergency help seeking information field, and the emergency help seeking information field carries the spam information.

With reference to the second aspect, in some embodiments, the communication method may further include: The electronic device configures the first advertising data unit of the marked advertising packet as a first field, where the first field carries an identifier that is obtained by the electronic device through scanning and that carries the spam information, and the first field carries the identifier of the help seeking advertising packet.

With reference to the second aspect, the first advertising data unit and the second advertising data unit that are of the help seeking advertising packet are different advertising data units, and quantities thereof each may be one or more. A quantity of first advertising data units of the marked advertising packet may be one or more.

According to the method in the second aspect, when a user uses a packet structure of the help seeking advertising packet to carry the spam information instead of real emergency help seeking information, a device that obtains the help seeking advertising packet through scanning may send the marked advertising packet, to notify another device that the help seeking advertising packet carries the spam information. In other words, the device that receives the help seeking advertising packet may mark, by using the marked advertising packet, the help seeking advertising packet as an advertising packet carrying the spam information.

It can be learned from structures of the help seeking advertising packet and the marked advertising packet that the help seeking advertising packet and the marked advertising packet each are a BLE advertising packet.

With reference to the second aspect, in some embodiments, the electronic device may send the marked advertising packet in any one of the following cases: (1) The electronic device parses the help seeking advertising packet, and sends the marked advertising packet when the help seeking advertising packet includes a preset keyword or element. The preset element may include a website link, and the preset keyword may include "buy", "purchase", or the like. (2) The electronic device sends the marked advertising packet when receiving an input user operation. To be specific, the electronic device may present, to the user, information carried in the help seeking advertising packet, and the user determines whether the help seeking advertising packet carries the spam information. If the help seeking advertising packet carries the spam information, the user may input a user operation to the electronic device.

With reference to the second aspect, in some embodiments, the help seeking advertising packet is sent by a first electronic device, and the first electronic device can obtain, through scanning, the marked advertising packet sent by the electronic device. To avoid abuse of the help seeking advertising packet, the first electronic device may stop, according to the following several policies, sending the help seeking advertising packet: (1) When the help seeking advertising packet sent by the first electronic device is marked as an advertising packet carrying the spam information, the first electronic device stops sending the help seeking advertising packet. (2) The first electronic device collects statistics about a proportion that the help seeking advertising packet sent by the first electronic device is marked as an advertising packet carrying the spam information, and when the proportion reaches a specific threshold (for example, 50%), the first electronic device stops sending the help seeking advertising packet. (3) The first electronic device collects statistics about a quantity of times for which the sent help seeking advertising packet is marked as an advertising packet carrying the spam information, and when the quantity of times reaches a specific threshold, the first electronic device stops sending the help seeking advertising packet.

According to a third aspect, this application provides a Bluetooth low energy-based communication method. The method is applied to an electronic device that supports Bluetooth low energy, and the method includes: A first electronic device obtains, through scanning on a Bluetooth low energy advertising channel, a first status information advertising packet sent by a second electronic device. The first electronic device sends a content message advertising packet on the Bluetooth low energy advertising packet.

The first status information advertising packet and the content message advertising packet each include a significant data part and a non-significant data part, the significant data part includes at least one advertising data unit, the advertising data unit includes a length part and a data part, the length part is used to indicate a length of the data part, and the data part includes an advertising data field and an advertising data type.

A first advertising data unit in the advertising data unit of the first status information advertising packet uses the advertising data field to carry a user identifier of a user associated with the second electronic device.

The content message advertising packet includes a plurality of advertising data units, a first advertising data unit in the advertising data units of the content message advertising packet uses the advertising data field to carry a user identifier of a user associated with the first electronic device, a second advertising data unit in the advertising data units of the content message advertising packet uses the advertising data field to carry information about a target user, and a third advertising data unit in the advertising data units of the content message advertising packet uses the advertising data field to carry a message sent by the first electronic device to the second electronic device; and the target user includes the user associated with the second electronic device.

According to the communication method in the third aspect, the first electronic device may discover the second electronic device by using the first status information advertising packet sent by the second electronic device, to send the content message advertising packet to the second electronic device, so as to complete communication.

According to the communication method in the third aspect, the electronic devices can communicate with each other based on a BLE advertising mechanism, and the devices do not need to establish a connection and do not depend on a cellular network. Therefore, the user can also perform communication without the cellular network. This is convenient and fast. The communication method is implemented based on BLE, and can implement low power consumption communication between the electronic devices.

It can be learned from structures of the first status information advertising packet and the content message advertising packet that the first status information advertising packet and the content message advertising packet each are a BLE advertising packet.

With reference to the third aspect, in some embodiments, the advertising data field in the first advertising data unit in the advertising data unit of the first status information advertising packet is preconfigured as a first user identifier field, and the first user identifier field carries the user identifier of the user associated with the second electronic device. In other words, the first status information advertising packet includes the first user identifier field.

With reference to the third aspect, in some embodiments, the advertising data field in the first advertising data unit in the advertising data units of the content message advertising packet is preconfigured as a second user identifier field, and the second user identifier field carries the user identifier of the user associated with the first electronic device; the advertising data field in the second advertising data unit in the advertising data units of the content message advertising packet is preconfigured as a target user information field, and the target user information field carries the information about the target user; and the advertising data field in the third advertising data unit in the advertising data units of the content message advertising packet is preconfigured as a content message field, and the content message field carries the message sent by the first electronic device to the second electronic device. In other words, the content message advertising packet includes the second user identifier field, the target user information field, and the content message field.

With reference to the third aspect, in some embodiments, a fourth advertising data unit in the advertising data units of the content message advertising packet uses the advertising data field to carry an identifier of the content message advertising packet. The first status information advertising packet includes a plurality of advertising data units, and a second advertising data unit in the advertising data units of the first status information advertising packet uses the advertising data field to carry an identifier of an advertising packet obtained by the second electronic device through scanning; and when the second electronic device obtains the content message advertising packet through scanning, the second advertising data unit in the advertising data units of the first status information advertising packet uses the advertising data field to carry the identifier of the content message advertising packet. In other words, the second advertising data unit of the first status information advertising packet may be used to notify another device of the advertising packet obtained by the second electronic device through scanning.

In some embodiments, the advertising data field in the fourth advertising data unit in the advertising data units of the content message advertising packet is preconfigured as an advertising packet identifier field, and the advertising packet identifier field carries the identifier of the content message advertising packet. In other words, the first status information advertising packet includes the advertising packet identifier field.

In some embodiments, the advertising data field in the second advertising data unit in the advertising data units of the first status information advertising packet is preconfigured as an identifier field of a received advertising packet, the identifier field of the received advertising packet includes a first field, and the first field carries the identifier of the advertising packet obtained by the second electronic device through scanning. In other words, the first status information advertising packet includes the identifier field of the received advertising packet.

With reference to the third aspect, in some embodiments, the first status information advertising packet includes the plurality of advertising data units, and the first status information advertising packet meets at least one of the following:

(1) A third advertising data unit in the advertising data units of the first status information advertising packet uses the advertising data field to carry information used to indicate a structure of the first status information advertising packet.

The information used to indicate the structure of the first status information advertising packet may be a character string, for example, "000001". In some embodiments, the advertising data field in the third advertising data unit may be further preconfigured as a special identification field, and the special identification field carries the information used to indicate the structure of the first status information advertising packet. In other words, the first status information advertising packet includes the special identification field.

A device that obtains the first status information advertising packet through scanning may determine the structure of the first status information advertising packet based on the information used to indicate the structure of the first status information advertising packet, to parse the first status information advertising packet.

(2) A fourth advertising data unit in the advertising data units of the first status information advertising packet uses the advertising data field to carry user information of the user associated with the second electronic device.

In some embodiments, the advertising data field in the fourth advertising data unit may be further preconfigured as a user information field, and the user information field carries the user information of the user associated with the second electronic device. In other words, the first status information advertising packet includes the user information field.

The first electronic device that obtains the first status information advertising packet through scanning may parse the first status information advertising packet, and provide the user information of the user associated with the second electronic device for the user to view.

(3) A fifth advertising data unit in the advertising data units of the first status information advertising packet uses the advertising data field to carry an identifier of a group to which the user associated with the second electronic device belongs.

The identifier of the group to which the user associated with the second electronic device belongs is used to indicate the group to which the user associated with the second electronic device belongs. There may be one or more groups to which the user associated with the second electronic device belongs.

In some embodiments, the advertising data field in the fifth advertising data unit may be further preconfigured as a user group identifier field, and the user group identifier field carries the identifier of the group to which the user associated with the second electronic device belongs. In other words, the first status information advertising packet includes the user group identifier field.

(4) A sixth advertising data unit in the advertising data units of the first status information advertising packet uses the advertising data field to carry a public key of the second electronic device.

The first status information advertising packet carries the public key of the second electronic device. In other words, the second electronic device discloses the public key of the second electronic device. In some embodiments, the advertising data field in the sixth advertising data unit may be further preconfigured as an encryption field, and the encryption field carries the public key of the second electronic device. In other words, the first status information advertising packet includes the encryption field.

In some embodiments, the sixth advertising data unit in the advertising data units of the first status information advertising packet uses the advertising data field to carry the public key of the second electronic device; and before the first electronic device sends the content message advertising packet on the Bluetooth low energy advertising channel, the communication method in the third aspect further includes:

The first electronic device encrypts the content message advertising packet by using the public key of the second electronic device. It may be understood that the second electronic device pre-stores the public key and a private key of the second electronic device. After the first electronic device encrypts the content message advertising packet by using the public key, only the second electronic device that has a private key paired with the public key can parse the content message advertising packet, so that another electronic device can be prevented from parsing the content message advertising packet. To be specific, directional transmission can be implemented based on the BLE advertising channel, to ensure information security in a communication process.

In some embodiments, the fifth advertising data unit in the advertising data units of the first status information advertising packet uses the advertising data field to carry the identifier of the group to which the user associated with the second electronic device belongs, and the group to which the user associated with the second electronic device belongs includes a first group; and after the first electronic device obtains, through scanning on the Bluetooth low energy advertising channel, the first status information advertising packet sent by the second electronic device, the communication method in the third aspect further includes: The first electronic device sends a second status information advertising packet on the Bluetooth low energy advertising channel, where the second status information advertising packet includes a significant data part and a non-significant data part, the significant data part includes a plurality of advertising data units, the advertising data unit includes a length part and a data part, the length part is used to indicate a length of the data part, and the data part includes an advertising data field and an advertising data type; and a first advertising data unit in the advertising data units of the second status information advertising packet uses the advertising data field to carry the user identifier of the user associated with the first electronic device, a second advertising data unit in the advertising data units of the second status information advertising packet uses the advertising data field to carry an identifier of a group to which the user associated with the first electronic device belongs, and the group to which the user associated with the first electronic device belongs includes the first group.

It can be learned from a structure of the second status information advertising packet that the second status information advertising packet is a BLE advertising packet. The first electronic device may discover the first group from the first status information advertising packet sent by the second electronic device, and may use the second advertising data unit of the second status information advertising packet to carry an identifier of the first group by sending the second status information advertising packet, so that the user joins the first group.

In some embodiments, the target user includes a user associated with a device in the first group. To be specific, after joining the first group, the user may send a message to another user in the first group.

With reference to the first aspect, in some embodiments, the content message advertising packet meets at least one of the following:

(1) A fifth advertising data unit in the advertising data units of the content message advertising packet uses the advertising data field to carry information used to indicate a structure of the content message advertising packet.

The information used to indicate the structure of the content message advertising packet may be a character string, for example, "000002". In some embodiments, the first electronic device may further preconfigure the advertising data field in the fifth advertising data unit as a special identification field, where the special identification field carries the information used to indicate the structure of the content message advertising packet. In other words, the content message advertising packet includes the special identification field.

A device that obtains the content message advertising packet through scanning may determine the structure of the content message advertising packet based on the information used to indicate the structure of the content message advertising packet, to parse the content message advertising packet.

(2) A sixth advertising data unit in the advertising data units of the content message advertising packet uses the advertising data field to carry user information of the user associated with the first electronic device.

In some embodiments, the first electronic device may further preconfigure the advertising data field in the sixth advertising data unit as a user information field, where the user information field carries the user information of the user associated with the first electronic device. In other words, the content message advertising packet includes the user information field.

A device that obtains the content message advertising packet through scanning may parse the content message advertising packet, and provide the user information of the user associated with the first electronic device for the user to view.

(3) A seventh advertising data unit in the advertising data units of the content message advertising packet uses the advertising data field to carry an identifier of an advertising packet obtained by the first electronic device through scanning.

The identifier of the advertising packet obtained by the first electronic device through scanning is used to indicate the advertising packet obtained by the first electronic device through scanning. In some embodiments, the first electronic device may further preconfigure the advertising data field in the seventh advertising data unit as an identifier field of a received advertising packet, where the identifier field of the received advertising packet carries the identifier of the advertising packet obtained by the first electronic device through scanning. In other words, the content message advertising packet includes the advertising packet identifier field.

With reference to any one of the third aspect or the embodiments of the third aspect, the first advertising data unit, the second advertising data unit, the third advertising data unit, the fourth advertising data unit, the fifth advertising data unit, and the sixth advertising data unit that are of the first status information advertising packet are all different advertising data units, and quantities thereof each may be one or more.

With reference to any one of the third aspect or the embodiments of the third aspect, the first advertising data unit and the second advertising data unit that are of the second status information advertising packet are different advertising data units, and quantities thereof each may be one or more.

With reference to any one of the third aspect or the embodiments of the third aspect, the first advertising data unit, the second advertising data unit, the third advertising data unit, the fourth advertising data unit, the fifth advertising data unit, the sixth advertising data unit, and the seventh advertising data unit that are of the content message advertising packet are all different advertising data units, and quantities thereof each may be one or more.

According to a fourth aspect, this application provides an electronic device. The electronic device supports Bluetooth low energy, and the electronic device includes a user operation receiving module, a wireless communications module, and a processor.

The user operation receiving module is configured to receive a user operation.

The processor is configured to: in response to the user operation, generate a help seeking advertising packet, and send indication information to trigger the wireless communications module to send the help seeking advertising packet on a Bluetooth low energy advertising channel.

The wireless communications module is configured to send the help seeking advertising packet on the Bluetooth low energy advertising channel based on the indication information.

The help seeking advertising packet includes a significant data part and a non-significant data part, the significant data part includes at least one advertising data unit, the advertising data unit includes a length part and a data part, the length part is used to indicate a length of the data part, and the data part includes an advertising data field and an advertising data type.

A first advertising data unit in the advertising data unit uses the advertising data field to carry emergency help seeking information.

It can be learned from a structure of the help seeking advertising packet that the help seeking advertising packet is a BLE advertising packet.

With reference to the fourth aspect, the user operation may be a gesture, a speech, or the like. The user operation receiving module may include a display, a microphone, a button, and the like.

With reference to the fourth aspect, the indication information sent by the processor may be an instruction, a control signal, or the like. This is not limited in this embodiment of this application.

With reference to the fourth aspect, in some embodiments, the processor is further configured to preconfigure the advertising data field in the first advertising data unit as an emergency help seeking information field, where the emergency help seeking information field carries the emergency help seeking information.

With reference to the fourth aspect, in some embodiments, the significant data part includes a plurality of advertising data units, and a second advertising data unit in the advertising data units uses the advertising data field to carry location information of the electronic device.

With reference to the fourth aspect, in some embodiments, the significant data part includes the plurality of advertising data units, and the help seeking advertising packet meets at least one of the following:

(1) A third advertising data unit in the advertising data units uses the advertising data field to carry a user identifier of a user associated with the electronic device.

(2) A fourth advertising data unit in the advertising data units uses the advertising data field to carry user information of a user associated with the electronic device.

(3) A fifth advertising data unit in the advertising data units uses the advertising data field to carry information used to indicate a structure of the help seeking advertising packet.

(4) A sixth advertising data unit in the advertising data units uses the advertising data field to carry an identifier of the help seeking advertising packet.

(5) A seventh advertising data unit in the advertising data units uses the advertising data field to carry an identifier of an advertising packet obtained by the wireless communications module through scanning.

With reference to the fourth aspect, in some embodiments, the wireless communications module sends the help seeking advertising packet on the Bluetooth low energy advertising channel at a preset frequency.

In some embodiments, the processor is further configured to: when duration for which the wireless communications module sends the help seeking advertising packet exceeds a preset value, trigger the wireless communications module to stop sending the help seeking advertising packet.

In some embodiments, the user operation receiving module is further configured to receive another user operation, and the processor is further configured to: in response to the another user operation, trigger the wireless communications module to stop sending the help seeking advertising packet.

According to a fifth aspect, this application provides an electronic device. The electronic device supports Bluetooth low energy, and the electronic device includes a wireless communications module and a processor.

The wireless communications module is configured to obtain a help seeking advertising packet through scanning on a Bluetooth low energy advertising channel.

The processor is configured to: generate a marked advertising packet, and send indication information to trigger the wireless communications module to send the marked advertising packet on the Bluetooth low energy advertising channel, where the marked advertising packet is used to indicate that the help seeking advertising packet carries spam information.

The wireless communications module is further configured to send the marked advertising packet on the Bluetooth low energy advertising channel.

The help seeking advertising packet and the marked advertising packet each include a significant data part and a non-significant data part, the significant data part includes at least one advertising data unit, the advertising data unit includes a length part and a data part, the length part is used to indicate a length of the data part, and the data part includes an advertising data field and an advertising data type.

The help seeking advertising packet includes a plurality of advertising data units, a first advertising data unit in the advertising data units of the help seeking advertising packet uses the advertising data field to carry the spam information, and a second advertising data unit in the advertising data units of the help seeking advertising packet uses the advertising data field to carry an identifier of the help seeking advertising packet.

A first advertising data unit in the advertising data unit of the marked advertising packet uses the advertising data field to carry the identifier of the help seeking advertising packet.

With reference to the fifth aspect, the indication information sent by the processor may be an instruction, a control signal, or the like. This is not limited in this embodiment of this application.

With reference to the fifth aspect, in some embodiments, the advertising data field in the first advertising data unit included in the help seeking advertising packet is preconfigured as an emergency help seeking information field, and the emergency help seeking information field carries the spam information.

According to a sixth aspect, this application provides an electronic device. The electronic device supports Bluetooth low energy, and the electronic device includes a wireless communications module and a processor.

The wireless communications module is configured to obtain, through scanning on a Bluetooth low energy advertising channel, a first status information advertising packet sent by a second electronic device.

The processor is configured to: generate a content message advertising packet, and send indication information to trigger the wireless communications module to send the content message advertising packet on the Bluetooth low energy advertising channel.

The wireless communications module is further configured to send the content message advertising packet on the Bluetooth low energy advertising channel.

The first status information advertising packet and the content message advertising packet each include a significant data part and a non-significant data part, the significant data part includes at least one advertising data unit, the advertising data unit includes a length part and a data part, the length part is used to indicate a length of the data part, and the data part includes an advertising data field and an advertising data type.

A first advertising data unit in the advertising data unit of the first status information advertising packet uses the advertising data field to carry a user identifier of a user associated with the second electronic device.

The content message advertising packet includes a plurality of advertising data units, a first advertising data unit in the advertising data units of the content message advertising packet uses the advertising data field to carry a user identifier of a user associated with the first electronic device, a second advertising data unit in the advertising data units of the content message advertising packet uses the advertising data field to carry information about a target user, and a third advertising data unit in the advertising data units of the content message advertising packet uses the advertising data field to carry a message sent by the first electronic device to the second electronic device; and the target user includes the user associated with the second electronic device.

With reference to the sixth aspect, the indication information sent by the processor may be an instruction, a control signal, or the like. This is not limited in this embodiment of this application.

With reference to the sixth aspect, in some embodiments, the advertising data field in the first advertising data unit in the advertising data unit of the first status information advertising packet is preconfigured as a first user identifier field, and the first user identifier field carries the user identifier of the user associated with the second electronic device.

With reference to the sixth aspect, in some embodiments, the advertising data field in the first advertising data unit in the advertising data units of the content message advertising packet is preconfigured as a second user identifier field, and the second user identifier field carries the user identifier of the user associated with the first electronic device; the advertising data field in the second advertising data unit in the advertising data units of the content message advertising packet is preconfigured as a target user information field, and the target user information field carries the information about the target user; and the advertising data field in the third advertising data unit in the advertising data units of the content message advertising packet is preconfigured as a content message field, and the content message field carries the message sent by the first electronic device to the second electronic device.

With reference to the sixth aspect, in some embodiments, a fourth advertising data unit in the advertising data units of the content message advertising packet uses the advertising data field to carry an identifier of the content message advertising packet. The first status information advertising packet includes a plurality of advertising data units, and a second advertising data unit in the advertising data units of the first status information advertising packet uses the advertising data field to carry an identifier of an advertising packet obtained by the second electronic device through scanning; and when the wireless communications module obtains the content message advertising packet through scanning, the second advertising data unit in the advertising data units of the first status information advertising packet uses the advertising data field to carry the identifier of the content message advertising packet.

With reference to the sixth aspect, in some embodiments, the first status information advertising packet includes the plurality of advertising data units, and the first status information advertising packet meets at least one of the following:

(1) A third advertising data unit in the advertising data units of the first status information advertising packet uses the advertising data field to carry information used to indicate a structure of the first status information advertising packet.

(2) A fourth advertising data unit in the advertising data units of the first status information advertising packet uses the advertising data field to carry user information of the user associated with the second electronic device.

(3) A fifth advertising data unit in the advertising data units of the first status information advertising packet uses the advertising data field to carry an identifier of a group to which the user associated with the second electronic device belongs.

(4) A sixth advertising data unit in the advertising data units of the first status information advertising packet uses the advertising data field to carry a public key of the second electronic device.

In some embodiments, the sixth advertising data unit in the advertising data units of the first status information advertising packet uses the advertising data field to carry the public key of the second electronic device; and the processor is further configured to: before the wireless communications module sends the content message advertising packet on the Bluetooth low energy advertising channel, encrypt the content message advertising packet by using the public key of the second electronic device.

In some embodiments, the fifth advertising data unit in the advertising data units of the first status information advertising packet uses the advertising data field to carry the identifier of the group to which the user associated with the second electronic device belongs, and the group to which the user associated with the second electronic device belongs includes a first group. The processor is further configured to: generate a second status information advertising packet, and send indication information to trigger the wireless communications module to send the second status information advertising packet on the Bluetooth low energy advertising channel. The wireless communications module is further configured to send the second status information advertising packet on the Bluetooth low energy advertising channel, where the second status information advertising packet includes a significant data part and a non-significant data part, the significant data part includes a plurality of advertising data units, the advertising data unit includes a length part and a data part, the length part is used to indicate a length of the data part, and the data part includes an advertising data field and an advertising data type; and a first advertising data unit in the advertising data units of the second status information advertising packet uses the advertising data field to carry the user identifier of the user associated with the first electronic device, a second advertising data unit in the advertising data units of the second status information advertising packet uses the advertising data field to carry an identifier of a group to which the user associated with the first electronic device belongs, and the group to which the user associated with the first electronic device belongs includes the first group.

In some embodiments, when the wireless communications module sends the second status information advertising packet on the Bluetooth low energy advertising channel, the target user includes a user associated with a device in the first group.

With reference to the sixth aspect, in some embodiments, the content message advertising packet meets at least one of the following:

(1) A fifth advertising data unit in the advertising data units of the content message advertising packet uses the advertising data field to carry information used to indicate a structure of the content message advertising packet.

(2) A sixth advertising data unit in the advertising data units of the content message advertising packet uses the advertising data field to carry user information of the user associated with the first electronic device.

(3) A seventh advertising data unit in the advertising data units of the content message advertising packet uses the advertising data field to carry an identifier of an advertising packet obtained by the wireless communications module through scanning.

According to a seventh aspect, a computer readable storage medium is provided. The readable storage medium stores instructions, and when the instructions are run on a computer, the computer is enabled to perform the Bluetooth low energy-based communication method according to the first aspect.

According to an eighth aspect, a computer program product including instructions is provided. When the computer program product runs on a computer, the computer is enabled to perform the Bluetooth low energy-based communication method according to the first aspect.

According to a ninth aspect, a computer readable storage medium is provided. The readable storage medium stores instructions, and when the instructions are run on a computer, the computer is enabled to perform the Bluetooth low energy-based communication method according to the second aspect.

According to a tenth aspect, a computer program product including instructions is provided. When the computer program product runs on a computer, the computer is enabled to perform the Bluetooth low energy-based communication method according to the second aspect.

According to an eleventh aspect, a computer readable storage medium is provided. The readable storage medium stores instructions, and when the instructions are run on a computer, the computer is enabled to perform the Bluetooth low energy-based communication method according to the third aspect.

According to a twelfth aspect, a computer program product including instructions is provided. When the computer program product runs on a computer, the computer is enabled to perform the Bluetooth low energy-based communication method according to the third aspect.

According to the Bluetooth low energy-based communication method in this application, electronic devices can communicate with each other based on a Bluetooth low energy advertising mechanism, and the devices do not need to establish a connection and do not depend on a cellular network. This is convenient and fast, and therefore device power consumption is reduced.

DESCRIPTION OF EMBODIMENTS

The following describes technical solutions in the embodiments of this application with reference to the accompanying drawings in the embodiments of this application.

In descriptions of the embodiments of this application, "/" means "or" unless otherwise specified. For example, A/B may represent A or B. In this specification, "and/or" describes only an association for describing associated objects and represents that three relationships may exist. For example, A and/or B may represent the following three cases: Only A exists, both A and B exist, and only B exists. In addition, in the descriptions of the embodiments of this application, "a plurality of" means two or more.

The following terms "first" and "second" are merely intended for a purpose of descriptions, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more Embodiments of this application provide a Bluetooth low energy-based communication method and a related apparatus. Electronic devices do not need to establish a connection, and can communicate with each other by using a Bluetooth technology-based advertising mechanism. In this application, the electronic devices can also communicate with each other without a cellular network.

Figure 1:
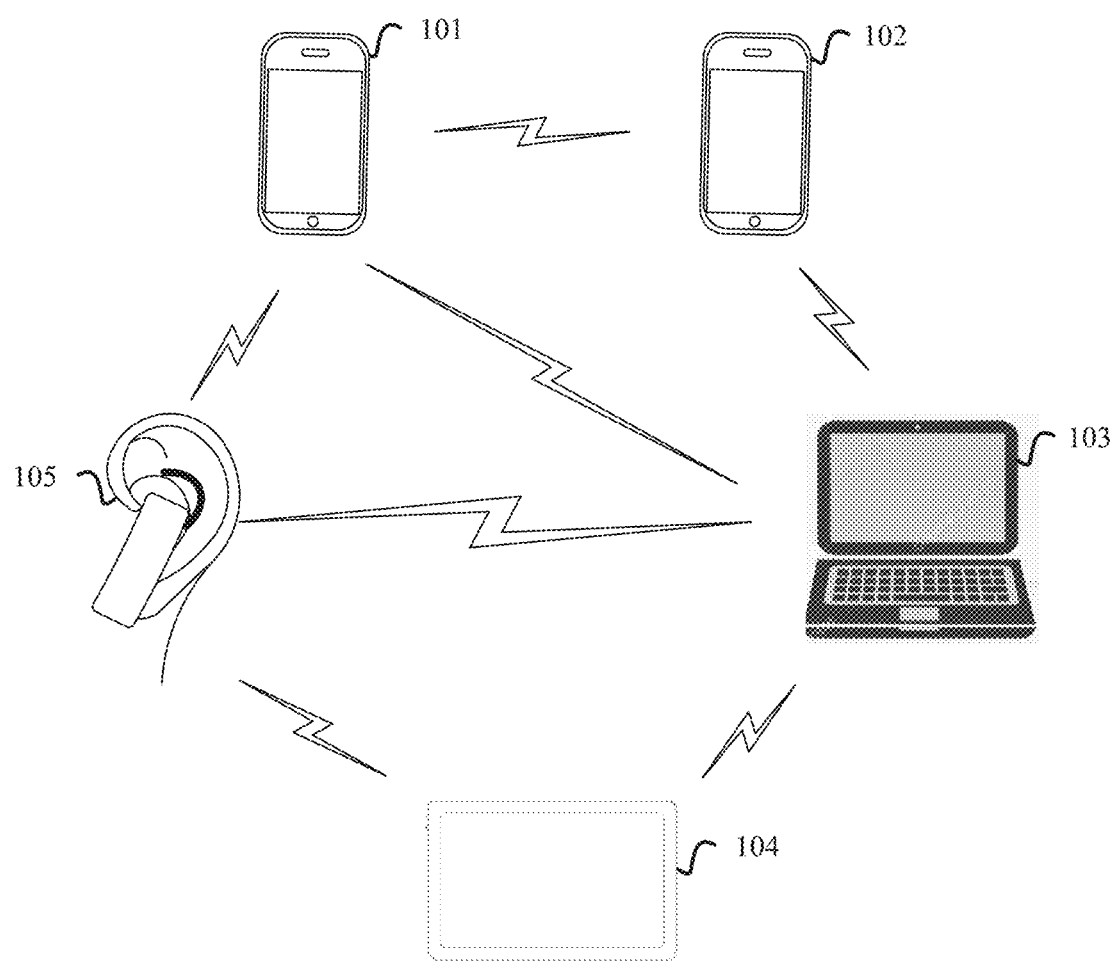
FIG. 1 shows a wireless communications system according to this application.

A wireless communications system provided in the embodiments of this application is first described. FIG. 1 shows a wireless communications system according to an embodiment of this application. The wireless communications system performs communication by using a BLE/LE technology-based advertising mechanism. BLE is proposed by the Bluetooth special interest group (Bluetooth special interest group, SIG), and can work in a free frequency band 2.4 GHz to 2.485 GHz that does not require authentication. Table 1 is a schematic table of channels into which a BLE operating frequency band is divided. As shown in Table 1, a 2.4 G frequency band is divided into 40 channels based on every 2 M bandwidths, including three advertising channels (that is, channels 37, 38, and 39) and 37 data channels. In this embodiment of this application, the three advertising channels may be referred to as BLE advertising channels. The wireless communications system in this embodiment of this application sends and/or scans for an advertising packet on the three BLE advertising channels, to implement communication between devices.

TABLE 1

| Channel (RF channel) | Center frequency (RF center frequency) | Channel type (channel type) | Data channel index (data channel index) | Advertising channel index (advertising channel index) |
|---|---|---|---|---|
| 0 | 2402 MHz | Advertising channel (advertising channel) | | 37 |
| 1 | 2404 MHZ | Data channel (data channel) | 0 | |
| 2 | 2406 MHz | Data channel | 1 | |
| ... | ... | ... | ... | |
| 11 | 2424 MHz | Data channel | 10 | |
| 12 | 2426 MHz | Advertising channel | | 38 |
| 13 | 2428 MHz | Data channel | 11 | |
| 14 | 2430 MHz | Data channel | 12 | |
| ... | ... | ... | ... | |
| 38 | 2478 MHz | Data channel | 36 | |
| 39 | 2480 MHz | Advertising channel | | 39 |

It may be understood that because a Bluetooth technology does not need to depend on a base station or another access point, data exchange can be directly performed between electronic devices in the wireless communications system shown in FIG. 1, to implement efficient communication.

The BLE mentioned in this embodiment of this application may be BT4.0, BT4.1. BT4.2, or BT5.0 proposed by the SIG, or BLE in a Bluetooth version that may be proposed in future. The BLE can be used to prolong a battery life of a device, to implement low power consumption communication.

In some embodiments, the wireless communications system shown in FIG. 1 may support long range (long range) communication. For example, an electronic device in a BT5.0-based wireless communications system may communicate with another electronic device within a range of 500 meters to 1000 meters.

In some embodiments, the wireless communications system shown in FIG. 1 supports a physical layer in operating at a relatively high symbol rate, to implement high-rate data transmission. For example, the BT5.0-based wireless communications system may transmit data at a symbol rate of 2 Mbps.

As shown in FIG. 1, the wireless communications system in this embodiment of this application may include a plurality of electronic devices. Each electronic device may communicate with another electronic device in the wireless communications system based on the BLE. A type of the electronic device is not specifically limited in this embodiment of this application. The electronic device may be a portable electronic device such as a mobile phone, a tablet computer, a personal digital assistant (personal digital assistant, PDA), a wearable device (for example, a Bluetooth headset), or a laptop (laptop) computer; or may be a non-portable electronic device such as a desktop computer. For example, the electronic device includes but is not limited to an electronic device using iOS. Android, Microsoft, or another operating system.

Figure 2:
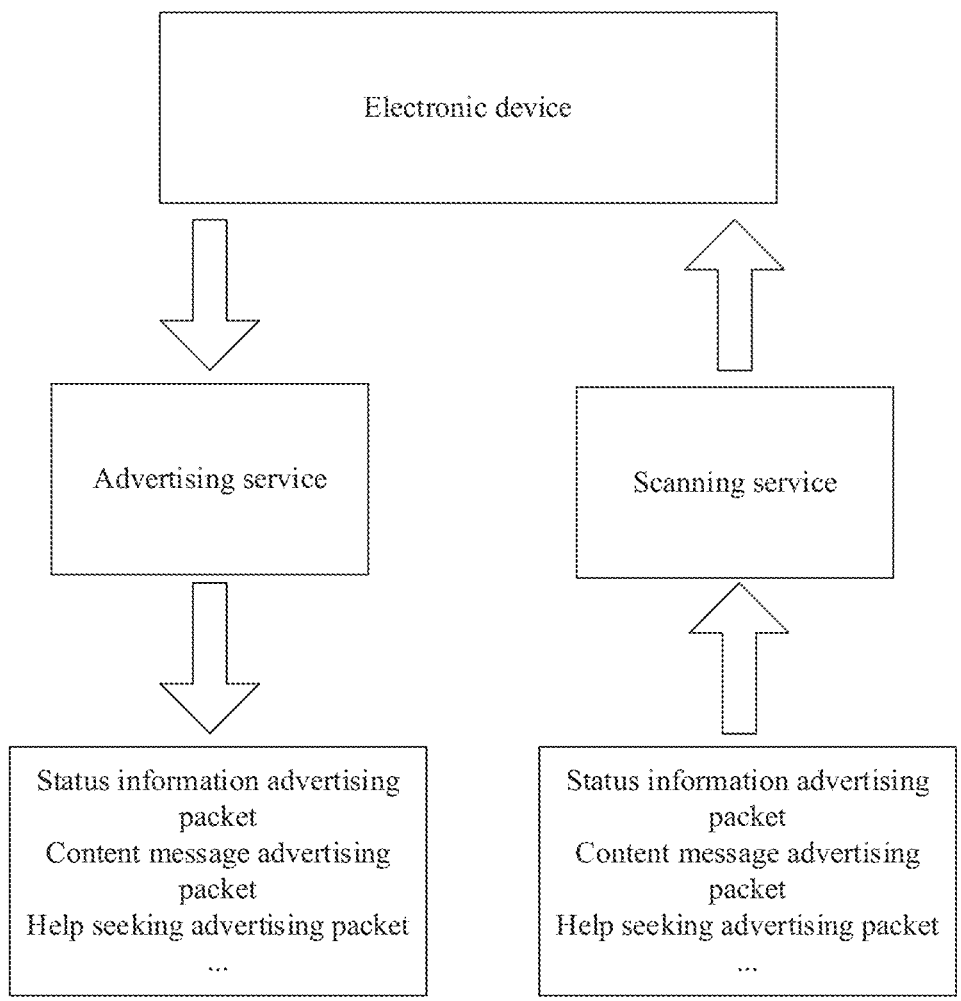
FIG. 2 is a schematic diagram of a service provided by an electronic device based on Bluetooth low energy according to this application.

The electronic devices in this embodiment of this application may communicate with each other based on the BLE advertising mechanism. Referring to FIG. 2, an electronic device in an embodiment of this application may provide two BLE-based services: an advertising (advertising) service and a scanning (scanning) service.

For the BLE-based advertising service, the electronic device may send a BLE advertising packet on a BLE advertising channel. For the BLE-based scanning service, the electronic device may scan, on the BLE advertising channel, for a BLE advertising packet sent by another electronic device. Herein, the BLE advertising packet sent by the electronic device or obtained by the electronic device through scanning may include a help seeking advertising packet, a status information advertising packet, a content message advertising packet, or the like provided in this embodiment of this application.

In this embodiment of this application, an electronic device that sends a BLE advertising packet may be referred to as an advertiser (advertiser), and an electronic device that scans for a BLE advertising packet may be referred to as a scanner (scanner).

The following describes in detail specific formats and functions of various advertising packets provided in the embodiments of this application.

Figure 3:
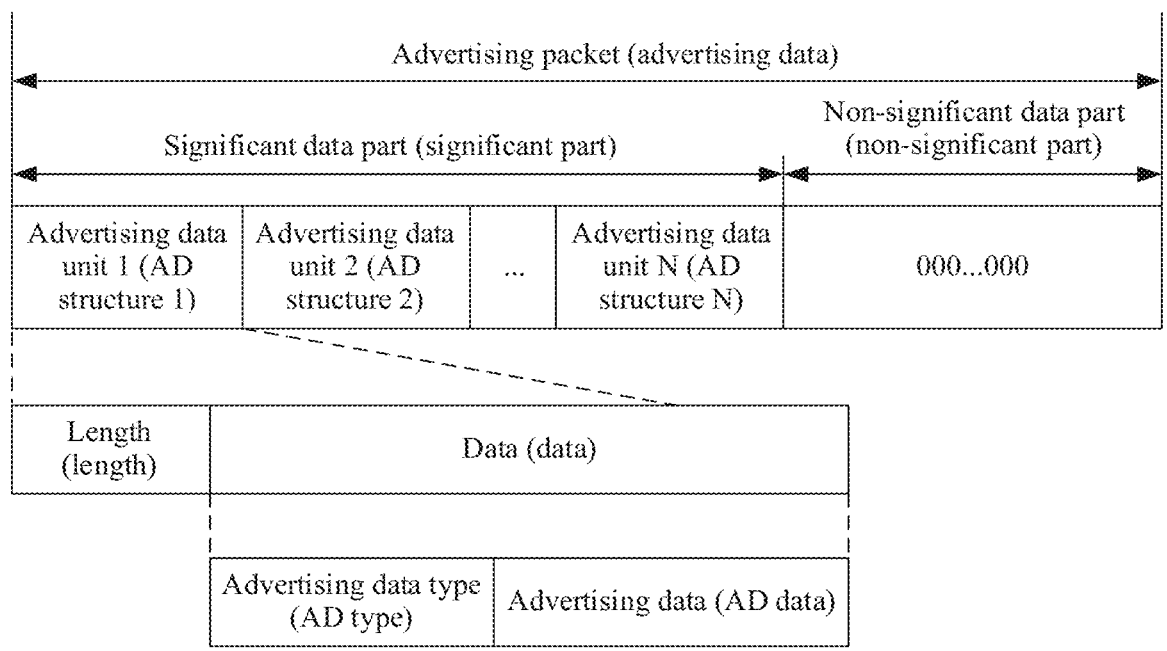
FIG. 3 to FIG. 6 each are a schematic structural diagram of a Bluetooth low energy advertising packet according to an embodiment of this application.

For example, FIG. 3 shows a structure of a BLE advertising packet according to an embodiment of this application. As shown in FIG. 3, the BLE advertising packet includes a significant data part (significant part) and a non-significant data part (non-significant part), and the significant data part includes one or more advertising data units (AD structure). The advertising data unit includes a length (length) part and a data (data) part, the length part is used to indicate a length of the data part, and the data part includes an advertising data (AD data) field and an advertising data type (AD type) field. The advertising data field is used to carry advertising data, and the advertising data type field is used to indicate a type of the advertising data. It may be understood that a length of the BLE advertising packet is 31 bytes (byte). If a length of the significant data part is less than 31 bytes, 0 is used for padding, and this part of data is non-significant data.

The various advertising packets provided in the embodiments of this application include different advertising data units, and advertising data fields in the advertising data units carry different advertising data. Details are described below.

1. Status Information Advertising Packet

In this embodiment of this application, the status information advertising packet is used by an advertiser that sends the status information advertising packet to announce basic information of the advertiser within an effective BLE range (for example, within 1000 meters). After obtaining, through scanning, a status information advertising packet sent by another electronic device, an electronic device may discover that there is another electronic device or another user within a specific range.

Figure 4:
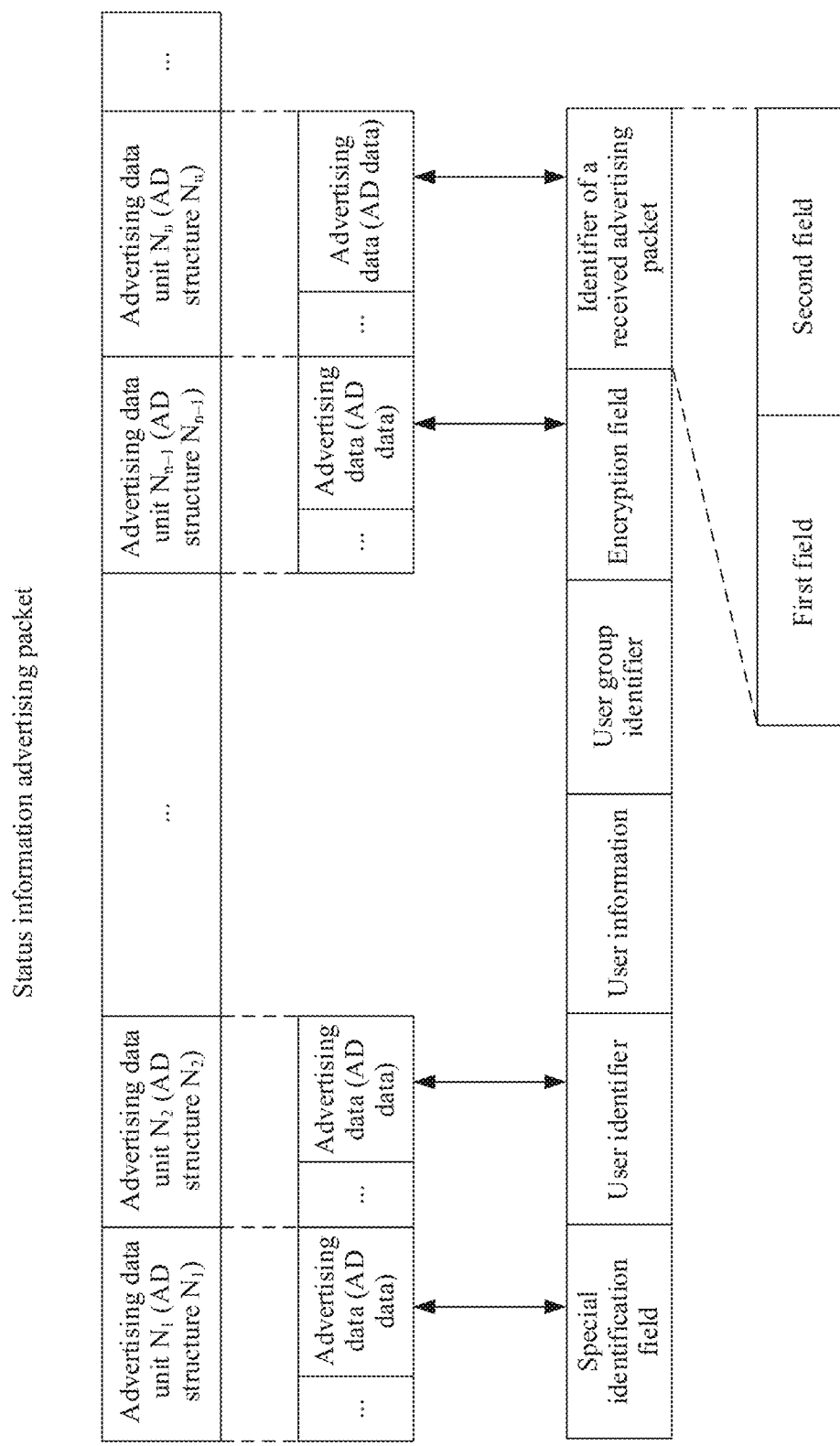

For example, FIG. 4 is a schematic structural diagram of a status information advertising packet according to an embodiment of this application. Each field in the status information advertising packet shown in FIG. 4 is the data (AD data) field in the advertising data unit of the BLE advertising packet shown in FIG. 3. As shown in FIG. 4, fields and data fields in the status information advertising packet are in a one-to-one correspondence. In other words, one field corresponds to one data field. For example, an advertising data field in an advertising data unit $N_1$ is configured as a special identification field, an advertising data field in an advertising data unit $N_2$ is configured as a user identifier field, an advertising data field in an advertising data unit $N_{n-1}$ is configured as an encryption field, and an advertising data field in an advertising data unit $N_n$ is configured as an identifier field of a received advertising packet.

As shown in FIG. 4, in this embodiment of this application, the status information advertising packet includes a user identifier field. In some embodiments, the status information advertising packet may further include an identifier field of a received advertising packet. In some embodiments, the status information advertising packet may further include at least one of the following: a special identification field, a user information field, a user group identifier field, or an encryption field. The following describes all fields in the status information advertising packet in detail.

(1) User Identifier Field

The status information advertising packet in this embodiment of this application includes the user identifier field. The user identifier field carries a user identifier of a user associated with an advertiser, and is used to indicate the user associated with the advertiser. The user associated with the advertiser may be a user corresponding to user-related information stored in the advertiser. The user identifier may be information that can indicate a unique user, such as a user account or an identity card number. The user identifier may be pre-stored in the electronic device.

(2) Identifier Field of a Received Advertising Packet

In some embodiments of this application, the status information advertising packet may further include the identifier field of the received advertising packet. The identifier field of the received advertising packet carries an identifier of an advertising packet obtained by an advertiser through scanning, and is used to indicate the advertising packet obtained by the advertiser through scanning. The advertising packet obtained by the advertiser through scanning may include the status information advertising packet, the content message advertising packet, and the help seeking advertising packet mentioned in the embodiments of this application.

In this embodiment of this application, devices communicate with each other on a BLE advertising channel, and do not establish a connection. When the devices communicate with each other on the BLE advertising channel, it needs to be ensured that an advertising packet (for example, a content message advertising packet) carrying communication content is correctly delivered. In a possible implementation, whether the advertising packet is correctly delivered may be determined based on a feedback from a party that receives the advertising packet.

Descriptions are provided by using an example in which an electronic device 101 communicates with an electronic device 102. When sending a status information advertising packet, the electronic device 101 may use an identifier field that is of a received advertising packet and that is in the status information advertising packet to carry an identifier of the received advertising packet, to notify another device (for example, the electronic device 102) of an advertising packet obtained by the electronic device 101 through scanning. Correspondingly, after obtaining, through scanning, the status information advertising packet advertised by the electronic device 101, the electronic device 102 may determine, based on the identifier that is of the received advertising packet and that is in the status information advertising packet, specific advertising packets received by the electronic device 101.

In some embodiments, the identifier field of the received advertising packet may include a first field and a second field. The first field is used to indicate an advertising packet that is obtained by the advertiser through scanning and that carries spam information, and the second field is used to indicate another advertising packet obtained by the advertiser through scanning. Specifically, when the advertiser obtains, through scanning, the advertising packet that carries the spam information, the first field may carry an identifier of the advertising packet that carries the spam information. When the advertiser does not obtain, through scanning, the advertising packet that carries the spam information, the first field may be padded with a special character (for example, 0). The second field may carry an identifier of the another advertising packet obtained by the advertiser through scanning. Herein, whether the advertising packet carries the spam information may be determined by the advertiser, or may be determined by a user of the advertiser. The spam information is useless to another user, and occupies a small quantity of advertising channels. The spam information may include an advertisement, harassment information, fraud information, and the like.

(3) Special Identification Field

In some embodiments of this application, the status information advertising packet may further include the special identification field. The special identification field is used to indicate a structure of the status information advertising packet, and carries information used to indicate the structure of the status information advertising packet. A device that receives the status information advertising packet may parse the status information advertising packet based on the special identification field. The information indicating the structure of the advertising packet and the structure that is of the status information advertising packet and that is indicated by the special identification field are pre-stored in each electronic device, or are obtained by each electronic device through a network.

For example, assuming that the special identification field carries "000001", and the structure that is of the status information advertising packet and that is indicated by the special identification field is shown in FIG. 4, the device that receives the status information advertising packet may parse the status information advertising packet based on the structure shown in FIG. 4, to obtain the information carried in the status information advertising packet.

(4) User Information Field

In some embodiments of this application, the status information advertising packet may further include the user information field. The user information field carries user information. The user information is related information of a user associated with an advertiser other than a user identifier, for example, a nickname, a name, and a profile picture of the user associated with the advertiser. The user information may be pre-stored in the electronic device.

(5) User Group Identifier Field

In some embodiments of this application, the status information advertising packet may further include the user group identifier field. The user group identifier field carries an identifier of a group to which a user associated with an advertiser belongs, and is used to indicate the group to which the user associated with the advertiser belongs. There may be one or more groups to which the user associated with the advertiser belongs.

The electronic device may create a new group, and add an identifier (for example, an ID) of the newly created group to a user group identifier field in a status information advertising packet to be sent next time.

Alternatively, the electronic device may discover a group within a specific range by scanning for a status information advertising packet sent by another device, and add an identifier (for example, an ID) of a group that the electronic device expects to join to a user group identifier field in a status information advertising packet to be sent next time, so as to join the group.

In this embodiment of this application, the electronic device or the user associated with the electronic device determines whether to create or join a group, and independently maintains group information, and no administrator manages the group. One group may include one or more electronic devices.

(6) Encryption Field

In some embodiments of this application, the status information advertising packet may further include the encryption field. The encryption field is used to carry a public key of an advertiser. The electronic device adds the encryption field to the status information advertising packet. In other words, the electronic device discloses the public key of the electronic device. If a device that receives the status information advertising packet expects to send a message to the electronic device and does not expect another electronic device to parse the message, the device may encrypt the message by using the public key.

For example, an electronic device 101 uses an encryption field in a to-be-sent status information advertising packet to carry a public key of the electronic device 101, so that both an electronic device 102 and an electronic device 103 can obtain the status information advertising packet through scanning. After receiving the status information advertising packet, the electronic device 102 may send, to the electronic device 101 through an advertising channel, a content message advertising packet encrypted by using the public key. Both the electronic device 101 and the electronic device 103 can obtain the encrypted content message advertising packet through scanning, but only the electronic device 101 can decrypt the content message advertising packet by using a private key of the electronic device 101 to obtain information carried in the content message advertising packet, and the electronic device 103 cannot parse the content message advertising packet.

It may be understood that the electronic device pre-stores the public key and the private key of the electronic device. After the electronic device encrypts the advertising packet by using the public key, only an electronic device that has a private key paired with the public key can parse the advertising packet. Based on the encryption field, directional transmission can be implemented based on the advertising channel, to ensure information security in a communication process.

In this embodiment of this application, in the status information advertising packet, an advertising data unit including the user identifier field may be referred to as a first advertising data unit, an advertising data unit including the identifier field of the received advertising packet may be referred to as a second advertising data unit, an advertising data unit including the special identification field may be referred to as a third advertising data unit, an advertising data unit including the user information field may be referred to as a fourth advertising data unit, an advertising data unit including the user group identifier field may be referred to as a fifth advertising data unit, and an advertising data unit including the encryption field may be referred to as a sixth advertising data unit.

2. Content Message Advertising Packet

In this embodiment of this application, the content message advertising packet is used by an electronic device to transmit a message to another electronic device within an effective BLE range (for example, within 1000 meters).

Figure 5:
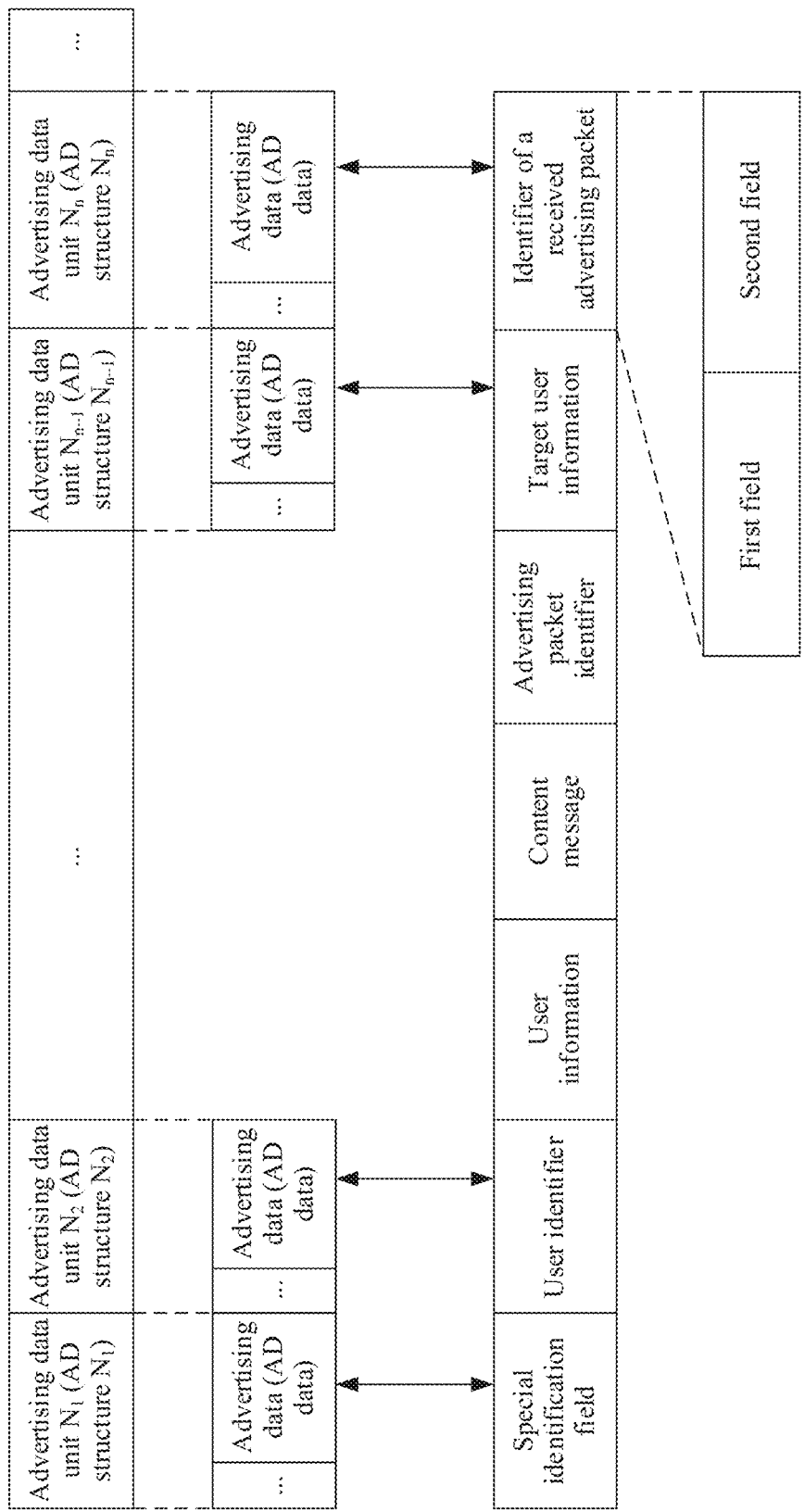

For example, FIG. 5 is a schematic structural diagram of a content message advertising packet according to an embodiment of this application. Each field in the content message advertising packet shown in FIG. 5 is the data (AD data) field in the advertising data unit of the BLE advertising packet shown in FIG. 3. As shown in FIG. 5, fields and data fields in the content message advertising packet are in a one-to-one correspondence. In other words, one field corresponds to one data field.

As shown in FIG. 5, in this embodiment of this application, the content message advertising packet includes a user identifier field, a content message field, an advertising packet identifier field, and a target user information field. In some embodiments, the content message advertising packet may further include an identifier field of a received advertising packet. In some embodiments, the content message advertising packet may further include at least one of the following: a special identification field and a user information field. The following describes all fields in the content message advertising packet in detail.

(1) User Identifier Field

The content message advertising packet in this embodiment of this application includes the user identifier field. The user identifier field is the same as the user identifier in the status information advertising packet. For details, refer to the related descriptions.

(2) Content Message Field

The content message advertising packet in this embodiment of this application includes the content message field. The content message field carries a content message, and the content message is content expected to be sent by an advertiser to a target user, namely, valid communication content. The content message may include a text, a speech, a picture, or the like.

(3) Target User Information Field

The content message advertising packet in this embodiment of this application includes the target user information field. The target user information field carries information about a target user with which an advertiser expects to communicate. The information about the target user may be a user account, a nickname, a name, or the like. The information about the target user may be obtained by the electronic device from a user identifier field or a user information field in a status information advertising packet obtained through scanning.

(4) Advertising Packet Identifier Field

In some embodiments of this application, the content message advertising packet may further include the advertising packet identifier field. The advertising packet identifier field carries an identifier of the content message advertising packet, and is used to indicate the content message advertising packet.

(5) Identifier Field of a Received Advertising Packet

In some embodiments of this application, the content message advertising packet may further include the identifier field of the received advertising packet. The identifier field of the received advertising packet is the same as the identifier field that is of the received advertising packet and that is in the status information advertising packet. For details, refer to the related descriptions.

(6) Special Identification Field

In some embodiments of this application, the content message advertising packet may further include the special identification field. The special identification field is used to indicate a structure of the content message advertising packet, and carries information used to indicate the structure of the content message advertising packet. A device that receives the content message advertising packet may parse the content message advertising packet based on the special identification field. The information indicating the structure of the advertising packet and the structure that is of the advertising packet and that is indicated by the special identification field are pre-stored in each electronic device, or are obtained by each electronic device through a network.

For example, assuming that the special identification field is "000002", and the structure that is of the content message advertising packet and that is indicated by the special identification field is shown in FIG. 5, the device that receives the content message advertising packet may parse the content message advertising packet based on the structure shown in FIG. 5.

(7) User Information Field

In some embodiments of this application, the content message advertising packet may further include the user information field. The user information field is the same as the user information field in the status information advertising packet. For details, refer to the related descriptions.

In this embodiment of this application, in the content message advertising packet, an advertising data unit including the user identifier field may be referred to as a first advertising data unit, an advertising data unit including the target user information field may be referred to as a second advertising data unit, an advertising data unit including the content message field may be referred to as a third advertising data unit, an advertising data unit including the advertising packet identifier field may be referred to as a fourth advertising data unit, an advertising data unit including the special identification field may be referred to as a fifth advertising data unit, an advertising data unit including the user information field may be referred to as a sixth advertising data unit, and an advertising data unit including the identifier field of the received advertising packet may be referred to as a seventh advertising data unit.

3. Help Seeking Advertising Packet

In this embodiment of this application, the help seeking advertising packet is used by a user to seek help from another user within an effective BLE range (for example, within 1000 meters).

Figure 6:
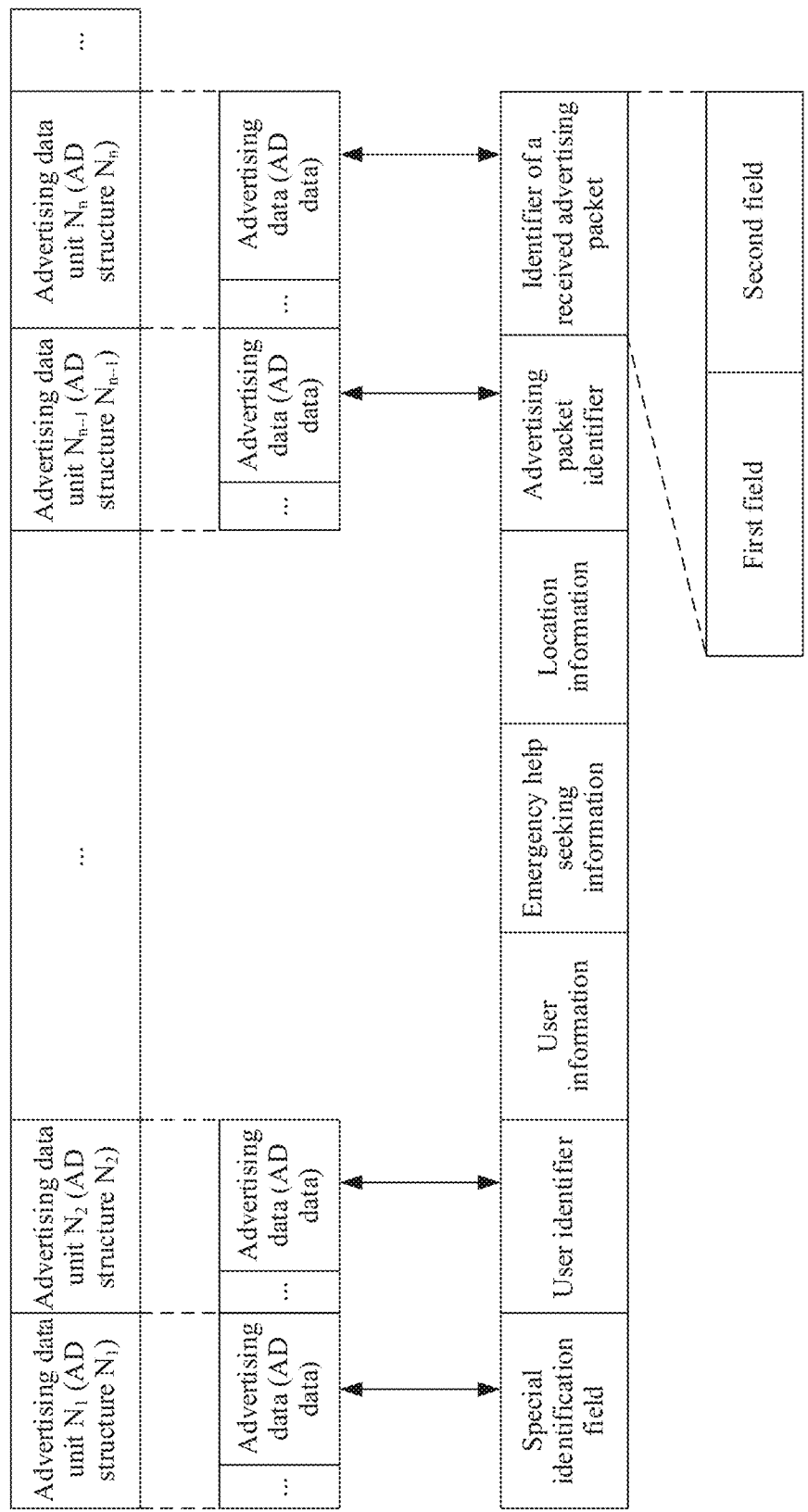

For example, FIG. 6 shows a structure of a help seeking advertising packet according to an embodiment of this application. Each field in the help seeking advertising packet shown in FIG. 6 is the data (AD data) field in the advertising data unit of the BLE advertising packet shown in FIG. 3. As shown in FIG. 6, fields and data fields in the help seeking advertising packet are in a one-to-one correspondence. In other words, one field corresponds to one data field.

As shown in FIG. 6, in this embodiment of this application, the help seeking advertising packet includes an emergency help seeking information field. In some embodiments, the help seeking advertising packet may further include a location information field. In some embodiments, the help seeking advertising packet may further include at least one of the following: a special identification field, a user identifier field, a user information field, an advertising packet identifier field, and an identifier field of a received advertising packet. The following describes in detail all fields included in the help seeking advertising packet.

(1) Emergency Help Seeking Information Field

The help seeking advertising packet in this embodiment of this application includes the emergency help seeking information field. The emergency help seeking information field carries emergency help seeking information, and is used by a user to seek help from another user within a specific range. The emergency help seeking information may include but is not limited to a text, a speech, a picture, a video, or the like.

(2) Location Information Field

In some embodiments of this application, the help seeking advertising packet may further include a location information field. The location information field carries current location information of an advertiser. The location information may include but is not limited to longitude and latitude coordinates, an altitude, and a geographical location name. The location information may be obtained by the advertiser through global navigation satellite system (for example, GPS) positioning, base station positioning, Wi-Fi positioning, barometric pressure sensor measurement, or the like.

It may be understood that the location information field reflects a current location of the advertiser. Therefore, when the location of the advertiser changes, the location information carried in the location information field is updated in real time.

(3) Special Identification Field

In some embodiments of this application, the help seeking advertising packet may further include the special identification field. The special identification field is used to indicate a structure of the help seeking advertising packet, and carries information used to indicate the structure of the help seeking advertising packet. A device that receives the help seeking advertising packet may parse the help seeking advertising packet based on the special identification field. The information indicating the structure of the advertising packet and the structure that is of the help seeking advertising packet and that is indicated by the special identification field are pre-stored in each electronic device, or are obtained by each electronic device through a network.

For example, assuming that the special identification field is "000003", and the structure that is of the help seeking advertising packet and that is indicated by the special identification field is shown in FIG. 6, the device that receives the help seeking advertising packet may parse the help seeking advertising packet based on the structure shown in FIG. 6.

(4) User Identifier Field

In some embodiments of this application, the help seeking advertising packet may further include the user identifier field. The user identifier field is the same as the user identifier field in the status information advertising packet. For details, refer to the related descriptions.

(5) User Information Field

In some embodiments of this application, the help seeking advertising packet may further include the user information field. The user information field is the same as the user information field in the status information advertising packet. For details, refer to the related descriptions.

(6) Advertising Packet Identifier Field

In some embodiments of this application, the help seeking advertising packet may further include the advertising packet identifier field. The advertising packet identifier field is similar to the advertising packet identifier field in the content message advertising packet, and is used to indicate the help seeking advertising packet. For details, refer to the related descriptions.

In some embodiments, when an advertiser advertises a plurality of same help seeking advertising packets, the plurality of help seeking advertising packets carry a same advertising packet identifier. Herein, the plurality of same help seeking advertising packets may mean that the plurality of help seeking advertising packets include a same field, and emergency help seeking information fields carry same emergency help seeking information.

(7) Identifier Field of a Received Advertising Packet

In some embodiments of this application, the help seeking advertising packet may further include the identifier field of the received advertising packet. The identifier field of the received advertising packet is the same as the identifier field that is of the received advertising packet and that is in the status information advertising packet. For details, refer to the related descriptions.

In this embodiment of this application, in the help seeking advertising packet, an advertising data unit including the emergency help seeking information field may be referred to as a first advertising data unit, an advertising data unit including the location information field may be referred to as a second advertising data unit, an advertising data unit including the user identifier field may be referred to as a third advertising data unit, an advertising data unit including the user information field may be referred to as a fourth advertising data unit, an advertising data unit including the special identification field may be referred to as a fifth advertising data unit, an advertising data unit including the advertising packet identifier field may be referred to as a sixth advertising data unit, and an advertising data unit including the identifier field of the received advertising packet may be referred to as a seventh advertising data unit.

Figure 7:
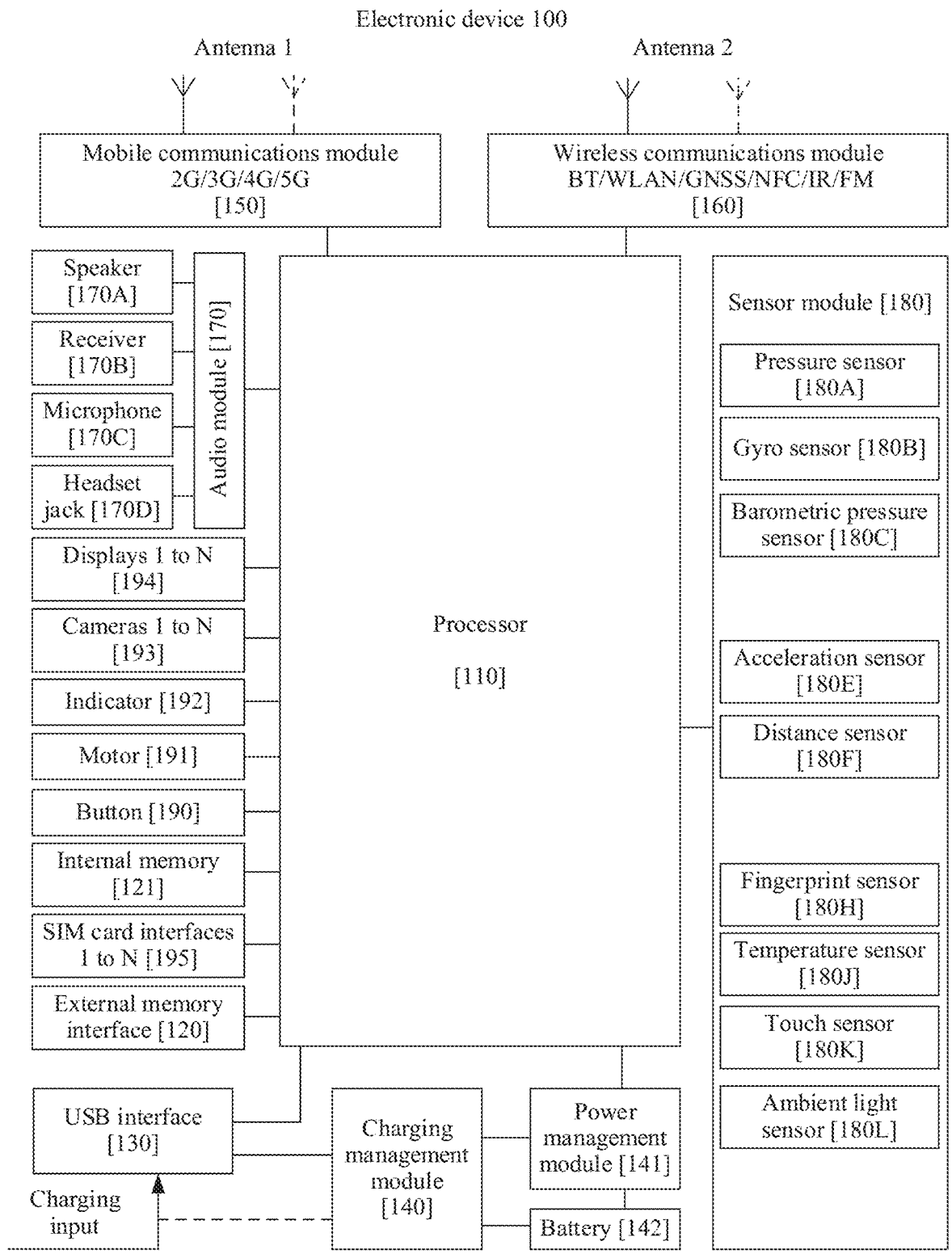
FIG. 7 is a schematic structural diagram of an electronic device according to this application.

The following describes a structure of an electronic device in embodiments of this application. FIG. 7 is a schematic structural diagram of an electronic device 100 according to an embodiment of this application. The electronic device 100 may be the electronic device in the wireless communications system shown in FIG. 1.

As shown in the figure, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, an acceleration sensor 180E, a distance sensor 180F, a fingerprint sensor 180H, a temperature sensor 180J, a touch sensor 180K, an ambient light sensor 180L, and the like.

It may be understood that the structure shown in the embodiments of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency. In this embodiment of this application, the memory stores an instruction that enables the electronic device to perform the BLE-based communication method provided in the embodiments of this application. For the BLE-based communication method provided in this application, refer to related descriptions in subsequent embodiments. In some embodiments of this application, the memory may further store emergency help seeking information that is preset by a user.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using the Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface. CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, may be configured to transmit data between the electronic device 100 and a peripheral device, or may be configured to connect to a headset to play audio by using the headset. Alternatively, the interface may be configured to connect to another electronic device, for example, an AR device.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to increase antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2 G/3 G/4 G/5 G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some functional modules in the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication. NFC) technology, an infrared (infrared, IR) technology, or the like and that is applied to the electronic device 100. The wireless communications module 160 may be one or more components integrated into at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation. In this embodiment of this application, the electronic device 100 supports BLE, and may communicate with another device based on BLE. The electronic device 100 may send or scan, on a BLE advertising channel, for a BLE advertising packet provided in this embodiment of this application, for example, a status information advertising packet, a content message advertising packet, or a help seeking advertising packet.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications. GSM), a general packet radio service (general packet radio service, GPRS), code division multiple access (code division multiple access, CDMA), wideband code division multiple access (wideband code division multiple access, WCDMA), time division-synchronous code division multiple access (time division-synchronous code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or satellite based augmentation systems (satellite based augmentation systems, SBAS). In some embodiments of this application, the electronic device may obtain location information of the electronic device 100 by using the wireless communications technology.

The electronic device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, quantum dot light emitting diodes (quantum dot light emitting diodes, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer executable program code. The executable program code includes instructions. The processor 110 runs the instructions stored in the internal memory 121 to perform various function applications of the electronic device 100 and process data. The internal memory 121 may include a program storage area and a data storage area. The program storage area may store an operating system, an application required by at least one function (for example, a sound playing function or an image playing function), and the like. The data storage area may store data (for example, audio data, a phone book, and the like) created in a process of using the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "horn", is configured to convert an electrical audio signal into a sound signal. The electronic device 100 may be configured to: listen to music or answer a hands-free call by using the speaker 170A.

The receiver 170B, also referred to as an "earpiece", is configured to convert an electrical audio signal into a sound signal. When a call is answered or speech information is received by using the electronic device 100, the receiver 170B may be put close to a human ear to receive a speech. In some embodiments of this application, the receiver may be configured to receive a speech that is input by the user and that is used to send a help seeking advertising packet.

The microphone 170C, also referred to as a "mike" or a "microphone", is configured to convert a sound signal into an electrical signal. When making a call or sending speech information, the user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal, reduce noise, identify a sound source, implement a directional recording function, and the like. In some embodiments of this application, the microphone may be configured to receive a speech that is input by the user and that is used to send a help seeking advertising packet.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed. In some embodiments of this application, the pressure sensor may be configured to detect a gesture that is input by the user and that is used to send a help seeking advertising packet.

The gyro sensor 180B may be configured to determine a motion posture of the electronic device 100. In some embodiments, an angular velocity of the electronic device 100 around three axes (namely; axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is applied to an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer a detected touch operation to the application processor, to determine a type of a touch event. The display 194 may provide a visual output related to the touch operation. In some other embodiments, the touch sensor 180K may alternatively be disposed on a surface of the electronic device 100 at a location different from that of the display 194.

The button 190 includes a power button, a volume button, and the like. The button 190 may be a mechanical button, or or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 can support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a micro-kernel architecture, a micro service architecture, or a cloud architecture. In an embodiment of this application, an Android system with a layered architecture is used as an example to describe a software structure of the electronic device 100.

Figure 8:
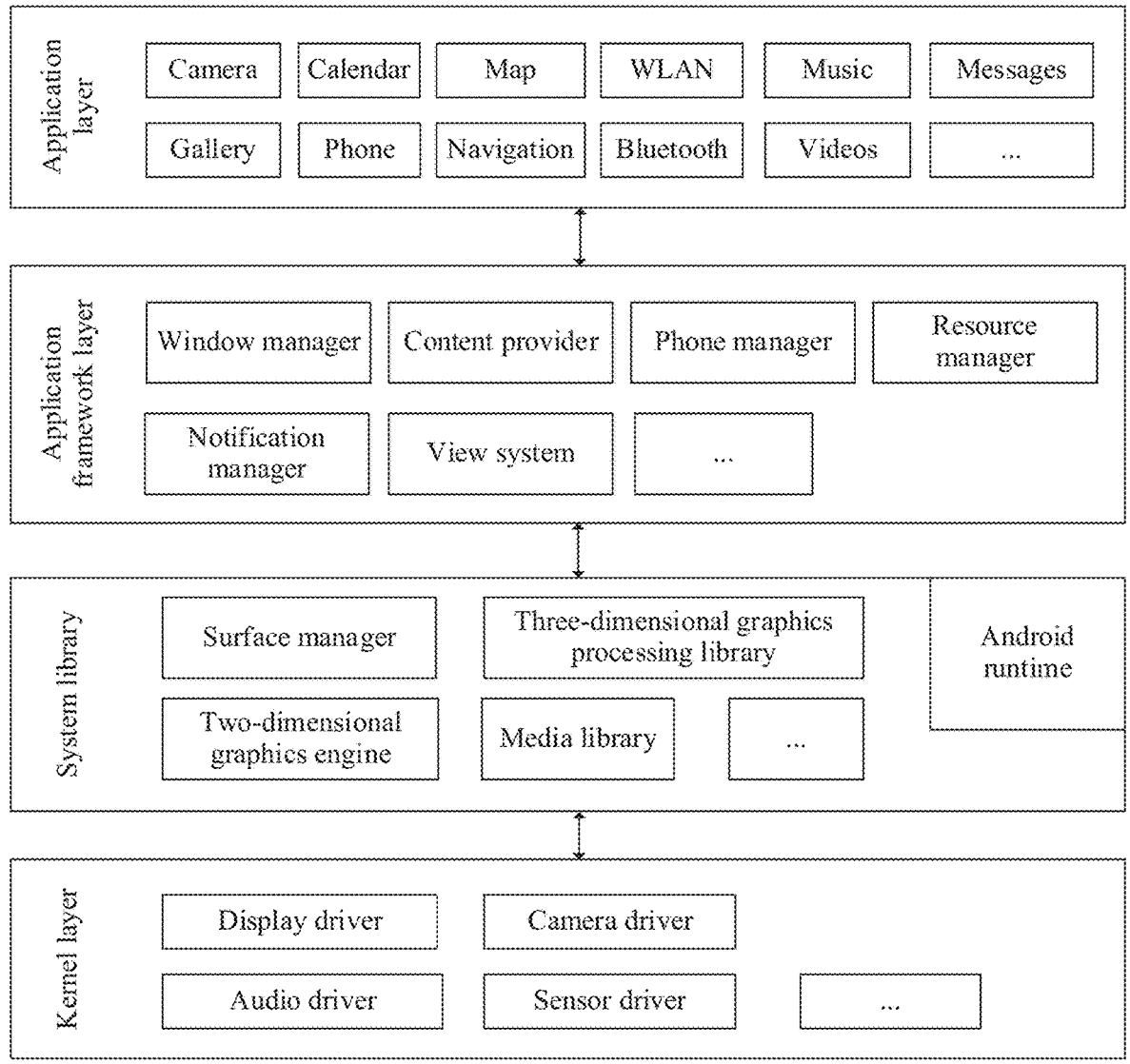
FIG. 8 is a block diagram of a software structure of an electronic device according to this application.

FIG. 8 is a block diagram of a software structure of the electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 8, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 8, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying a picture. The view system may be configured to construct an application. A display interface may include one or more views. For example, a display interface including a Messages notification icon may include a text display view and a picture display view.

The phone manager is configured to provide a communication function of the electronic device 100, for example, management of a call status (including answering or declining).

The resource manager provides various resources for an application, such as a localized character string, an icon, a picture, a layout file, and a video file.

The notification manager enables an application to display notification information in a status bar, and may be configured to convey a notification message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, a prompt tone is produced, the electronic device vibrates, or an indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing capture scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of a camera application icon. The camera application invokes an interface at the application framework layer to enable the camera application, then enables a camera driver by invoking the kernel layer, and captures a static image or a video through the camera 193.

The following describes, with reference to specific application scenarios based on the wireless communications system shown in FIG. 1, the advertising packets shown in FIG. 3 to FIG. 6, and the electronic device shown in FIG. 7, the BLE-based communication method provided in the embodiments of this application. According to the BLE-based communication method provided in the embodiments of this application, the electronic devices do not need to establish a connection, and may communicate with each other by using a BLE advertising mechanism.

Application scenario 1: When a user 1 is in a scenario in which a call for emergency help is required, the user 1 calls for help by using an electronic device 101. There are a plurality of scenarios in which the user 1 needs to call for emergency help, and the scenarios may include but are not limited to a case in which life safety/property safety of the user is threatened. For example, the user 1 encounters danger when taking a taxi, an express, or a ride, or going out for play.

In the embodiments of this application, when the user 1 is in the scenario in which the call for emergency help is required, the user 1 may input a specific user operation to the electronic device 101. When receiving the specific user operation, the electronic device 101 may send a help seeking advertising packet on a BLE advertising channel, to seek help from another user around the electronic device 101.

Figure 9:
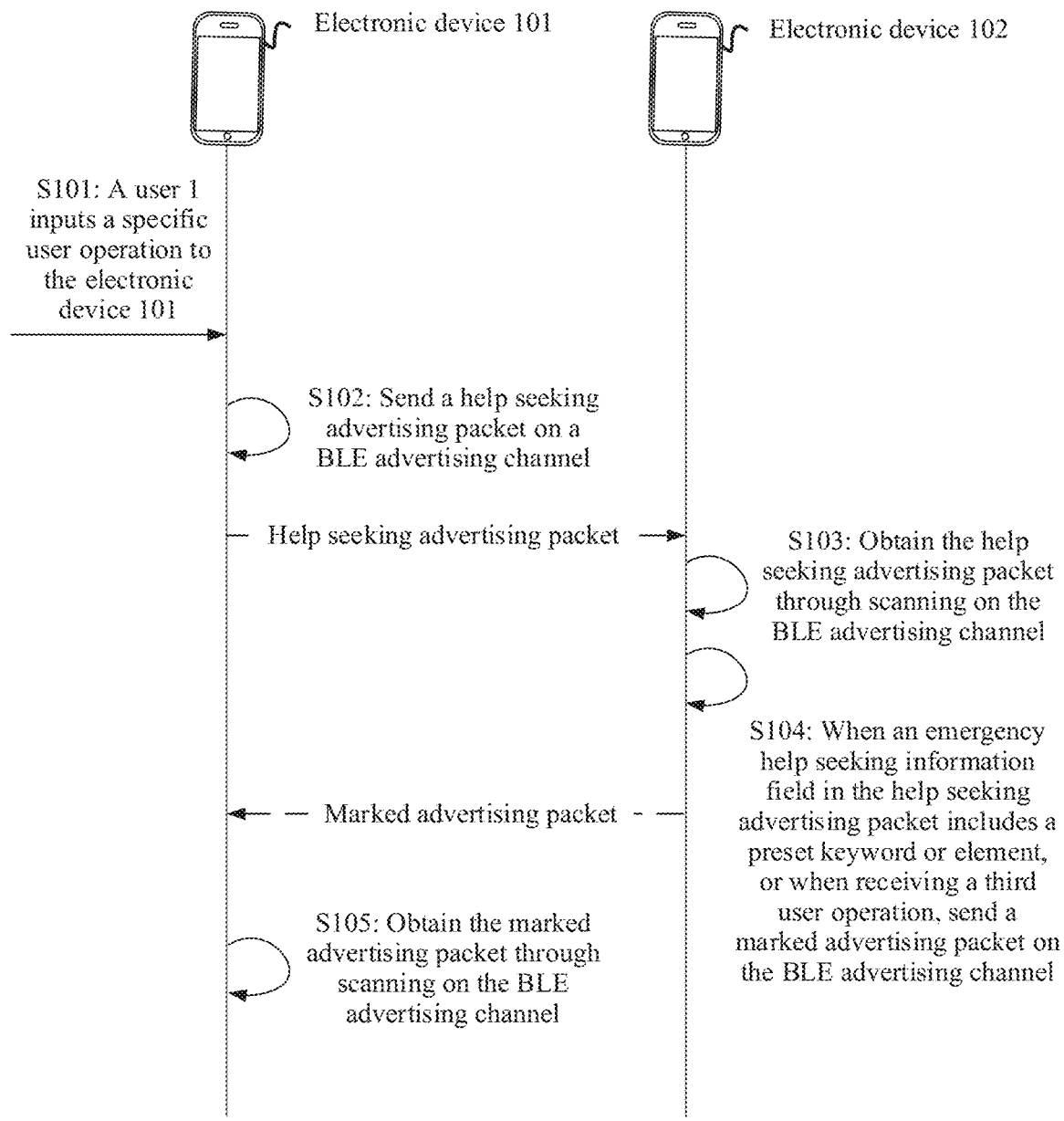
FIG. 9 is a schematic flowchart of a BLE-based communication method according to this application.

FIG. 9 is a schematic flowchart of a BLE-based communication method according to an embodiment of this application. The method may include the following steps.

Step S101: A user 1 inputs a specific user operation to an electronic device 101, where the specific user operation is used to trigger the electronic device 101 to send a help seeking advertising packet on a BLE advertising channel.

In this embodiment of this application, the specific user operation may include but is not limited to a gesture, a speech, an expression, and the like. The gestures include a gesture of directly touching a display of the electronic device 101 and a floating gesture of not directly touching the display. The expressions include a static expression and a dynamic expression. Descriptions are provided below by using examples.

1. In some embodiments of this application, the user 1 may trigger, by using a specific gesture, the electronic device 101 to send the help seeking advertising packet on the BLE advertising channel.

Figure 10:
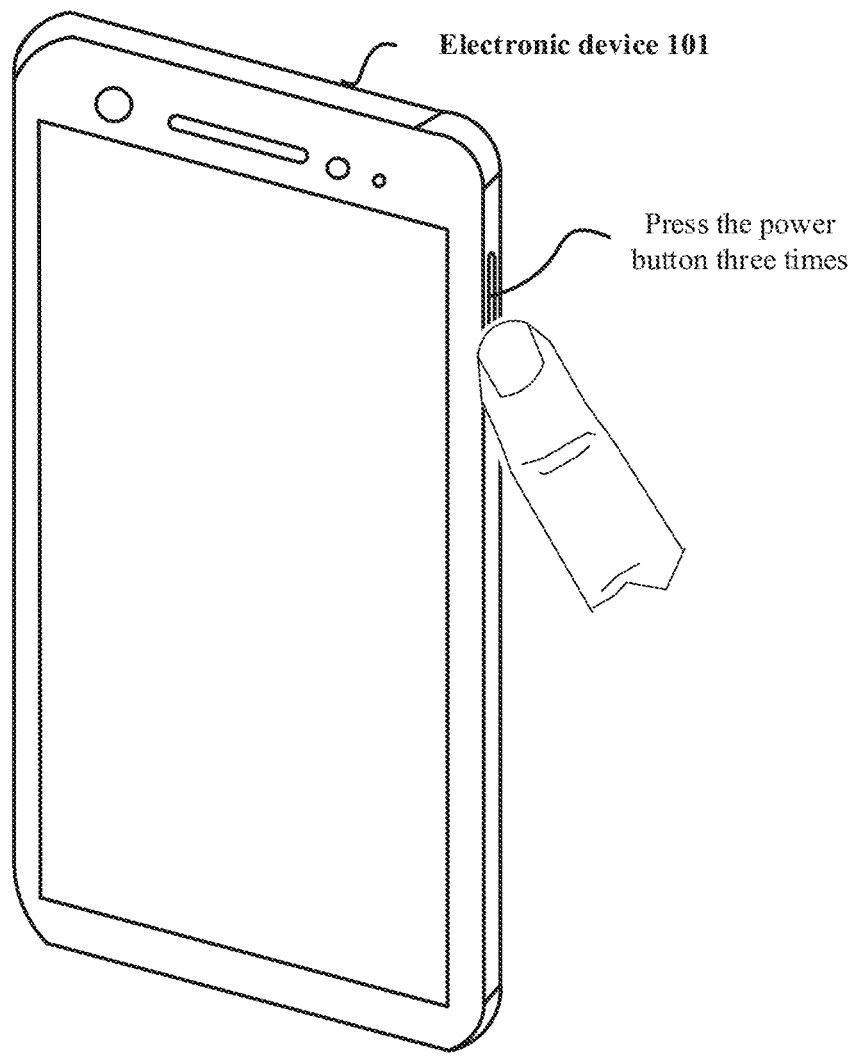
FIG. 10 to FIG. 13(a) to FIG. 13(c) each are a schematic diagram of human-computer interaction according to this application.

For example, referring to FIG. 10, the user 1 may continuously press a power button of the electronic device 101 three times, to trigger the electronic device 101 to send the help seeking advertising packet on the BLE advertising channel. Herein, when a screen of the electronic device 101 is turned off, turned on, locked, unlocked, or the like, the user 1 may continuously press the power button of the electronic device 101 three times, to trigger the electronic device 101 to send the help seeking advertising packet on the BLE advertising channel. This is not limited in this embodiment of this application. In a specific implementation, the electronic device 101 may obtain, by using a pressure sensor disposed at the power button, a continuous pressing operation that is input by the user 1. The continuous pressing means that an interval between every two pressing operations is less than a preset value (for example, 0.5 second).

In addition to the operation of continuously pressing the power button of the electronic device 101 three times shown in FIG. 10, in this embodiment of this application, another gesture may be used to trigger the electronic device 101 to send the help seeking advertising packet on the BLE advertising channel. For example, the user 1 may trigger, by using an operation of continuously pressing the power button of the electronic device 101 four times, shaking the electronic device 101 three times, continuously tapping the display of the electronic device 101 three times, or the like, the electronic device 101 to send the help seeking advertising packet on the BLE advertising channel.

2. In some other embodiments of this application, the user 1 may trigger, by using a speech including specific semantics, the electronic device 101 to send the help seeking advertising packet on the BLE advertising channel.

For example, the user 1 may input a speech "I am . I am in danger. Help!" to the electronic device 101, to trigger the electronic device 101 to send the help seeking advertising packet on the BLE advertising channel. Herein, when a screen of the electronic device 101 is turned off, turned on, locked, unlocked, or the like, the user 1 may input the speech, to trigger the electronic device 101 to send the help seeking advertising packet on the BLE advertising channel. This is not limited in this embodiment of this application. In a specific implementation, the electronic device 101 may collect, by using a microphone, the speech that is input by the user 1, and analyze semantics of the speech by using a processor. In some embodiments, to avoid accidental triggering, the electronic device 101 may further verify voiceprint information of the input speech. When the voiceprint information of the speech is consistent with pre-stored voiceprint information, the electronic device 101 determines that a current user has rights to use the electronic device 101**, and sends the help seeking advertising packet in response to the input speech.

In addition to the speech "I am . I am in danger. Help!" mentioned in the foregoing example, in this embodiment of this application, another speech may be used to trigger the electronic device 101 to send the help seeking advertising packet on the BLE advertising channel. For example, the user 1 may trigger, by using a speech such as "Help!" or "Danger!", the electronic device 101** to send the help seeking advertising packet on the BLE advertising channel.

It may be understood that the user operation used to trigger the electronic device 101 to send the help seeking advertising packet on the BLE advertising channel may alternatively be a combination of user operations. For example, the user 1 may input both a specific gesture and a speech that includes specific semantics to the electronic device 101, to trigger the electronic device 101 to send the help seeking advertising packet on the BLE advertising channel. For example, the user 1 may continuously tap the display of the electronic device 101 three times, and input the speech "Help!" to the electronic device 101, to trigger the electronic device 101 to send the help seeking advertising packet on the BLE advertising channel.

In this embodiment of this application, the user operation used to trigger the electronic device 101 to send the help seeking advertising packet on the BLE advertising channel may be set in the following several manners.

1. The user operation used to trigger the electronic device 101 to send the help seeking advertising packet on the BLE advertising channel may be set by the user.

Figure 11A:
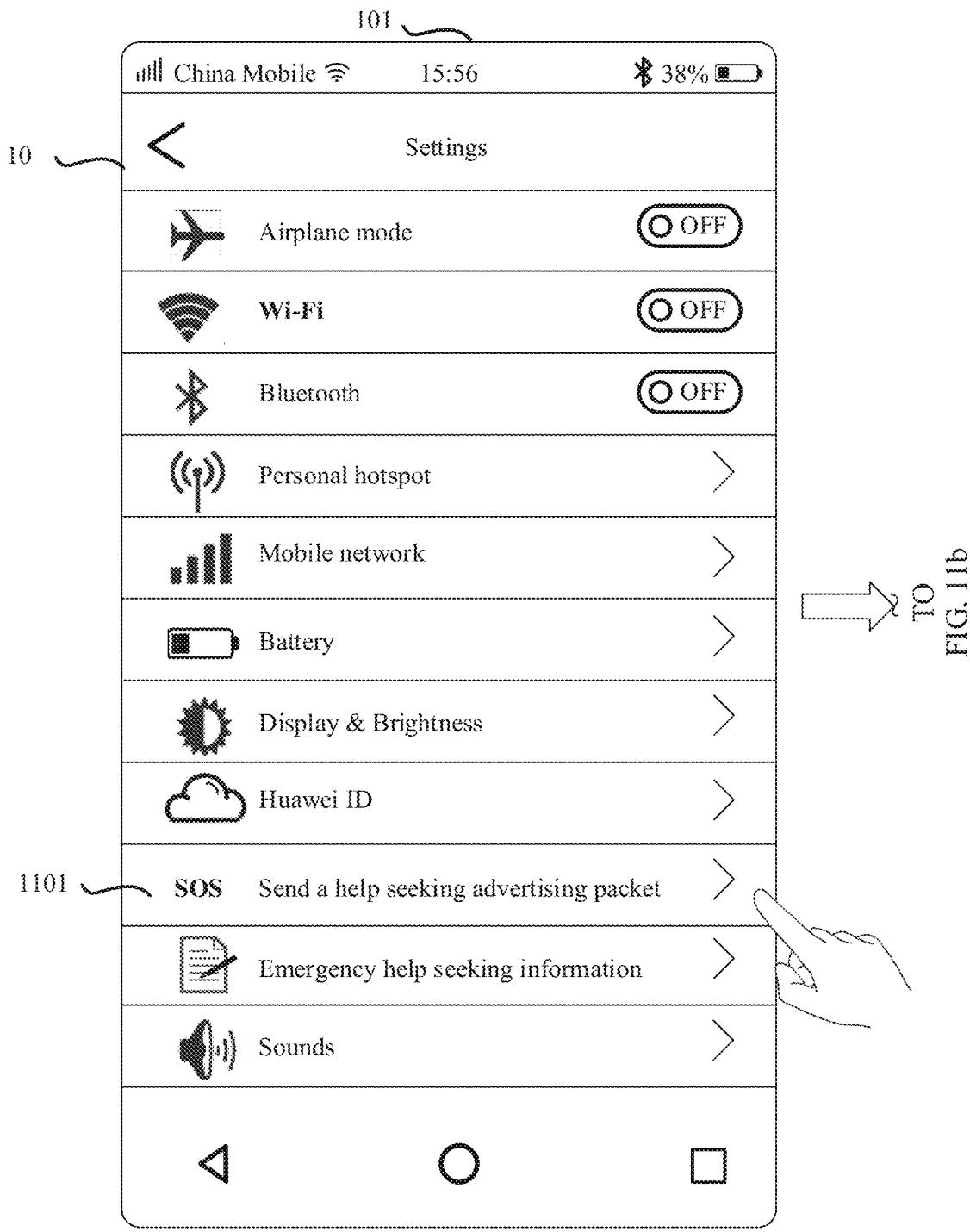

In some embodiments, the electronic device 101 may provide a setting menu including a plurality of user operations, so that the user can select one or more user operations from the setting menu as the user operation used to trigger the electronic device 101 to send the help seeking advertising packet on the BLE advertising channel. For example, referring to FIG. 11a, the electronic device 101 may provide a setting interface 10, where the setting interface 10 may include a plurality of options, for example, an option "Send a help seeking advertising packet" 1101. In some embodiments, the setting interface 10 may further include a status bar. The status bar may include one or more of the following: an operator name (for example, China Mobile), a Wi-Fi icon, signal strength, time, a battery icon, a remaining battery level, an alarm clock icon (not shown in the figure), a Bluetooth icon, or the like. In some embodiments, the setting interface 10 may further include a navigation bar. The navigation bar may include a back button, a home button, and a recent button.

Figure 11B:
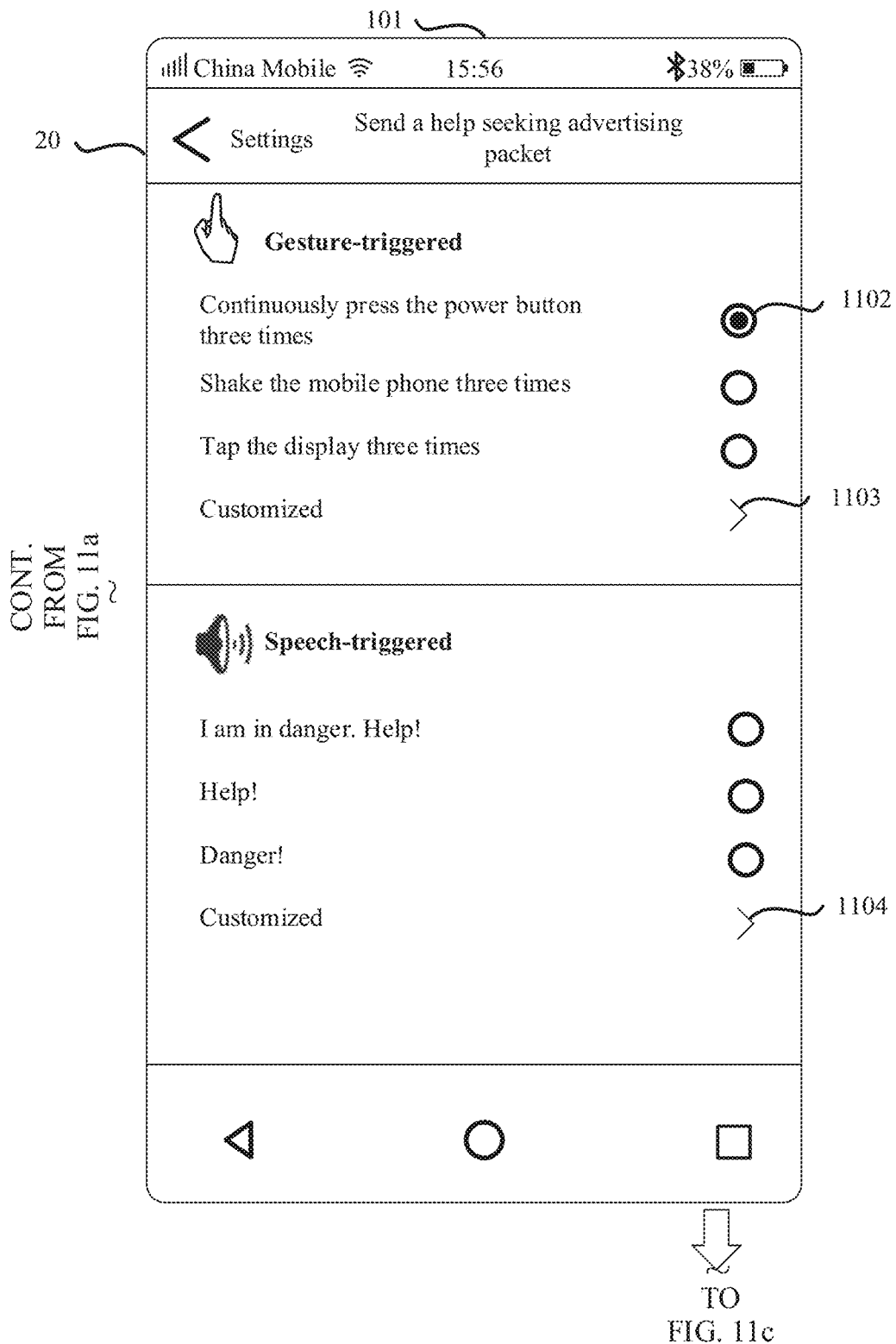

For example, the user 1 may tap the option "Send a help seeking advertising packet" 1101, and in response to the tap operation of the user 1, the electronic device 101 displays an interface 20 that includes a plurality of user operations and that is shown in FIG. 11b. For example, the user 1 may tap an option 1102 in the interface 20, and set an operation of continuously pressing the power button three times as the user operation used to trigger the electronic device 101 to send the help seeking advertising packet on the BLE advertising channel.

In some other embodiments, the user may alternatively customize, based on a habit of the user, the user operation used to trigger the electronic device 101 to send the help seeking advertising packet on the BLE advertising channel. In a possible implementation, the user may input a user operation to the electronic device 101 in advance, and specify a function of the user operation. For example, referring to FIG. 11b, the setting interface 20 may further include options "Customized" 1103 and 1104. The option 1103 may be used by the user to customize a gesture used to trigger the electronic device 101 to send the help seeking advertising packet on the BLE advertising channel, and the option 1104 may be used by the user to customize a speech used to trigger the electronic device 101 to send the help seeking advertising packet on the BLE advertising channel.

Figure 11C:
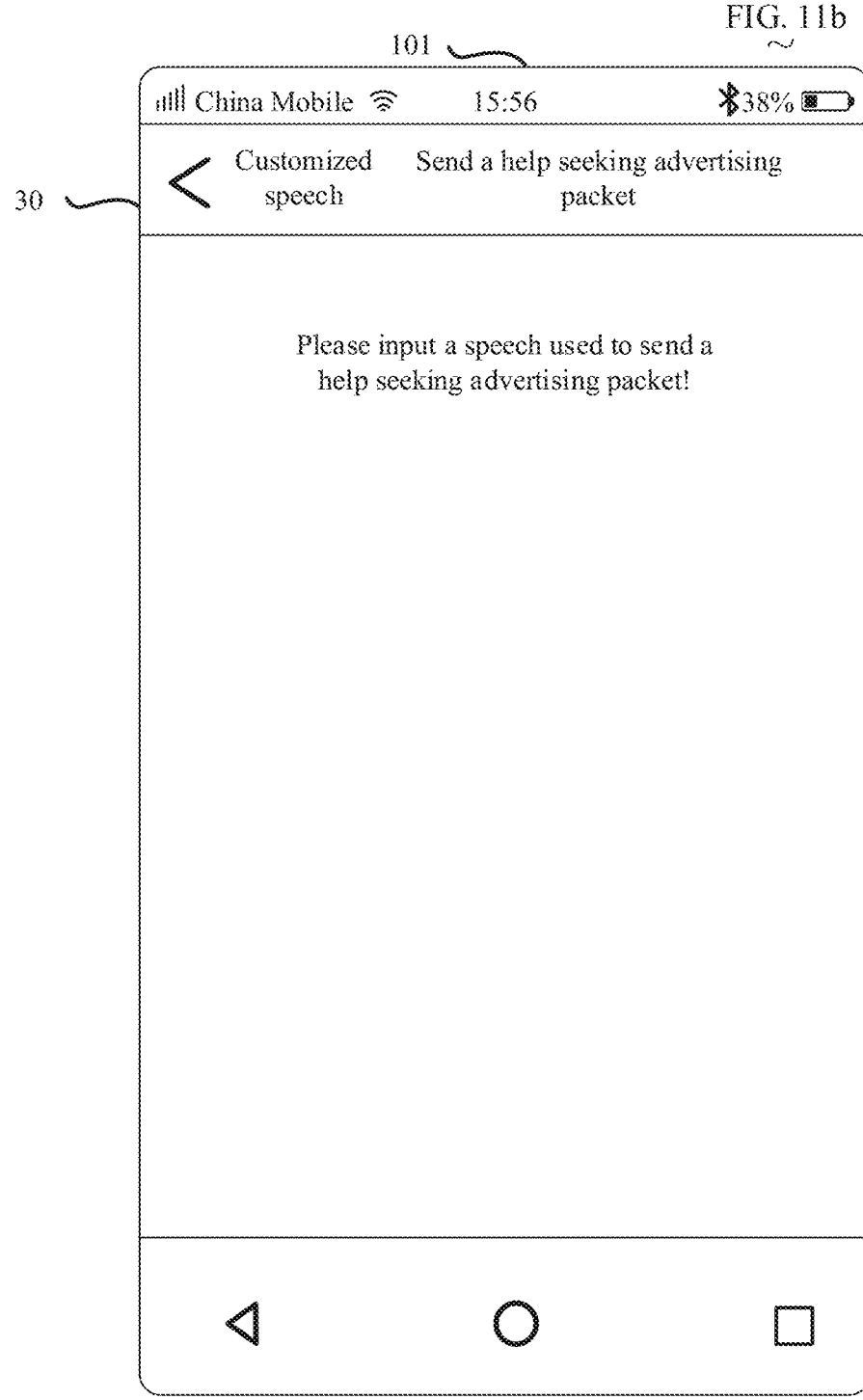

For example, the user 1 may tap the option 1104, and in response to the tap operation of the user 1, the electronic device 101 displays an input interface 30 shown in FIG. 11*c*. The input interface 30 may include information used to prompt the user to input a customized speech. For example, when the electronic device 101 displays the input interface 30, the user 1 may input a speech "I am . I am in danger. Help!" to the electronic device 101, to set the speech as the user operation used to trigger the electronic device 101** to send the help seeking advertising packet on the BLE advertising channel.

It may be understood that the user operation that is used to trigger the electronic device 101 to send the help seeking advertising packet on the BLE advertising channel and that is set by the user better conforms to a use habit of the user. Therefore, user experience is better.

2. The user operation used to trigger the electronic device 101 to send the help seeking advertising packet on the BLE advertising channel may be set by the electronic device 101.

In some embodiments, the user operation used to trigger the electronic device 101 to send the help seeking advertising packet on the BLE advertising channel may be set by the electronic device 101 by default at delivery.

In addition to the foregoing mentioned two manners, in this embodiment of this application, another manner may be used to set the user operation used to trigger the electronic device 101 to send the help seeking advertising packet on the BLE advertising channel. This is not limited herein.

Step S102: The electronic device 101 sends the help seeking advertising packet on the BLE advertising channel in response to the specific user operation that is input by the user 1.

In some embodiments, the electronic device 101 may continuously send a status information advertising packet on the BLE advertising channel (that is, continuously enable a Bluetooth low energy-based advertising service), and send the help seeking advertising packet after receiving the specific user operation that is input by the user 1. In some other embodiments, after receiving the specific user operation that is input by the user 1, the electronic device 101 may start to enable BLE and send the help seeking advertising packet on the BLE advertising channel. To be specific, the electronic device 101 enables the BLE in response to the specific user operation that is input by the user 1, and sends the help seeking advertising packet based on the BLE.

In this embodiment of this application, the electronic device 101 may separately send the help seeking advertising packet on three advertising channels (that is, advertising channels 37, 38, and 39), or may select one or more of the advertising channels to send the help seeking advertising packet. This is not limited herein.

In some embodiments, when sending the help seeking advertising packet in response to the specific user operation, the electronic device 101 may prompt the user that the help seeking advertising packet is being sent. The electronic device 101 may prompt, in the following manner, the user that the help seeking advertising packet is being sent: displaying prompt information (for example, a prompt window) on the display, blinking a breathing indicator, vibrating, or the like.

In some embodiments, the electronic device 101 may continuously send the help seeking advertising packet in response to the specific user operation, to ensure that another device around the electronic device 101 can obtain the help seeking advertising packet through scanning. When continuously sending the help seeking advertising packet, the electronic device 101 may stop, in either of the following cases, sending the help seeking advertising packet:

1. After a duration for which the electronic device 101 sends the help seeking advertising packet exceeds a preset value (for example, one hour), the electronic device 101 stops sending the help seeking advertising packet. The preset value may be preset.

2. When the electronic device 101 receives a user operation used to stop sending the help seeking advertising packet, the electronic device 101 stops sending the help seeking advertising packet. The user operation used to stop sending the help seeking advertising packet may include: shaking the mobile phone 101 three times, tapping the display three times, or the like. The user operation may be set by the user, or may be set by the electronic device 101. This is not limited herein.

In some embodiments, after stopping sending the help seeking advertising packet, the electronic device 101 may continuously send the status information advertising packet, so that another electronic device around the electronic device 101 can discover the electronic device 101.

In the application scenario 1, for a structure of the help seeking advertising packet sent by the electronic device 101 in response to the specific user operation of the user 1, refer to FIG. 6 and the related descriptions. For example, if a user associated with the electronic device 101 is the user 1, in the help seeking advertising packet, a user identifier field may carry an account of the user 1, a user information field may carry a profile picture of the user 1, a location information field carries current location information of the electronic device 101, an advertising packet identifier field carries an identifier of the help seeking advertising packet, and a field of an identifier of a received advertising packet carries an identifier of an advertising packet obtained by the electronic device 101 through scanning.

Emergency help seeking information carried in an emergency help seeking information field in the help seeking advertising packet may be set in the following several manners.

(1) The emergency help seeking information may be set by the user.

Figure 12A:
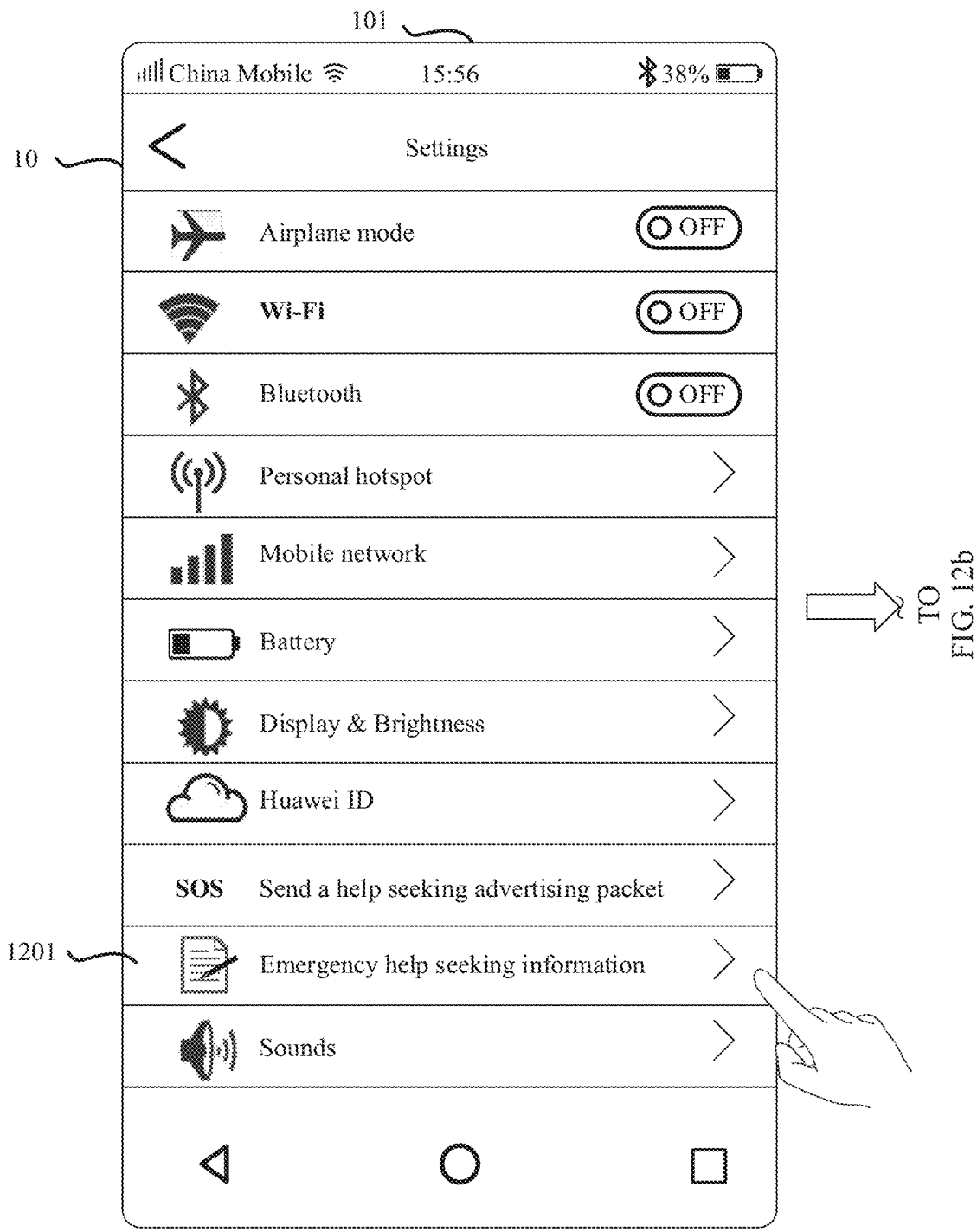
Figure 12B:
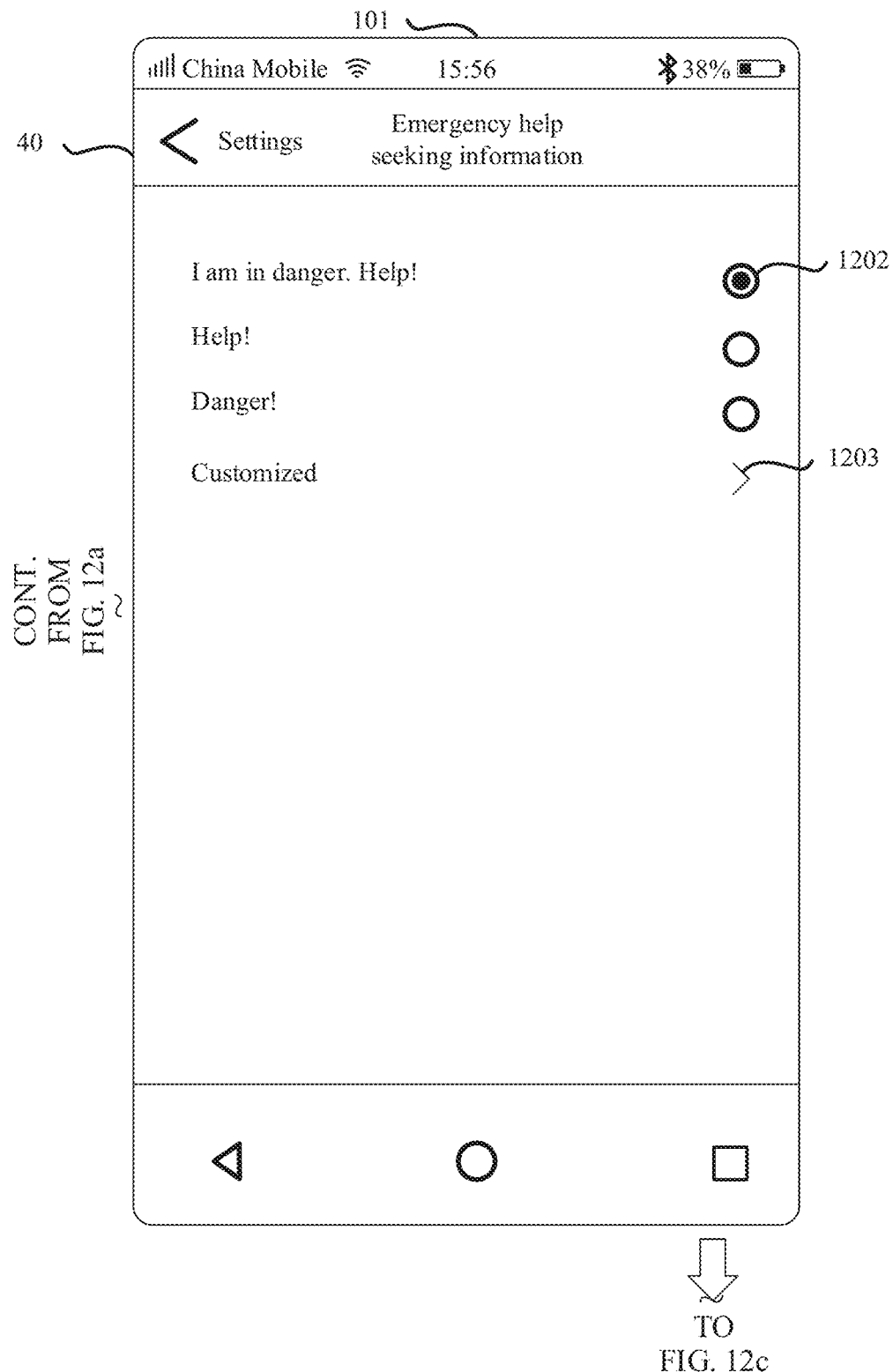

In some embodiments, the electronic device may provide a setting menu including a plurality of pieces of emergency help seeking information, so that the user can select one or more pieces of emergency help seeking information from the setting menu as the emergency help seeking information carried in the help seeking advertising packet. For example, referring to FIG. 12*a*, the electronic device 101 may provide a setting interface 10, where the setting interface 10 includes an option "Emergency help seeking information" 1201. The user may tap the option 1201, and in response to the tap operation of the user, the electronic device 101 displays an interface 40 that includes a plurality of pieces of emergency help seeking information and that is shown in FIG. 12*b*. For example, the user may tap an option 1202 in the interface 40, and set a text "I am in danger. Help!" as the emergency help seeking information carried in the help seeking advertising packet.

Figure 12C:
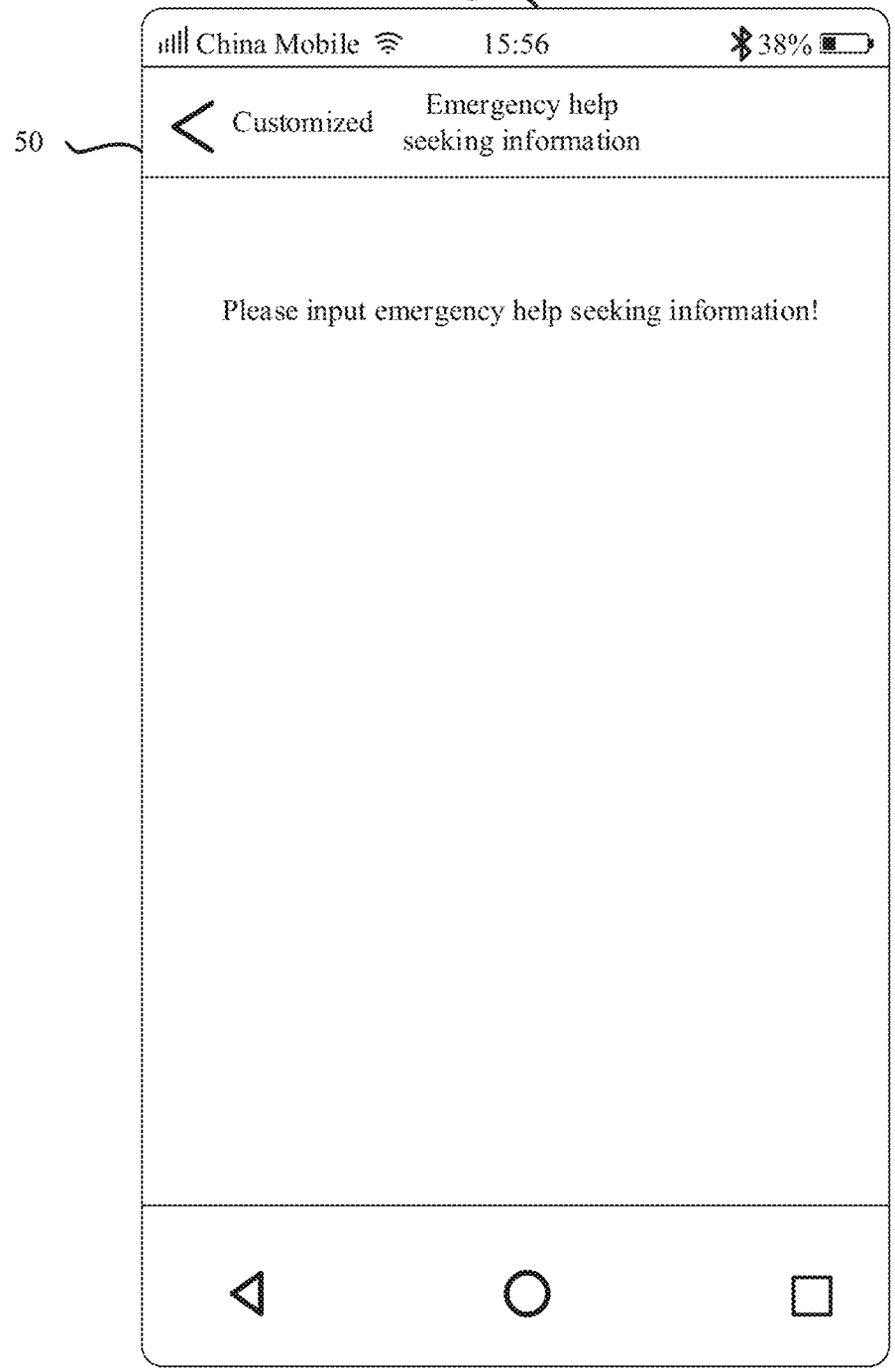

In some other embodiments, the user may alternatively customize, based on a habit of the user, the emergency help seeking information carried in the help seeking advertising packet. For example, referring to FIG. 12*b*, the interface 40 may further include an option "Customized" 1203. The user may tap the option 1203, and in response to the tap operation of the user, the electronic device 101 displays an input interface 50 shown in FIG. 12*c*, where the input interface 50 may prompt the user to input customized emergency help seeking information. For example, when the electronic device 101 displays the input interface 50, the user may input a text "I am in danger. Help!" to the electronic device 101, to use the text as the emergency help seeking information in the help seeking advertising packet.

(2) The emergency help seeking information may be set by the electronic device. In some embodiments, the emergency help seeking information in the help seeking advertising packet may be set by the electronic device by default at delivery.

In addition to the foregoing two manners, in this embodiment of this application, the emergency help seeking information in the help seeking advertising packet may be set in another manner. For example, the emergency help seeking information in the help seeking advertising packet may also be related to a manner in which the user triggers the electronic device to send the help seeking advertising packet. For example, when the user triggers, by using a speech, the electronic device 101 to send the help seeking advertising packet, the help seeking advertising packet may carry the speech that is input by the user or a text corresponding to the speech.

In some embodiments, based on an emergency help seeking scenario, to prevent the help seeking advertising packet from being abused, the electronic device 101 may determine, according to some policies, whether to send the help seeking advertising packet in response to the input specific user operation. The policy may be either of the following: 1. The electronic device 101 analyzes whether the emergency help seeking information field in the help seeking advertising packet includes a preset keyword or element, and when the emergency help seeking information field includes the preset keyword or element, the electronic device 101 does not send the help seeking advertising packet in response to the specific user operation that is input by the user. The preset element may include a website link, and the preset keyword may include "buy", "purchase", or the like. 2. The electronic device 101 collects statistics about frequency or duration for sending the help seeking advertising packet in a period of time, and does not send the help seeking advertising packet when the frequency or the duration exceeds a threshold. For example, when the electronic device 101 sends the help seeking advertising packet within 90% of a year, the electronic device 101 does not send the help seeking advertising packet even if the electronic device 101 receives the specific user operation. According to either of the foregoing policies, the electronic device 101 can be prevented from sending a help seeking advertising packet carrying spam information, to prevent the help seeking advertising packet from being abused.

Step S103: An electronic device 102 obtains, through scanning on the BLE advertising channel, the help seeking advertising packet sent by the electronic device 101.

Specifically, the electronic device 102 may be a device that enables a BLE-based scanning service and that falls within an effective BLE range (for example, within 1000 meters) of the electronic device 101. The electronic device 102 may obtain, through scanning on the BLE advertising channel, the help seeking advertising packet sent by the electronic device 101.

Figure 13A:
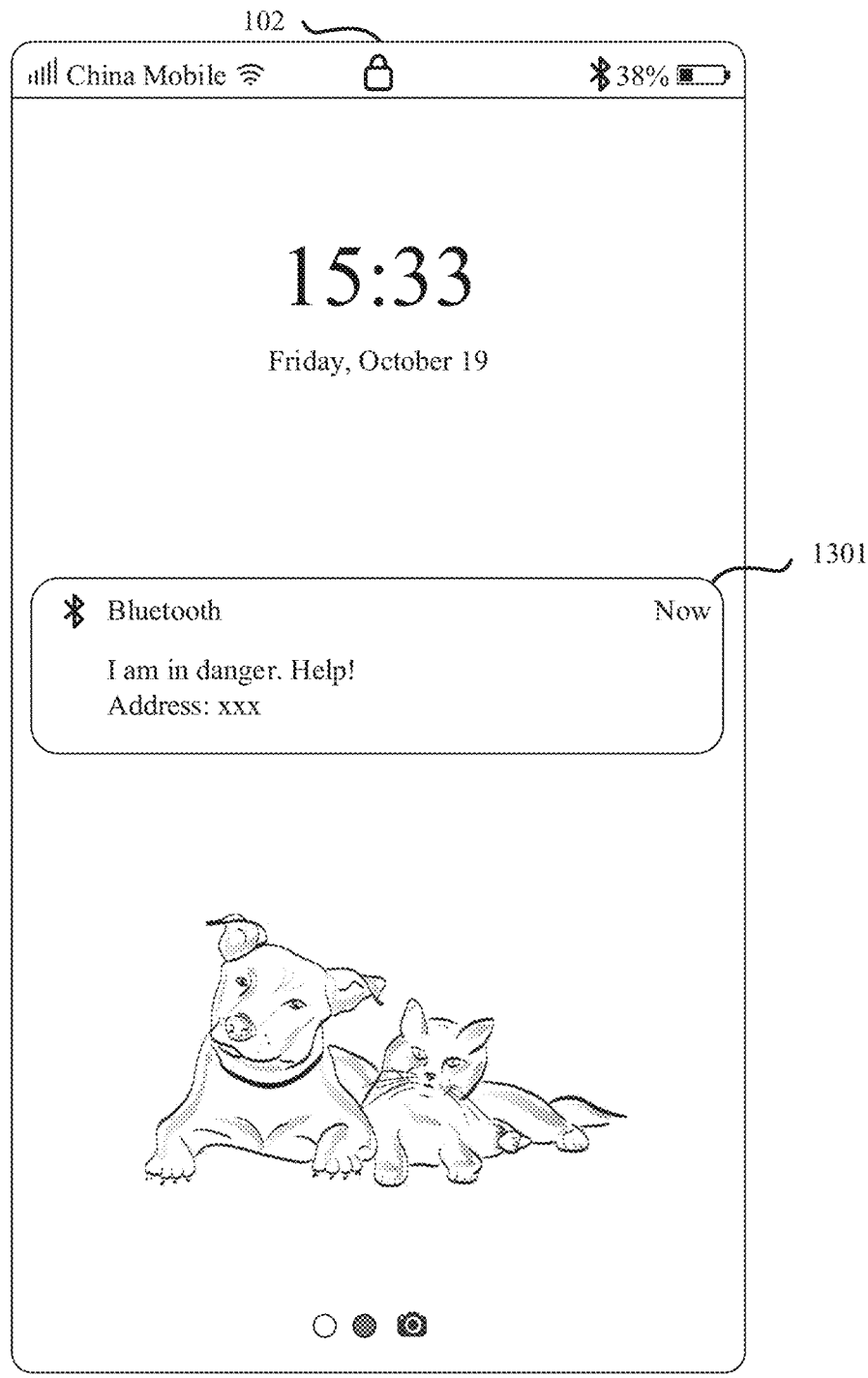

After obtaining, through scanning on the BLE advertising channel, the help seeking advertising packet sent by the electronic device 101, the electronic device 102 may parse the help seeking advertising packet and obtain the emergency help seeking information carried in the help seeking advertising packet. For example, FIG. 13*a* shows an interface displayed on the display after the electronic device 102 parses the help seeking advertising packet. As shown in FIG. 13*a*, the interface may include a prompt window 1301, and the prompt window 1301 may include the emergency help seeking information carried in the help seeking advertising packet. When the help seeking advertising packet carries location information, the prompt window 1301 may further include the location information. When the help seeking advertising packet carries a user identifier, the prompt window 1301 may further include the user identifier. When the help seeking advertising packet carries user information, the prompt window 1301 may further include the user information.

After parsing the help seeking advertising packet sent by the electronic device 101, the electronic device 102 may search for the electronic device 101 and the user 1 in an effective BLE range by using the electronic device 102 as a circle center, to provide rescue for the user.

In some embodiments, if the help seeking advertising packet carries the location information, the electronic device 102 may determine a location of the electronic device 101 and the user 1 by using the location information carried in the help seeking advertising packet. For example, when the location information includes longitude and latitude, the electronic device 102 may locate an absolute location of the electronic device 101 and the user 1 by using the longitude and latitude. In some embodiments, the electronic device 102 may further determine the location of the electronic device 101 and the user 1 with the assistance of other information. For example, the electronic device 102 may further determine a direction of the electronic device 101 relative to the electronic device 102 based on an angle of arrival (angle of arrival, AOA).

In steps S101 and S103, the user 1 sends the help seeking advertising packet by using the electronic device 101, the electronic device 102 can receive the help seeking advertising packet, and therefore the user 1 can successfully call for help.

In some embodiments, the BLE-based communication method shown in FIG. 9 may further include the following steps: S104 and S105.

Step S104: When the emergency help seeking information field in the help seeking advertising packet obtained by the electronic device 102 through scanning includes the preset keyword or element, or when the electronic device 102 receives a user operation, the electronic device 102 sends a marked advertising packet on the BLE advertising channel, where a first field in the marked advertising packet carries an advertising packet identifier of the help seeking advertising packet.

In some cases, some users may send spam information by using the help seeking advertising packet. To be specific, the emergency help seeking information field in the help seeking advertising packet carries the spam information instead of the emergency help seeking information of the user. In either of the following cases, the help seeking advertising packet carries the spam information, and the electronic device 102 sends the marked advertising packet on the BLE advertising channel.

1. The electronic device 102 parses the help seeking advertising packet, and when the emergency help seeking information field in the help seeking advertising packet includes the preset keyword or element, the electronic device 102 sends the marked advertising packet on the BLE advertising channel. The preset element may include a website link, and the preset keyword may include "buy", "purchase", or the like.

2. When the electronic device 102 receives the input user operation, the electronic device 102 sends the marked advertising packet on the BLE advertising channel.

Figure 13B:
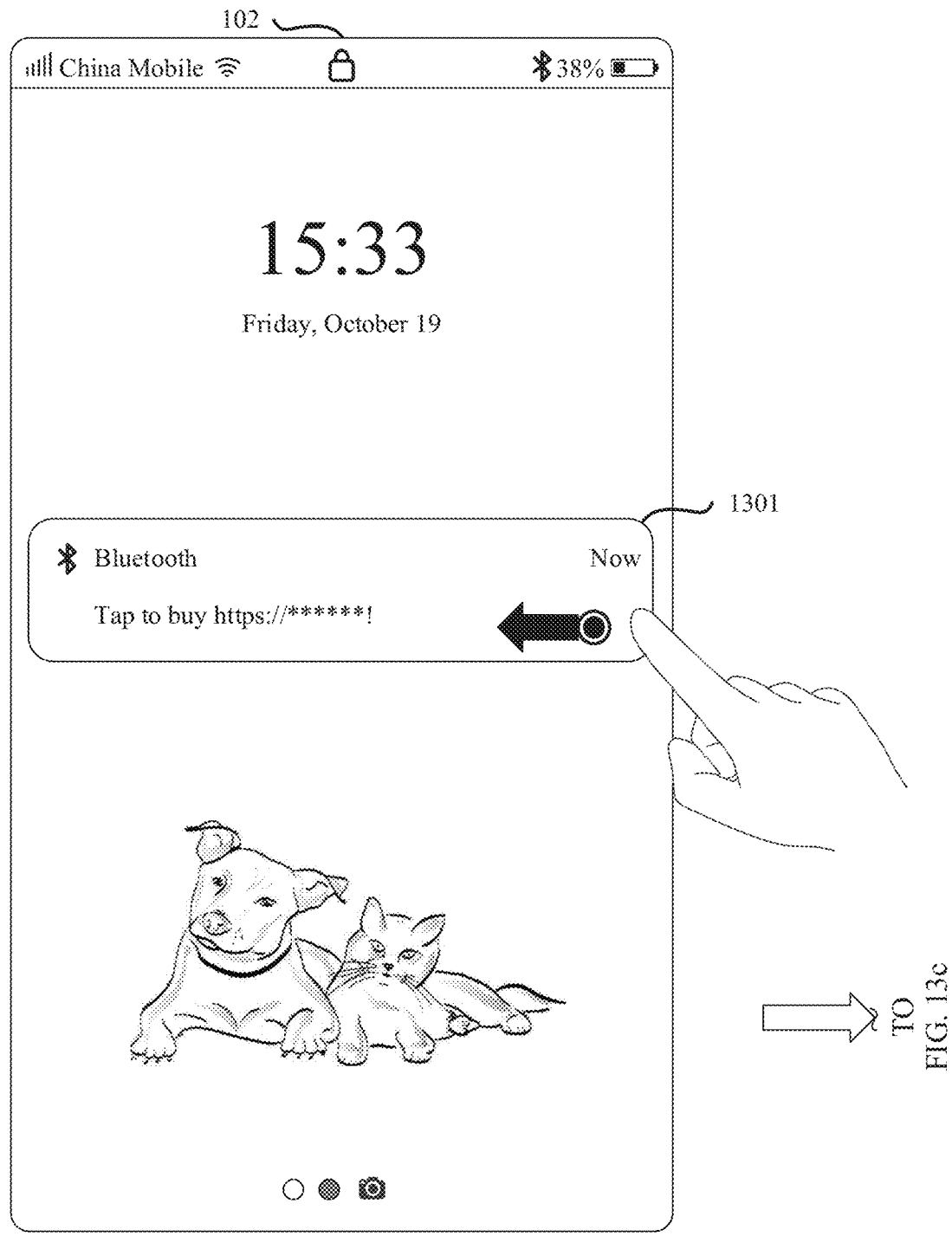
Figure 13C:
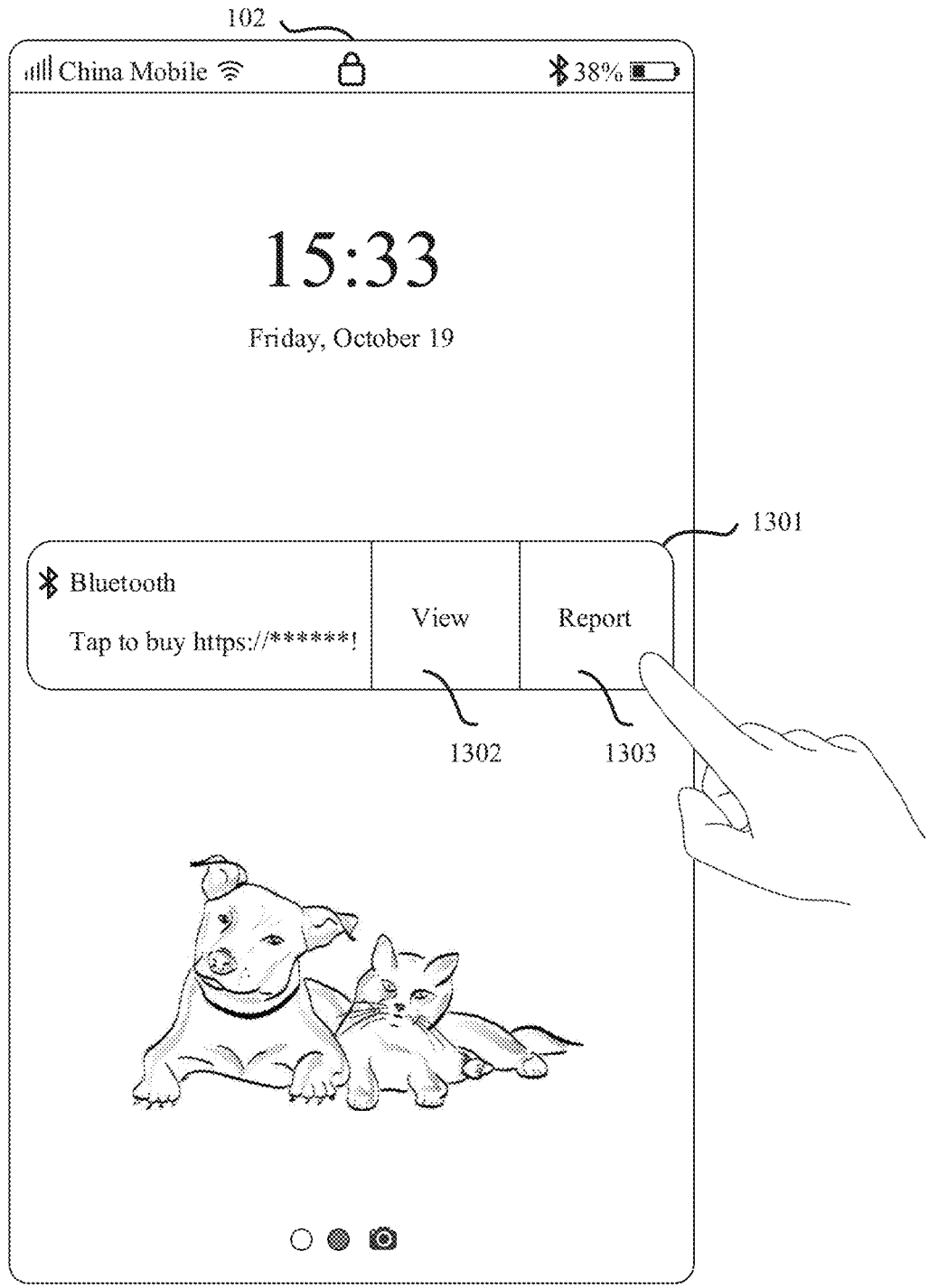

For example, FIG. 13b shows an interface displayed on the display after the electronic device 102 parses the help seeking advertising packet. As shown in FIG. 13b, the interface may include a prompt window 1301, and the prompt window 1301 may include the spam information carried in the help seeking advertising packet. The user 1 may input a left sliding gesture in the prompt window 1301, and in response to the gesture that is input by the user 1, the electronic device 102 displays an interface shown in FIG. 13c. As shown in FIG. 13c, the prompt window 1301 displays controls "View" 1302 and "Report" 1303. If the user 1 determines that information displayed in the prompt window 1301 is spam information, the user 1 may tap the control 1303, and in response to the tap operation of the user 1, the electronic device 102 sends the marked advertising packet on the BLE advertising channel.

Specifically, the marked advertising packet sent by the electronic device 102 on the BLE advertising channel may be used to notify another electronic device that the help seeking advertising packet carries the spam information, that is, the help seeking advertising packet is marked as an advertising packet carrying the spam information, to prevent the help seeking advertising packet from being abused. Specifically, the marked advertising packet is a last advertising packet to be sent by the electronic device 102, and the last advertising packet to be sent by the electronic device 102 may be any one of the status information advertising packet, the content message advertising packet, or the help seeking advertising packet provided in the embodiments of this application. The first field in the marked advertising packet carries the identifier of the help seeking advertising packet, and is used to indicate that the help seeking advertising packet carries the spam information. In this embodiment of this application, an advertising data unit including the first field in the marked advertising packet may be referred to as a first advertising data unit.

Step S105: The electronic device 101 obtains, through scanning on the BLE advertising channel, the marked advertising packet sent by the electronic device 102.

After the electronic device 102 sends the marked advertising packet, a device (for example, the electronic device 101) that enables a BLE-based scanning service and that falls within an effective BLE range (for example, within 1000 meters) of the electronic device 102 may receive the marked advertising packet, and may determine, based on the advertising packet identifier carried in the first field in the marked advertising packet, that the help seeking advertising packet indicated by the identifier carries the spam information.

Specifically, after receiving the marked advertising packet, the electronic device 101 may determine that the help seeking advertising packet sent by the electronic device 101 in step S102 is marked as the advertising packet carrying the spam information.

After determining that the help seeking advertising packet sent by the electronic device 101 in step S102 is marked as the advertising packet carrying the spam information, the electronic device 101 may stop, according to the following several policies, sending the help seeking advertising packet, to prevent the help seeking advertising packet from being abused.

1. When the help seeking advertising packet sent by the electronic device 101 is marked as the advertising packet carrying the spam information, the electronic device 101 stops sending the help seeking advertising packet.

2. The electronic device 101 collects statistics about a proportion that the help seeking advertising packet sent by the electronic device 101 is marked as the advertising packet carrying the spam information, and when the proportion reaches a specific threshold (for example, 50%), the electronic device 101 stops sending the help seeking advertising packet. The proportion is described by using as an example. The electronic device 101 sends m help seeking advertising packets carrying different emergency help seeking information. If n of the m help seeking advertising packets are marked as advertising packets carrying spam information, the proportion that the help seeking advertising packet sent by the electronic device 101 is marked as the advertising packet carrying the spam information may be n/m.

3. The electronic device 101 collects statistics about a quantity of times for which the help seeking advertising packet sent in step S102 is marked as the advertising packet carrying the spam information, and when the quantity of times reaches a specific threshold (for example, 10 times), the electronic device 101 stops sending the help seeking advertising packet. The quantity of times is described by using as an example. The electronic device 101 sends, in step S102, m help seeking advertising packets carrying same emergency help seeking information. If v electronic devices mark the help seeking advertising packet as the advertising packet carrying the spam information, the quantity of times for which the help seeking advertising packet sent by the electronic device 101 in step S102 is marked as the advertising packet carrying the spam information may be v.

In some embodiments, that the electronic device 101 stops sending the help seeking advertising packet may mean that the electronic device 101 stops sending the help seeking advertising packet sent in step S102, but may further send another help seeking advertising packet. For example, the help seeking advertising packet sent by the electronic device 101 in step S102 carries the spam information "Tap to buy https://****". After the help seeking advertising is marked as the advertising packet carrying the spam information, the electronic device 101** cannot send a help seeking advertising packet carrying the same spam information any more, but may further send a help seeking advertising packet carrying other information.

In some other embodiments, that the electronic device 101 stops sending the help seeking advertising packet may mean that the electronic device 101 disables a function of sending the help seeking advertising packet, that is, the electronic device cannot send a help seeking advertising packet any more.

In some embodiments, after stopping sending the help seeking advertising packet, the electronic device 101 may prompt the user 1 that sending of the help seeking advertising packet is currently stopped. A prompt manner may include but is not limited to: displaying prompt information on the display, vibrating, blinking a breathing indicator, or the like.

In some embodiments, after stopping sending the help seeking advertising packet, the electronic device 101 may resume, after a present time (for example, 24 hours), sending the help seeking advertising packet.

According to the BLE-based communication method shown in FIG. 9, the electronic device can send the help seeking advertising packet based on BLE, so that the user can seek timely and effective help from another nearby user. According to the BLE-based communication method in this embodiment of this application, the electronic device can send and/or scan for the help seeking advertising packet on the BLE advertising channel, and the devices do not need to establish a connection and do not depend on a cellular network. This reduces device power consumption. When encountering danger, the user can also send the help seeking advertising packet even if there is no cellular network, to ensure safety of the user.

Application scenario 2: A user uses an electronic device for communication, and electronic devices transmit a message based on BLE. In the application scenario 2, a distance between a plurality of users falls within an effective BLE range (for example, within 1000 meters). Scenarios in which the user uses the electronic device for communication may include but is not limited to the following: 1. The user is in an area without a cellular network, for example, exercises outdoors. 2. A user advertises information to another user, for example, a tour guide popularizes scenic spot knowledge for a tourist through an electronic device. 3. The electronic device sends push information to another electronic device. For example, when a user approaches a scenic spot, an electronic device disposed at the scenic spot may send information about the scenic spot to an electronic device of the user.

Figure 14A:
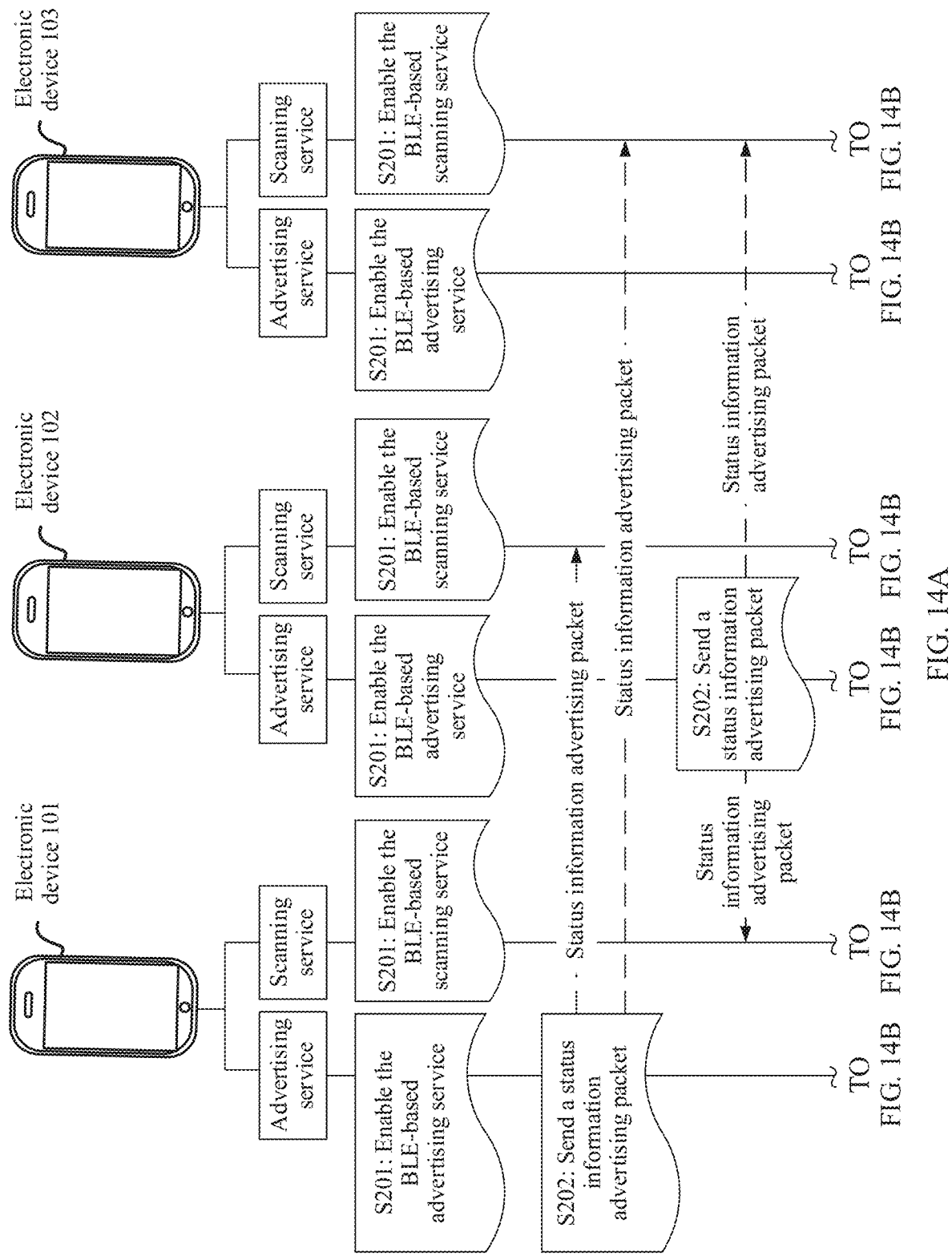
FIG. 14A and FIG. 14B are a schematic flowchart of another BLE-based communication method according to this application.
Figure 14B:
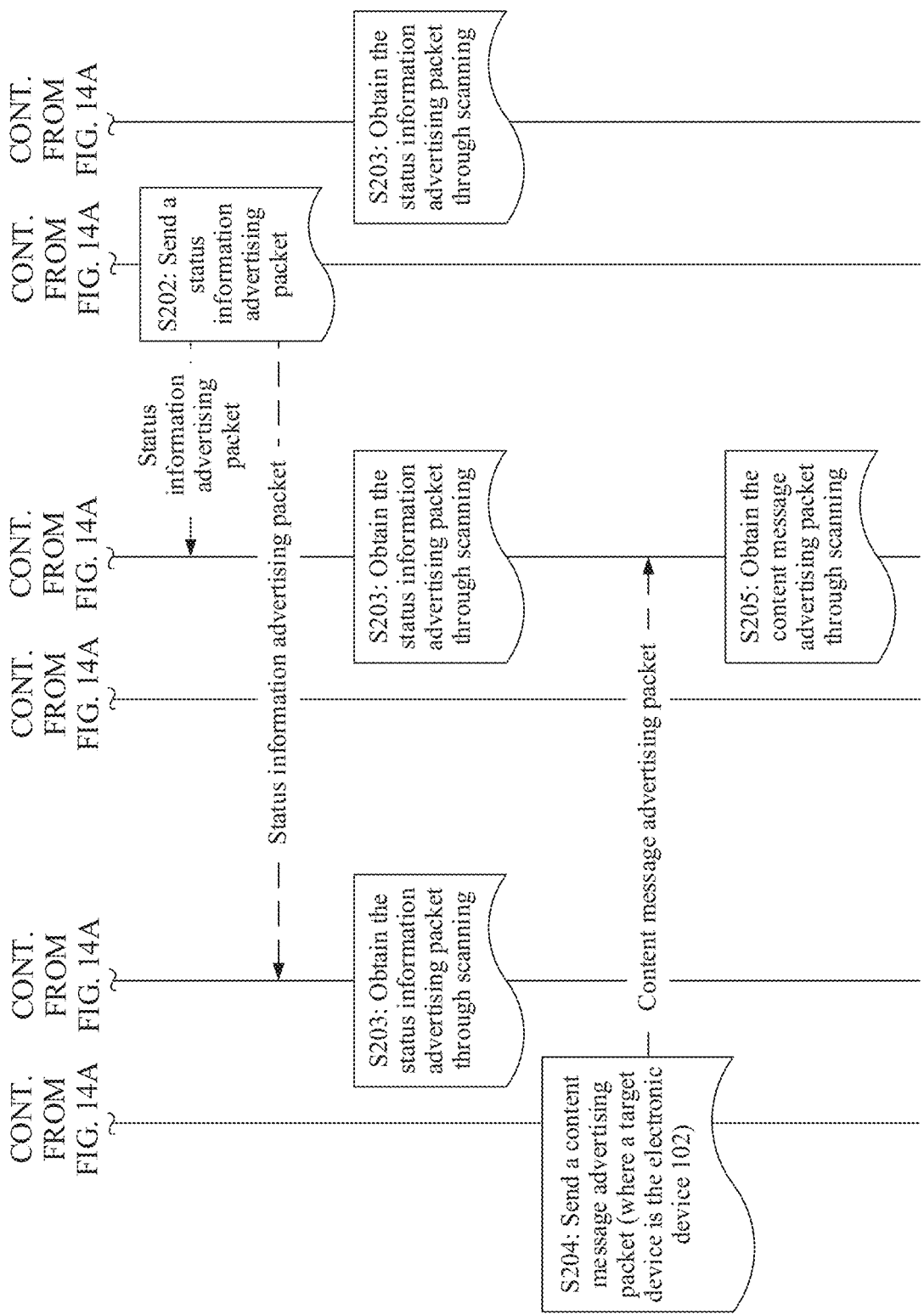

For example, FIG. 14A and FIG. 14B are a schematic flowchart of another BLE-based communication method according to an embodiment of this application. The method may include the following steps.

Step S201: An electronic device 101, an electronic device 102, and an electronic device 103 each enable a BLE-based advertising service and a BLE-based scanning service.

After enabling the advertising service, the electronic device may send a BLE advertising packet on a BLE advertising channel. After enabling the scanning service, the electronic device may scan, on the BLE advertising channel, for a BLE advertising packet sent by another electronic device. Herein, the BLE advertising packet sent by the electronic device or obtained by the electronic device through scanning may include a help seeking advertising packet, a status information advertising packet, a content message advertising packet, or the like provided in this embodiment of this application.

In this embodiment of this application, each electronic device may provide the advertising service and the scanning service based on BLE on three BLE advertising channels (that is, advertising channels 37, 38, and 39), or may select one or more of the BLE advertising channels to provide the advertising service and the scanning service based on BLE. This is not limited herein.

Step S202: The electronic device 101, the electronic device 102, and the electronic device 103 each send a status information advertising packet on the BLE advertising channel.

Specifically, each electronic device may continuously send the status information advertising packet on the BLE advertising channel. Continuous sending may refer to sending at a specific frequency. The status information advertising packet carries basic information of an electronic device, and is used to prompt all devices that can obtain the status information advertising packet through scanning that the electronic device is near the devices. For a structure of the status information advertising packet, refer to the related descriptions in the embodiment in FIG. 4. Descriptions are provided by using an example in which the electronic device 101 sends the status information advertising packet and a user associated with the electronic device 101 is the user 1. In the status information advertising packet, a user identifier field may carry an account of the user 1, a user information field may carry a nickname of the user 1, a user group identifier field may carry an identifier of a group to which the user 1 belongs, an encryption field may carry a public key of the electronic device 101, and an identifier field of a received advertising packet may carry an identifier of an advertising packet obtained by the electronic device 101 through scanning.

In the method shown in FIG. 14A and FIG. 14B, the electronic device 101 may be referred to as a first electronic device, the electronic device 102 may be referred to as a second electronic device, and the status information advertising packet sent by the electronic device 102 may be referred to as a first status information advertising packet.

Step S203: The electronic device 101, the electronic device 102, and the electronic device 103 each obtain the status information advertising packet through scanning on the BLE advertising channel.

It may be understood that step S202 and step S203 are not subject to a specific sequence, and step S203 and step S202 may be simultaneously performed.

Step S204: Each electronic device sends a content message advertising packet to another electronic device on the BLE advertising channel based on the status information advertising packet obtained through scanning on the BLE advertising channel.

Specifically, the electronic device may discover another electronic device within an effective BLE range based on the status information advertising packet that is sent by the another electronic device and that is obtained through scanning on the BLE advertising channel. For example, the electronic device 101 may discover the electronic device 102 and the electronic device 103, the electronic device 102 may discover the electronic device 101 and the electronic device 103, and the electronic device 103 may discover the electronic device 101 and the electronic device 102. The electronic device may parse the status information advertising packet obtained through scanning, and discover another surrounding user by using information (for example, a user identifier or user information) carried in the status information advertising packet. In some embodiments, the electronic device may further display, on a display, the information carried in the status information advertising packet obtained through scanning, so that the user can discover another surrounding user.

Figure 15A:
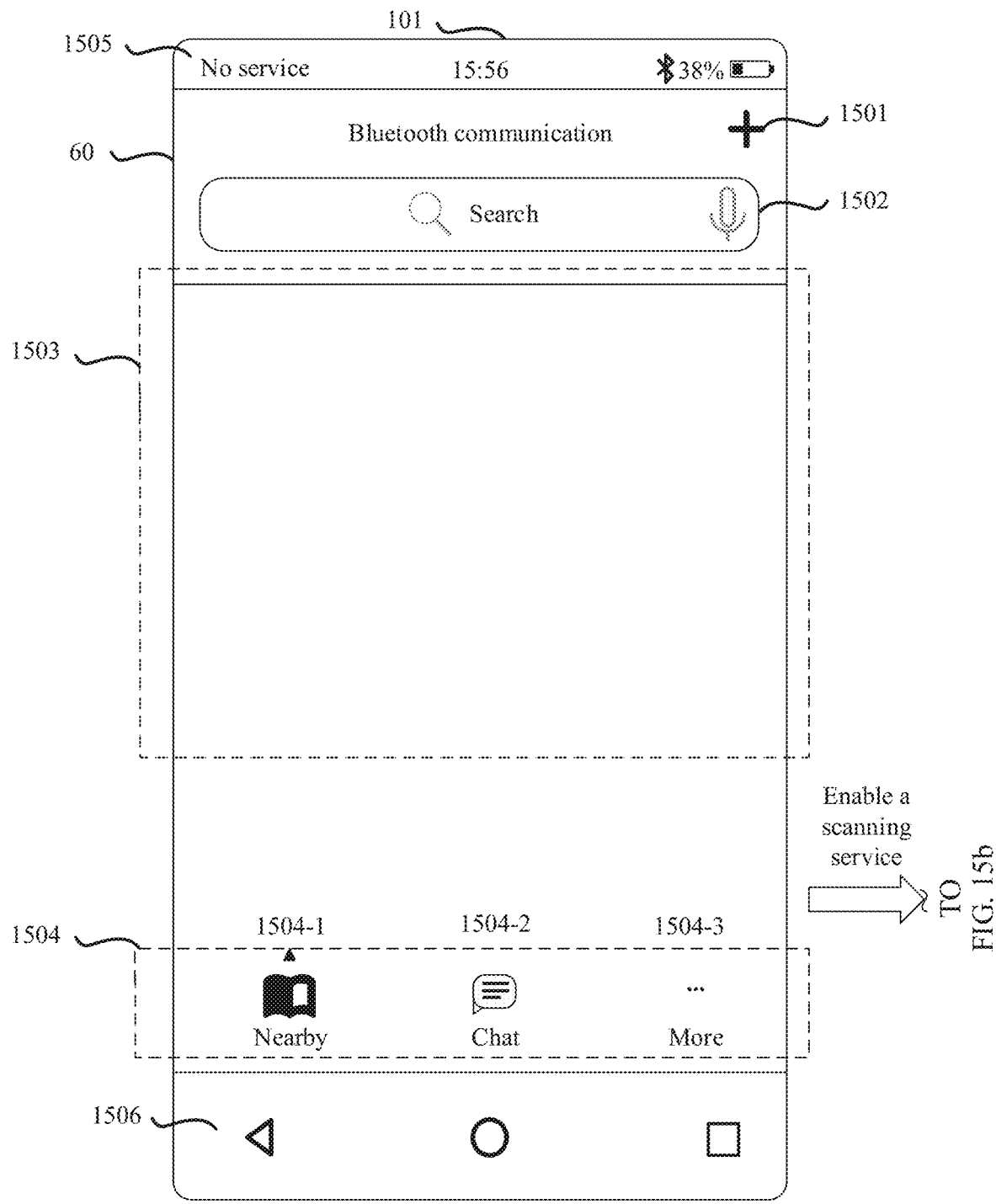
FIG. 15(a) to FIG. 15(d) to FIG. 17(a) to FIG. 17(d) each are a schematic diagram of human-computer interaction according to this application.
Figure 15B:
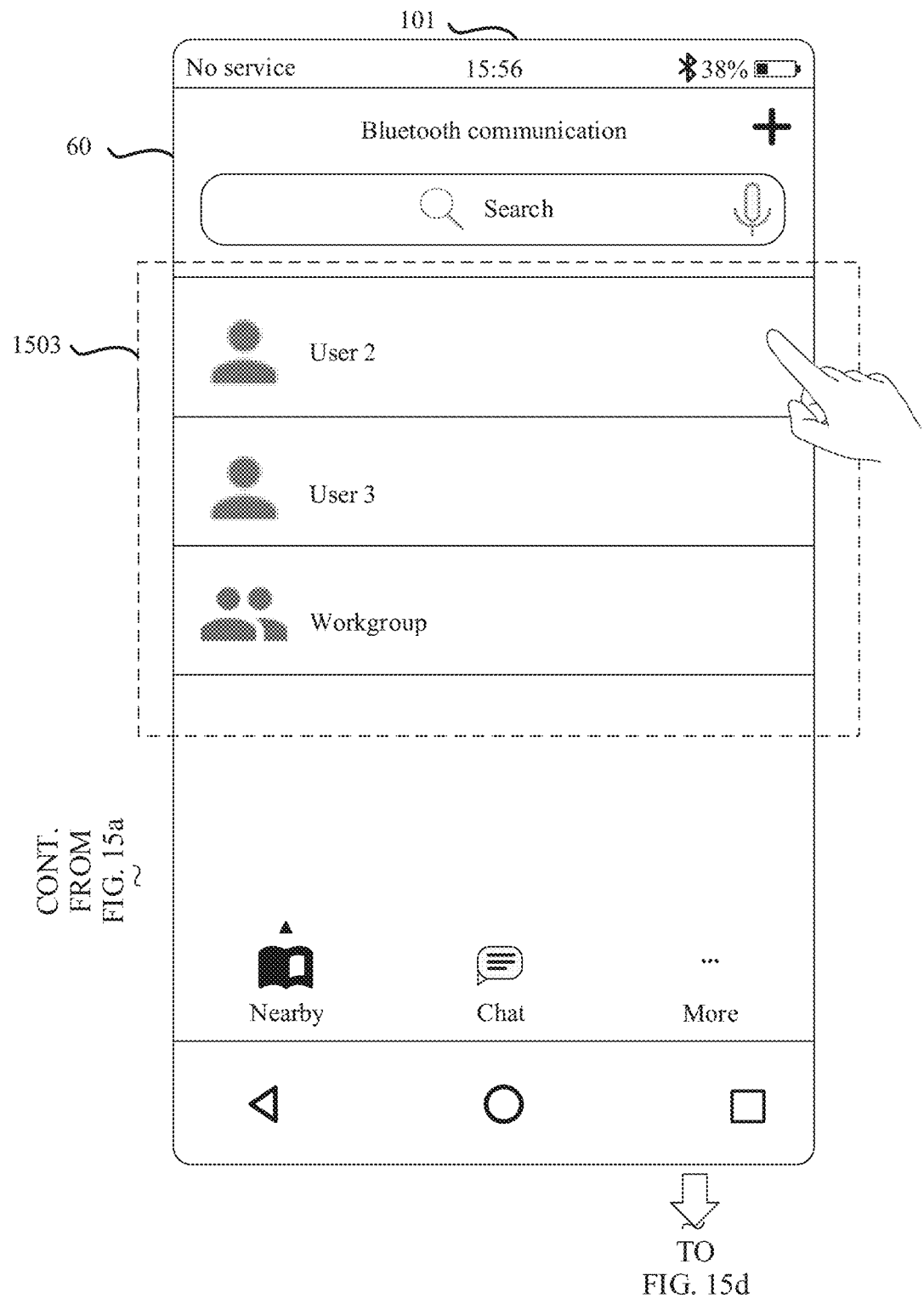

For example, FIG. 15a and FIG. 15b show interfaces provided by the electronic device 101 for the user before and after the electronic device 101 enables the scanning service.

FIG. 15a and FIG. 15b each show an interface 60 provided by the electronic device 101 for the user. The interface 60 may include a group creation control 1501, a search box 1502, a display area 1503, and a menu 1504.

The group creation control 1501 may listen to a user operation used to create a group. The electronic device 101 may detect a user operation (for example, a tap operation) performed on the control 1501, and in response to the user operation, the electronic device 101 may display, in the interface 60, a small window used to create a group.

The search box 1502 may listen to a user operation used to search for information (for example, a contact or chat information). The search box 1502 includes a search icon and a microphone icon. The electronic device may detect a user operation (for example, a tap operation) performed on the search icon, and in response to the user operation, the electronic device may jump to and display a search interface that can be used by the user to input a text. The electronic device may detect a user operation (for example, a tap operation) performed on a microphone icon, and in response to the user operation, the electronic device may jump to and display a search interface that can be used by the user to input a speech, and turn on a microphone to collect the speech that is input by the user.

The menu 1504 may include three controls: a control "Nearby" 1504-1, a control "Chat" 1504-2, and a control "More" 1504-3. The three controls may receive an input user operation (for example, a tap operation), and the electronic device 101 displays corresponding content in the display area 1503 in response to the user operation.

As shown in FIG. 15*a* and FIG. 15*b*, when the user taps the control "Nearby" in the menu 1504, the display area 1503 is used to display a user and a group that are discovered by the electronic device by using a status information advertising packet obtained through scanning. To be specific, the display area 1503 displays a user identifier or user information of an advertiser and a group to which the advertiser belongs in the status information advertising packet. In some embodiments, the display area 1503 may further display a group created by the electronic device 101.

For example, referring to FIG. 15*a*, when the electronic device 101 does not enable the BLE-based scanning service, the electronic device 101 cannot discover another user or another group, and the display area 1503 is blank.

For example, referring to FIG. 15*b*, after the electronic device 101 enables the BLE-based scanning service, the display area 1503 displays a user and a group that are discovered by the electronic device 101 by using a status information advertising packet obtained through scanning. As shown in FIG. 15*b*, the electronic device 101 discovers a user 2, a user 3, and a workgroup by using the status information advertising packet obtained through scanning.

In some embodiments, the interface 60 may further include a status bar 1505. The status bar 1505 may include one or more of the following: signal strength (for example, no service), time, a battery icon, a remaining battery level, a Bluetooth icon, and the like.

In some embodiments, the interface 60 may further include a navigation bar 1506. The navigation bar 1506 may include a back button, a home button, and a recent button.

Figure 15C:
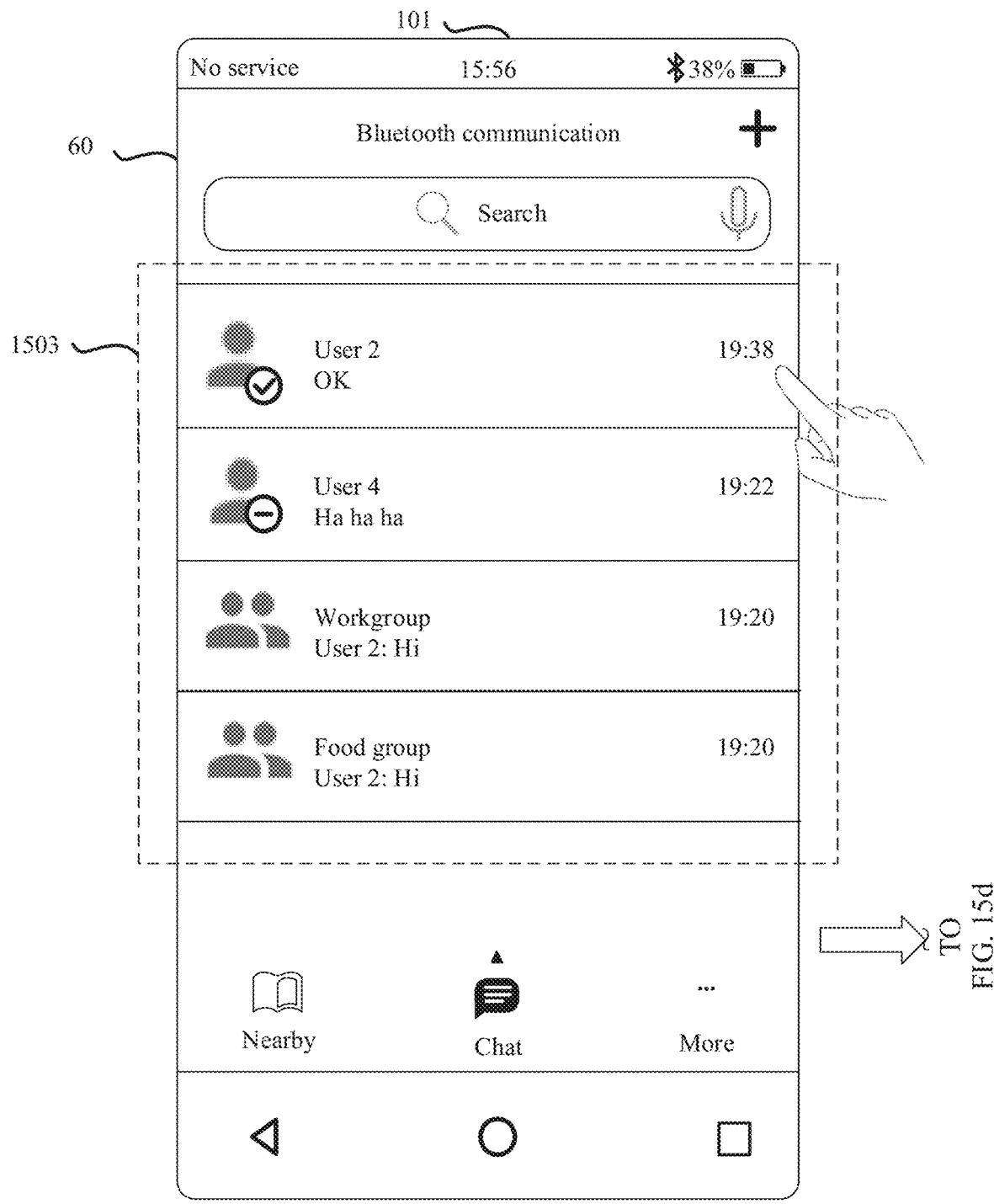

Referring to FIG. 15*c*, when the user taps the control "Chat" 1504-2 in the menu 1504, the display area 1503 is used to display a user and a group that have communicated with the electronic device 101. In some embodiments, the display area 1503 may further display time and content of last communication between either of a user and a group and the electronic device 101. It may be understood that the user or the group displayed in the display area 1503 may or may not be near the electronic device 101. The electronic device 101 may prompt the user whether the user and the group that have previously communicated with the electronic device 101 are near the electronic device 101. In some embodiments, when the user or the group displayed in the display area 1503 is near the electronic device, the electronic device 101 may light a profile picture corresponding to the user or the group, or display prompt information on the profile picture corresponding to the user or the group.

Specifically, each electronic device may send a content message advertising packet to another electronic device on the BLE advertising channel. Descriptions are provided by using an example in which the electronic device 101 sends the content message advertising packet to the another electronic device. The another electronic device may be a device discovered by the electronic device 101, may be a device in a group discovered by the electronic device 101, or may be a device in a group created by the electronic device 101. Descriptions are separately provided below.

1. The electronic device 101 sends the content message advertising packet to the another discovered device.

Figure 15D:

In some embodiments, after discovering another surrounding user, the user may communicate with the another user. Specifically, when the user 1 expects to communicate with the another user, the user 1 may tap a corresponding control in the interface 60. For example, the user 1 may tap a control "User 2" in the display area 1503 in the interface 60 shown in FIG. 15*b*, and in response to the tap operation of the user 1, the electronic device 101 displays a chat interface 70 shown in FIG. 15*d*. The chat interface 70 may be used for communication between the user 1 and the user 2. For example, as shown in FIG. 15*d*, the user 1 may input a text message "Have you eaten?". In response to the operation of inputting the text message by the user 1, the electronic device 101 advertises the content message advertising packet based on BLE, where a content message field in the content message advertising packet carries the text message "Have you eaten?", a target device is the electronic device 102, and information about a target user includes a user identifier or user information of the user 2.

2. The electronic device 101 sends the content message advertising packet to the device in the discovered group.

Figure 16A:
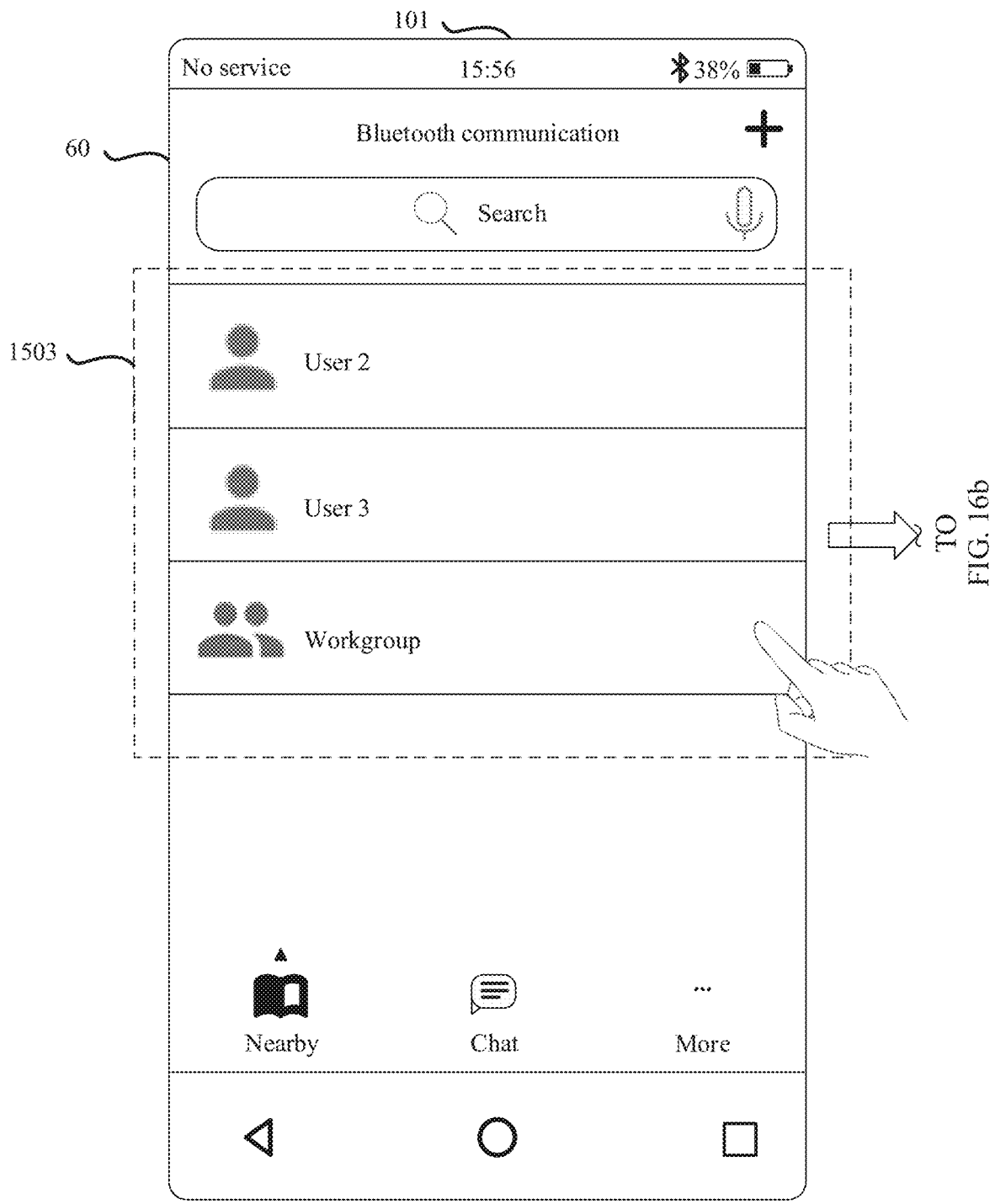

In some embodiments, after discovering a surrounding group, the user may join the group. For example, referring to FIG. 16*a*, the user 1 may tap a control "Workgroup" in the display area 1503 in the interface 60 shown in FIG. 16*a* to join the group. Herein, the interface 60 shown in FIG. 16*a* is the same as the interface 60 shown in FIG. 15*b*. For details, refer to the related descriptions.

In response to the tap operation of the user 1, the electronic device 101 may use a user group identifier field in an advertised status information advertising packet to carry an identifier of the workgroup, to announce that the user associated with the electronic device 101 joins the workgroup. In this embodiment of this application, a status information advertising packet used to announce that the user associated with the electronic device 101 joins a group may be referred to as a second status information advertising packet. In this embodiment of this application, in the second status information advertising packet, an advertising data unit including a user identifier field may be referred to as a first advertising data unit, and an advertising data unit including a user group identifier field may be referred to as a second advertising data unit.

Figure 16B:
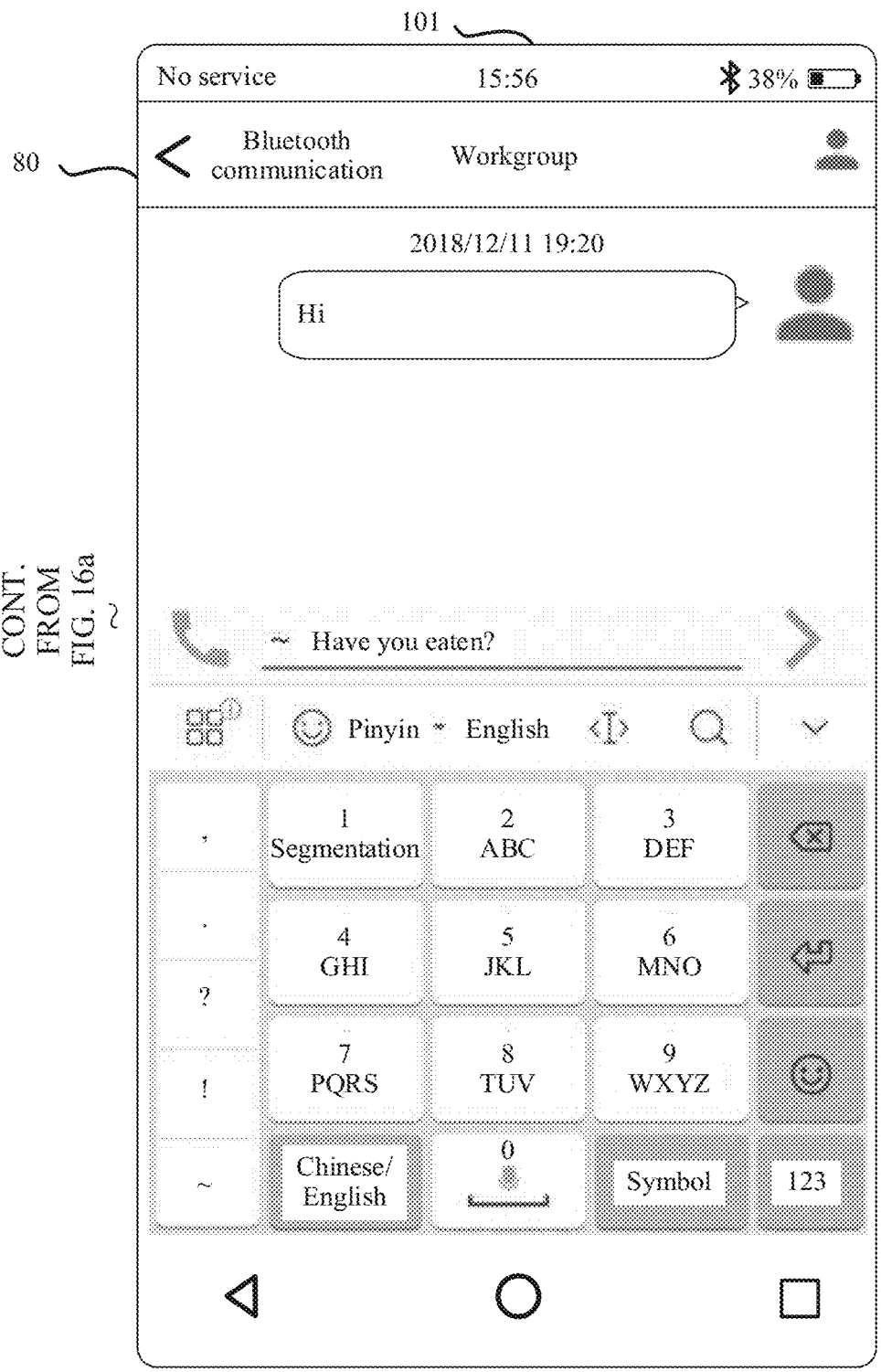

For example, in response to the tap operation of the user 1, the electronic device 101 may further display a chat interface 80 shown in FIG. 16*b*, where the interface 80 may be used for communication between the user 1 and another user in the workgroup. For example, as shown in FIG. 16*b*, the user 1 may input a text message "Have you eaten?". In response to the operation of inputting the text message by the user 1, the electronic device 101 advertises the content message advertising packet based on BLE, where a content message field in the content message advertising packet carries the text message "Have you eaten?", and information about target users includes user identifiers or user information of all users in the workgroup.

3. The electronic device 101 sends the content message advertising packet to the device in the created group.

Figure 17A:
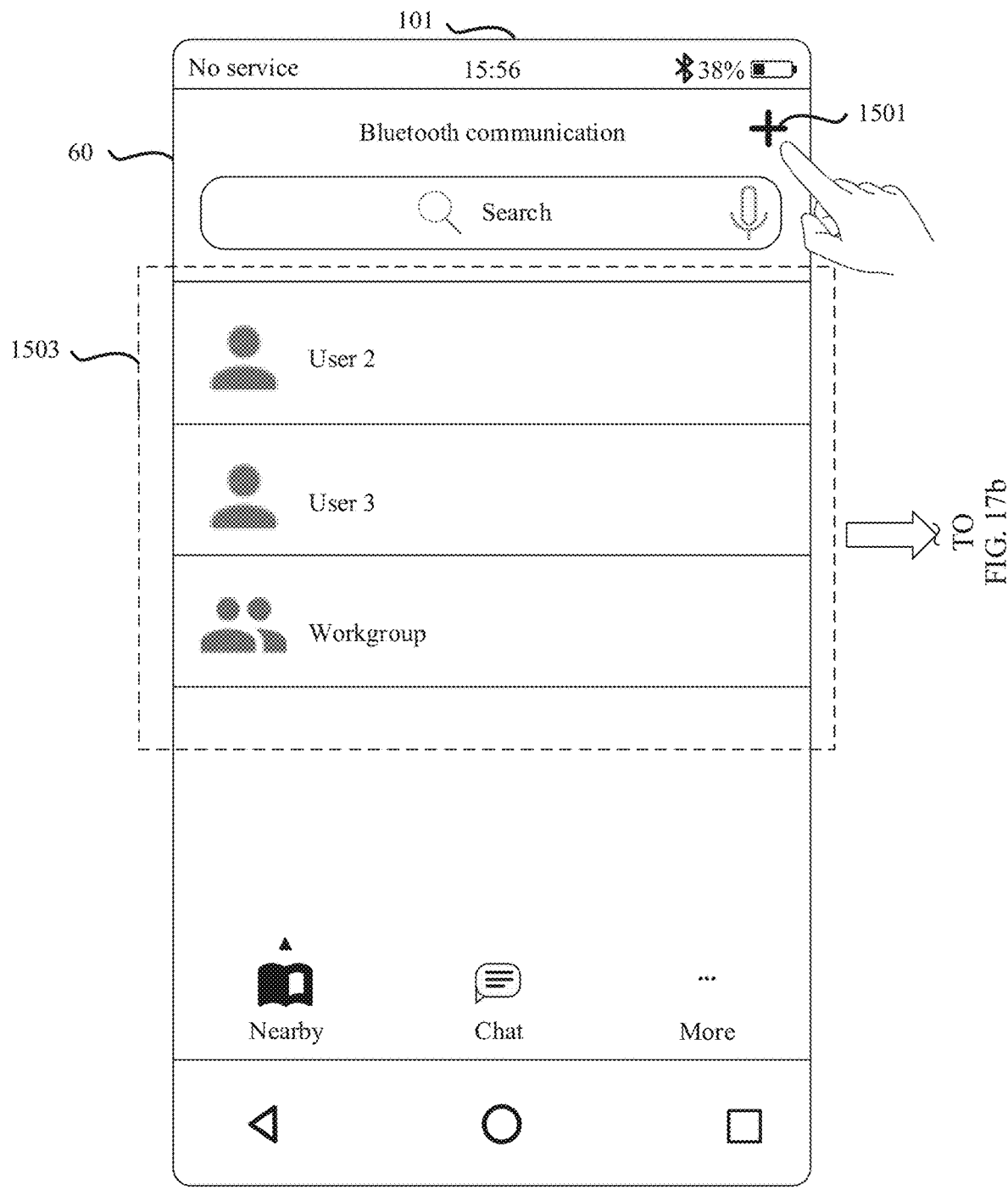
Figure 17B:
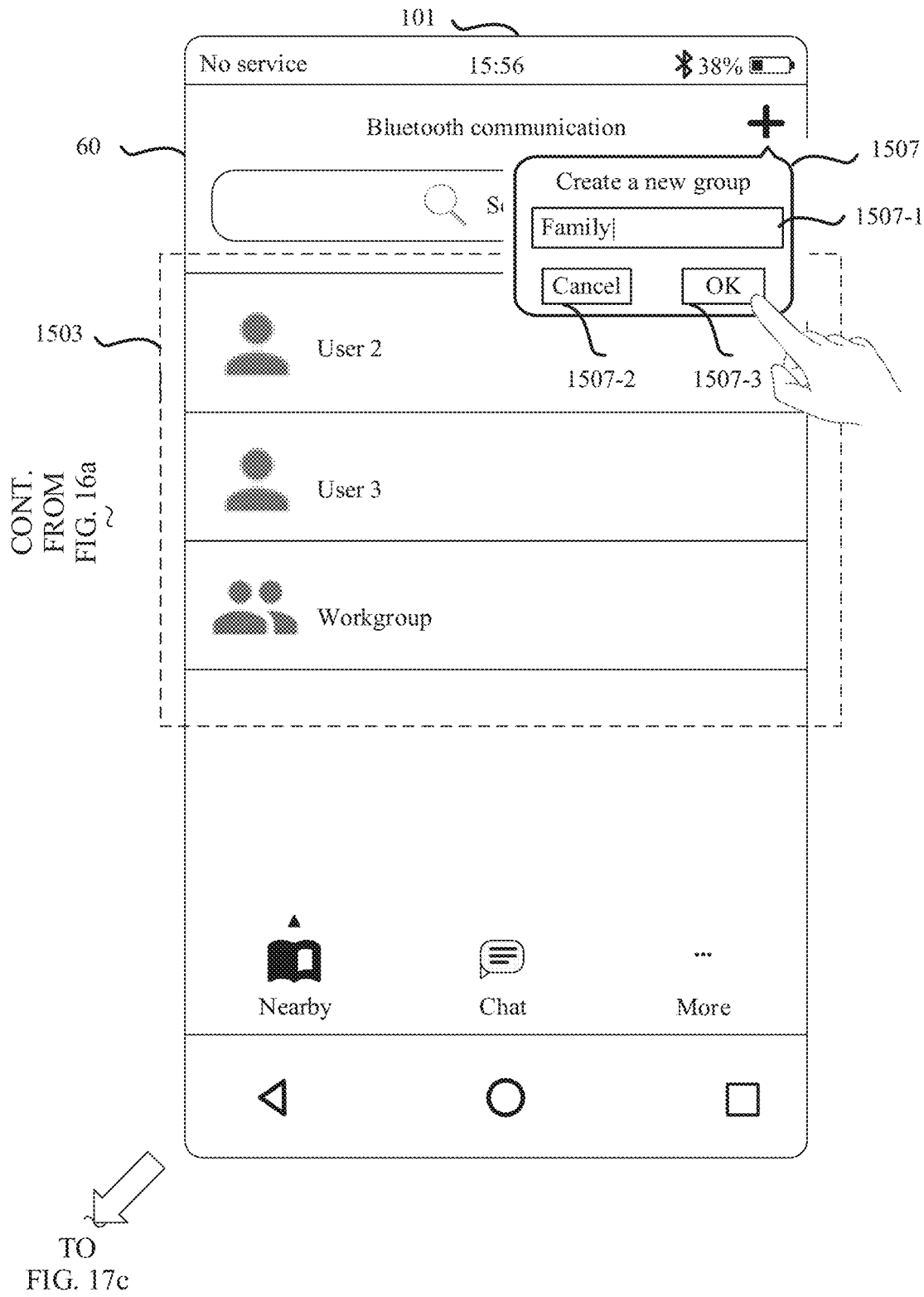

In some embodiments, the user may create a new group. For example, referring to FIG. 17*a*, the user 1 may tap the group creation control 1501 in the interface 60 shown in FIG. 17*a*, and in response to the tap operation of the user 1, the electronic device 101 displays, in the interface 60, a small window 1507 used to create a new group. Herein, the interface 60 shown in FIG. 17a is the same as the interface 60 shown in FIG. 15b. For details, refer to the related descriptions.

As shown in the figure, the small window 1507 includes a group name input area 1507-1, a control "Cancel" 1507-2, and a control "OK" 1507-3. The user 1 may input a name of the created group in the group name input area 1507-1, for example, "Family", and tap the control 1507-3. For example, referring to FIG. 17c, in response to the operation of tapping the control 1507-3 by the user 1, the group "Family" created by the user 1 is newly added to the display area 1503.

In response to the operation that the user 1 inputs the name of the created group in the group name input area 1507-1 and taps the control 1507-3, the electronic device 101 may use a user group identifier field in a sent status information advertising packet to carry an identifier of the group "Family" created by the user 1, to announce that the electronic device 101 creates the group "Family". Another electronic device around the electronic device 101 may obtain the status information advertising packet through scanning, and may choose to join the group "Family".

Figure 17C:
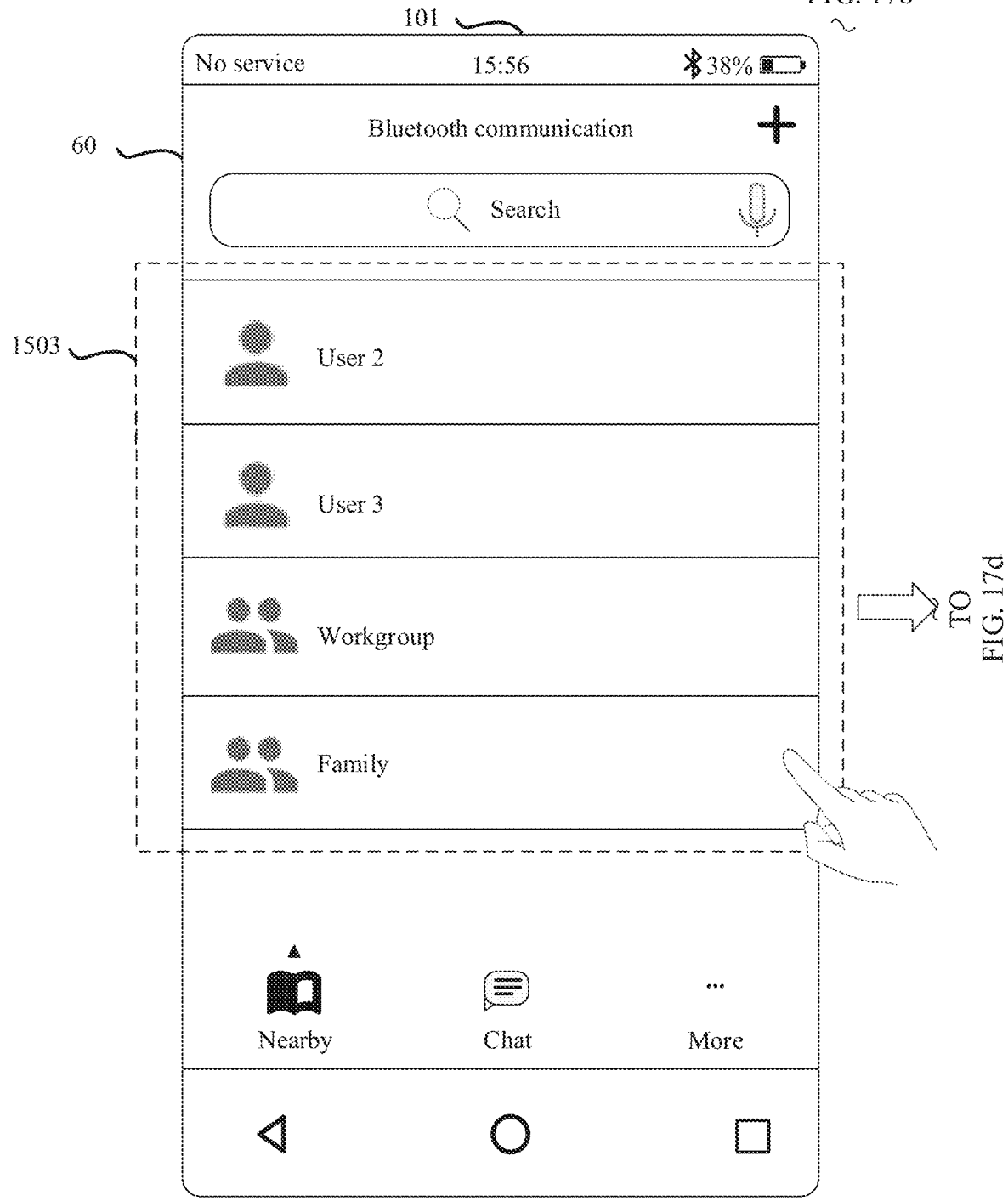
Figure 17D:
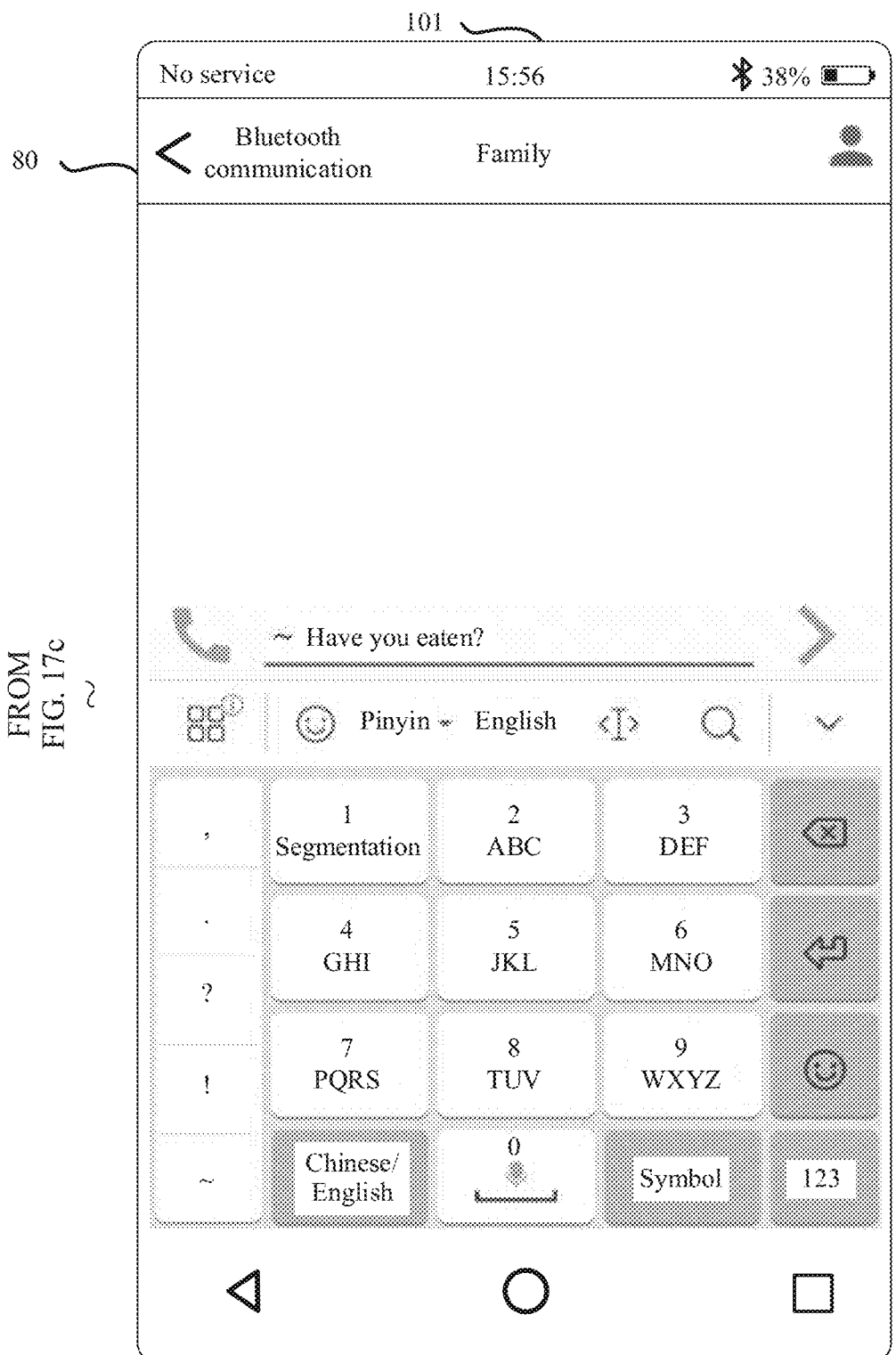

As shown in FIG. 17c, the user 1 may tap a control "Family" in the display area 1503, and in response to the tap operation of the user 1, the electronic device 101 may further display a chat interface 80 shown in FIG. 17d, where the interface 80 may be used for communication between the user 1 and another user in the group "Family". For example, as shown in FIG. 17d, the user 1 may input a text message "Have you eaten?". In response to the operation of inputting the text message by the user 1, the electronic device 101 may advertise the content message advertising packet based on BLE, where the content message advertising packet carries the text message "Have you eaten?" that is input by the user 1 in the group "Family".

In step S204, the electronic device may send the content message advertising packet a plurality of times before determining that the peer end receives the content message advertising packet, to ensure that the message can be correctly delivered.

In step S204, for a structure of the content message advertising packet sent by each electronic device to the another electronic device, refer to FIG. 5 and the related descriptions. Descriptions are provided by using an example in which the electronic device 101 sends the content message advertising packet to the electronic device 102, a user associated with the electronic device 101 is the user 1, and a user associated with the electronic device 102 is the user 2. In the content message advertising packet, a user identifier field may carry an account of the user 1, a user information field may carry a nickname of the user 1, a content message field carries a content message sent by the electronic device 101 to the electronic device 102, an advertising packet identifier field carries an identifier of the content message advertising packet, a target user information field carries an account or a nickname of the user 2, and an identifier field of a received advertising packet carries an identifier of the advertising packet received by the electronic device 101.

The following describes, by using an example in which the electronic device 101 sends the content message advertising packet to the electronic device 102, the communication method provided in this embodiment of this application.

Step S205: The electronic device 102 obtains, through scanning on the BLE advertising channel, the content message advertising packet sent by the electronic device 101.

After the electronic device 101 sends the content message advertising packet on the BLE advertising channel, other electronic devices (for example, the electronic device 102 and the electronic device 103) that fall within an effective BLE range (for example, within 1000 meters) of the electronic device 101 can obtain the content message advertising packet through scanning on the BLE advertising channel. After obtaining the content message advertising packet through scanning, the another electronic device may determine, based on information about a target user that is carried in the content message advertising packet, whether the content message advertising packet is sent to the another electronic device, and if the content message advertising packet is sent to the another electronic device, the another electronic device responds to the content message advertising packet.

Herein, a target device of the content message advertising packet sent by the electronic device 101 is the electronic device 102, and the target user is the user 2 associated with the electronic device 102. Therefore, after receiving the content message advertising packet sent by the electronic device 101, the electronic device 102 may parse the content message advertising packet to obtain information carried in the content message advertising packet, and determine, based on the information about the target user that is in the content message advertising packet, that the content message advertising packet is sent to the electronic device 102. The electronic device 102 may display the content message in the content message advertising packet on the display for the user 2 to view.

In some embodiments, the electronic device 101 encrypts the content message advertising packet by using a public key of the electronic device 102, and the electronic device 102 may decrypt the content message advertising packet by using a private key of the electronic device 102.

After parsing the content message advertising packet, the electronic device 102 may learn of an advertising packet identifier of the content message advertising packet. The electronic device 102 may add the advertising packet identifier to an identifier field that is of a received advertising packet and that is in an advertising packet to be sent by the electronic device 102 next time, to notify another device that the electronic device 102 receives the content message advertising packet. Herein, the advertising packet to be sent by the electronic device 102 next time may be a status information advertising packet, a content message advertising packet, or a help seeking advertising packet.

According to the communication method shown in FIG. 14A and FIG. 14B, a plurality of electronic devices can communicate with each other based on a BLE advertising mechanism, and the devices do not need to establish a connection and do not depend on a cellular network. Therefore, the user can also perform communication without the cellular network. This is convenient and fast. The communication method is implemented based on BLE, and can implement low power consumption communication between electronic devices.

The implementations of this application may be randomly combined to achieve different technical effects.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedure or functions according to this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk)), or the like.

What is claimed is:

1. A BLUETOOTH Low Energy-based communication method implemented by an electronic device that supports BLUETOOTH Low Energy, comprising:
    receiving a user operation; and
    sending a help seeking advertising packet on a BLUETOOTH Low Energy advertising channel in response to the user operation,
    wherein the help seeking advertising packet comprises a significant data part and a non-significant data part,
    wherein the significant data part comprises advertising data,
    wherein the advertising data comprises a length part and a data part,
    wherein the length part indicates a length of the data part,
    wherein the data part comprises an advertising data field and an advertising data type field, and
    wherein the advertising data field comprises first advertising data that carries emergency help seeking information.

2. The BLUETOOTH Low Energy-based communication method of claim 1, further comprising preconfiguring the advertising data field as an emergency help seeking information field, wherein the emergency help seeking information field carries the emergency help seeking information.

3. The BLUETOOTH Low Energy-based communication method of claim 1, wherein the significant data part comprises second advertising data that carries location information of the electronic device.

4. The BLUETOOTH Low Energy-based communication method of claim 1, wherein the advertising data field carries a user identifier of a user associated with the electronic device, user information of the user associated with the electronic device, a structure of the help seeking advertising packet, an identifier of the help seeking advertising packet, or an advertising packet identifier that is obtained by the electronic device through scanning.

5. The BLUETOOTH Low Energy-based communication method of claim 1, further comprising sending the help seeking advertising packet on the BLUETOOTH Low Energy advertising channel at a preset frequency.

6. The BLUETOOTH Low Energy-based communication method of claim 5, further comprising:
    stopping sending the help seeking advertising packet when a duration of the electronic device sending the help seeking advertising packet exceeds a preset value; or
    stopping sending the help seeking advertising packet when receiving another user operation.

7. A BLUETOOTH Low Energy-based communication method implemented by a first electronic device that supports BLUETOOTH Low Energy, comprising:
    obtaining, through scanning on a BLUETOOTH Low Energy advertising channel, a first status information advertising packet from sent-by-a second electronic device; and
    sending, in response to the first status information advertisement packet, a content message advertising packet on the BLUETOOTH Low Energy advertising channel,
    wherein each of the first status information advertising packet and the content message advertising packet comprises a significant data part and a non-significant data part,
    wherein the significant data part comprises advertising data, wherein the advertising data comprises a length part and a data part,
    wherein the length part indicates a length of the data part,
    wherein the data part comprises an advertising data field and an advertising data type field,
    wherein the advertising data field of the first status information advertising packet carries a first user identifier of a first user associated with the second electronic device,
    wherein the content message advertising packet further comprises first advertising data carrying a second user identifier of a second user associated with the first electronic device, second advertising data carrying information about a target user, and third advertising data carrying a message from the first electronic device to the second electronic device, and
    wherein the target user comprises the first user.

8. The BLUETOOTH Low Energy-based communication method of claim 7, wherein the advertising data field of the first status information advertising packet is preconfigured as a first user identifier field, wherein the first user identifier field carries the first user identifier, wherein the advertising data field of the content message advertising packet is preconfigured as a second user identifier field, wherein the second user identifier field carries the second user identifier, wherein the advertising data field of the content message advertising packet is preconfigured as a target user information field, wherein the target user information field carries the information about the target user, wherein the advertising data field of the content message advertising packet is preconfigured as a content message field, and wherein the content message field carries the message sent by the first electronic device to the second electronic device.

9. The BLUETOOTH Low Energy-based communication method of claim 7, the advertising data units of the content message advertising packet carries a first identifier of the content message advertising packet, wherein the advertising data of the first status information advertising packet carries a second identifier of an advertising packet obtained by the second electronic device through scanning, and wherein the second advertising data of the first status information advertising packet uses the advertising data field to carry the first identifier when the second electronic device obtains the content message advertising packet through scanning.

10. The BLUETOOTH Low Energy-based communication method of claim 7, wherein the first status information advertising packet carries information indicating a structure of the first status information advertising packet, user information of the first user associated with the second electronic device, an identifier of a group to which the first user belongs, or a public key of the second electronic device.

11. The BLUETOOTH Low Energy-based communication method of claim 10, wherein the first status information advertising packet carries the public key of the second electronic device, and wherein before sending the content message advertising packet on the BLUETOOTH Low Energy advertising channel, the BLUETOOTH Low Energy method further comprises encrypting the content message advertising packet by using the public key of the second electronic device.

12. The BLUETOOTH Low Energy-based communication method of claim 10, wherein the first status information advertising packet carries the identifier of the group to which the first user associated with the second electronic device belongs, wherein the group to which the first user associated with the second electronic device belongs comprises a first group, and wherein after obtaining, through scanning on the BLUETOOTH Low Energy advertising channel, the first status information advertising packet from the second electronic device, the BLUETOOTH Low Energy method further comprises:
sending a second status information advertising packet on the BLUETOOTH Low Energy advertising channel, wherein the second status information advertising packet comprises a second significant data part and a second non-significant data part, wherein the second significant data part comprises fourth advertising data, wherein the fourth a advertising data comprises a second length part and a second data part, wherein the second length part indicates a second length of the second data part, wherein the second data part comprises a second advertising data field and a second advertising data type field, wherein the second advertising data field carries the second user identifier and an identifier of a group to which the second user associated with the first electronic device belongs, and wherein the group to which the second user associated with the first electronic device belongs comprises the first group.

13. The BLUETOOTH Low Energy-based communication method of claim 12, wherein the target user comprises a third user associated with a device in the first group.

14. The BLUETOOTH Low Energy-based communication method of claim 7, wherein the content message advertising packet carries information indicating a structure of the content message advertising packet, user information of the second user, or an identifier of an advertising packet obtained by the first electronic device through scanning.

15. A first electronic device supporting BLUETOOTH Low Energy and comprising:
a processor configured to:
generate a content message advertising packet; and
send indication information to trigger sending the content message advertising packet on a BLUETOOTH Low Energy advertising channel; and
a wireless communications module coupled to the processor and configured to:
obtain, through scanning on the BLUETOOTH Low Energy advertising channel, a first status information advertising packet from a second electronic device; and
send the content message advertising packet on the BLUETOOTH Low Energy advertising channel,
wherein each of the first status information advertising packet and the content message advertising packet each comprises a significant data part and a non-significant data part,
wherein the significant data part comprises advertising data,
wherein the advertising data comprises a length part and a data part,
wherein the length part indicates a length of the data part,
wherein the data part comprises an advertising data field and an advertising data type field,
wherein the advertising data field carries a first user identifier of a first user associated with the second electronic device,
wherein the advertising data field of the content message advertising packet carries a second user identifier of a second user associated with the first electronic device, information about a target user, and a message sent by the first electronic device to the second electronic device, and
wherein the target user comprises the first user.

16. The first electronic device of claim 15, wherein the advertising data field of the first status information advertising packet is preconfigured as a first user identifier field, wherein the first user identifier field carries the first user identifier, wherein the advertising data field of the content message advertising packet is preconfigured as a second user identifier field, wherein the second user identifier field carries the second user identifier, wherein the advertising data field of the content message advertising packet is preconfigured as a target user information field, wherein the target user information field carries the information about the target user, wherein the advertising data field of the content message advertising packet is preconfigured as a content message field, and wherein the content message field carries the message sent by the first electronic device to the second electronic device.

17. The first electronic device of claim 15, wherein the advertising data field of the content message advertising packet carries an identifier of the content message advertising packet, wherein the advertising data field of the first status information advertising packet carries an identifier of an advertising packet, and wherein the advertising data field of the first status information advertising packet carries the identifier of the content message advertising packet when the wireless communications module obtains the content message advertising packet through scanning.

18. The first electronic device of claim 15, wherein the first status information advertising packet carries information indicating a structure of the first status information advertising packet, user information of the first user, an identifier of a group to which the first user belongs, or a public key of the second electronic device.

19. The first electronic device of claim 18, wherein the advertising data field of the first status information advertising packet carries the public key of the second electronic device, and wherein the processor is further configured to ee encrypt the content message advertising packet by using the public key of the second electronic device before the wireless communications module sends the content message advertising packet on the BLUETOOTH Low Energy advertising channel.

20. The first electronic device of claim 18, wherein the advertising data field of the first status information advertising packet carries the identifier of the group to which the first user belongs, wherein the group to which the first user belongs comprises a first group, wherein the processor is further configured to:
generate a second status information advertising packet; and send second indication information to trigger the wireless communications module to send the second status information advertising packet on the BLUETOOTH Low Energy advertising channel, wherein the wireless communications module is further configured to send the second status information advertising packet on the BLUETOOTH Low Energy advertising channel, wherein the second status information advertising packet comprises a second significant data part and a second non-significant data part, wherein the second significant data part comprises a second length part and a second data part, wherein the second length part indicates a second length of the second data part, wherein the second data part comprises a second advertising data field and a second advertising data type field, wherein the second advertising data field of the second status information advertising packet carries the second user identifier and an identifier of a group to which the second user associated with the first electronic device belongs, and wherein the group to which the second user associated with the first electronic device belongs comprises the first group.

* * * * *

UNITED STATES PATENT AND TRADEMARK OFFICE
CERTIFICATE OF CORRECTION

PATENT NO. : 11,871,478 B2  
APPLICATION NO. : 17/418521  
DATED : January 9, 2024  
INVENTOR(S) : Liang Wang et al.

Page 1 of 1

It is certified that error appears in the above-identified patent and that said Letters Patent is hereby corrected as shown below:

In the Claims

Claim 7, Column 52, Line 6: "advertising packet from sent-by-a second electronic" should read "advertising packet from a second electronic"

Claim 9, Column 52, Line 51: "method of claim 7, the advertising data units of the content" should read "method of claim 7, wherein the advertising data of the content"

Claim 19, Column 54, Line 54: "device, and wherein the processor is further configured to ee" should read "device, and wherein the processor is further configured to"

Signed and Sealed this  
Twenty-seventh Day of February, 2024

Katherine Kelly Vidal  
*Director of the United States Patent and Trademark Office*